(12) United States Patent
Terada et al.

(10) Patent No.: US 10,205,950 B2
(45) Date of Patent: Feb. 12, 2019

(54) IMAGE DECODING METHOD, IMAGE ENCODING METHOD, IMAGE DECODING APPARATUS, AND IMAGE ENCODING APPARATUS

(71) Applicant: Panasonic Corporation, Osaka (JP)

(72) Inventors: Kengo Terada, Osaka (JP); Hisao Sasai, Osaka (JP); Satoshi Yoshikawa, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 721 days.

(21) Appl. No.: 14/624,260

(22) Filed: Feb. 17, 2015

(65) Prior Publication Data

US 2015/0245059 A1 Aug. 27, 2015

Related U.S. Application Data

(60) Provisional application No. 61/942,654, filed on Feb. 21, 2014.

(30) Foreign Application Priority Data

Oct. 29, 2014 (JP) ................................ 2014-220652

(51) Int. Cl.
*H04N 19/174* (2014.01)
*H04N 19/105* (2014.01)
(Continued)

(52) U.S. Cl.
CPC ......... *H04N 19/174* (2014.11); *H04N 19/105* (2014.11); *H04N 19/167* (2014.11);
(Continued)

(58) Field of Classification Search
CPC .. H04N 19/174; H04N 19/105; H04N 19/167; H04N 19/436; H04N 19/46; H04N 19/70
See application file for complete search history.

(56) References Cited

U.S. PATENT DOCUMENTS

| 2014/0125642 A1* | 5/2014 | Pearlstein | ............... G06F 3/013 345/207 |
| 2014/0376638 A1* | 12/2014 | Nakamura | ........... H04N 19/463 375/240.16 |
| 2015/0030074 A1* | 1/2015 | Nakagami | .............. H04N 19/44 375/240.16 |

FOREIGN PATENT DOCUMENTS

| JP | 2003-348597 | 12/2003 | |
| JP | 2003348597 A * | 12/2003 | ............... H04N 7/32 |

(Continued)

OTHER PUBLICATIONS

Flynn et al., "High Efficiency Video Coding (HEVC) Range Extensions text specification: Draft 4", Joint Collaborative Team on Video Coding (JCT-VC) of ITU-T SG 16 WP3 and ISO/IEC JTC 1/SC 29/WG 11. 13th Meeting: Incheon, KR, Apr. 18-26, 2013.*

(Continued)

*Primary Examiner* — William C Vaughn, Jr.
*Assistant Examiner* — Joseph Daniel A Towe
(74) *Attorney, Agent, or Firm* — Wenderoth, Lind & Ponack, L.L.P.

(57) ABSTRACT

An image decoding method includes a constraint information decoding step of decoding constraint information indicating prohibition of reference from a target tile, which is one of a plurality of tiles obtained by partitioning a picture, to another tile, and a list generation step of generating a prediction motion vector list including a plurality of prediction motion vector candidates and a plurality of prediction motion vector indices each associated with a corresponding one of the plurality of prediction motion vector candidates. In the list generating step, a prediction motion vector list not including a temporal motion vector of a block on a lower right side of the target block is generated.

19 Claims, 49 Drawing Sheets

(51) Int. Cl.
*H04N 19/167* (2014.01)
*H04N 19/436* (2014.01)
*H04N 19/70* (2014.01)
*H04N 19/46* (2014.01)

(52) U.S. Cl.
CPC .......... *H04N 19/436* (2014.11); *H04N 19/46* (2014.11); *H04N 19/70* (2014.11)

(56) References Cited

FOREIGN PATENT DOCUMENTS

| | | | |
|---|---|---|---|
| JP | WO 2013150943 A1 * | 10/2013 | ............. H04N 19/44 |
| JP | 2013-236367 | 11/2013 | |
| WO | 2013/150943 | 10/2013 | |

OTHER PUBLICATIONS

Flynn et al., "High Efficiency Video Coding (HEVC) Range Extensions text specification: Draft 4", Joint Collaborative Team on Video Coding (JCT-VC) of ITU-T SG 16 WP3 and ISO/IEC JTC 1/SC 29/WG 11. 13th Meeting: Incheon, KR Apr. 18-26, 2013. (Year: 2013).*

Flynn, David et al., "High Efficiency Video Coding (HEVC) Range Extensions text specification: Draft 6," Joint Collaborative Team on Video Coding (JCT-VC) of ITU-T SG 16 WP 3 and ISO/IEC JTC 1/SC 29/WG 11 16th Meeting: San Jose, US, Feb. 19, 2014, [JCTVC-P1005_v1] (version 1).

David Flynn et al., "High Efficiency Video Coding (HEVC) Range Extensions text specification :draft 4 " JCTVC-N1005,2013 Apr. 18-26, 2013.

* cited by examiner

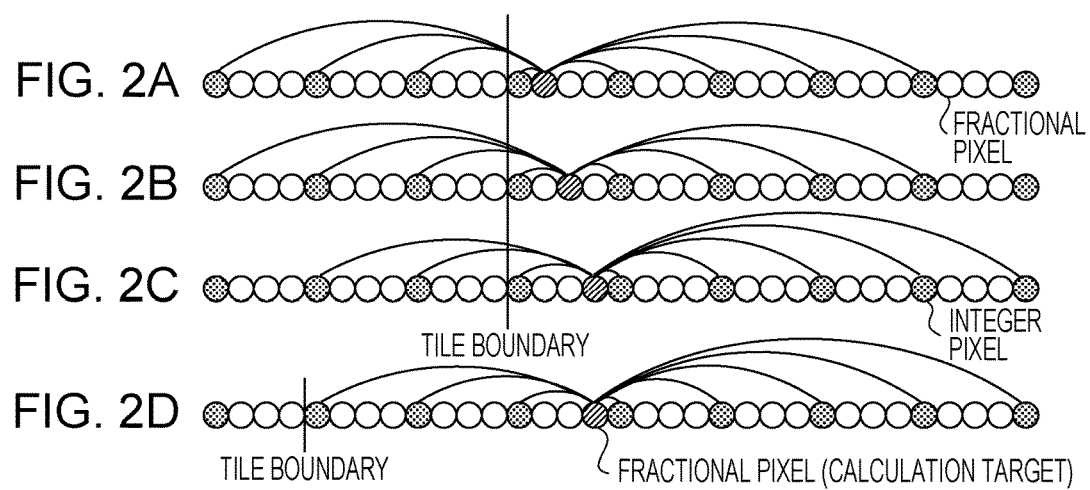

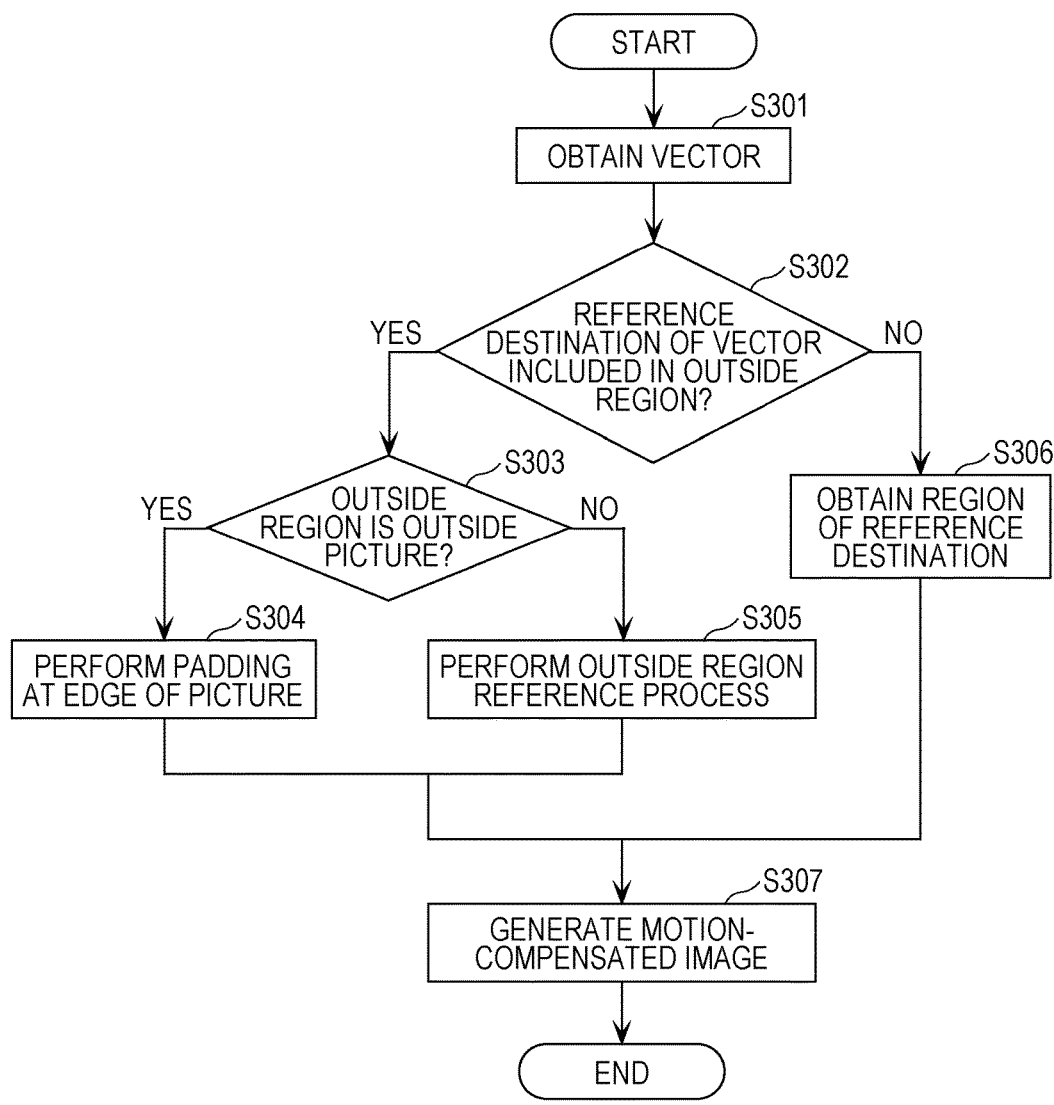

| motion_constrained_tile_sets (payloadSize) { |
| ... |
| exact_sample_value_match_flag |
| ... |
| } |

FIG. 14A

| motion_constrained_tile_sets (payloadSize) { |
|---|
| ... |
| exact_sample_value_match_flag |
| if(exact_sample_value_match_flag == 0) { |
|     filtering_mismatch_flag |
|     motion_constraint_mismatch_flag |
| } |
| ... |
| } |

FIG. 14B

| motion_constrained_tile_sets (payloadSize) { |
|---|
| ... |
| inloop_filtering_mismatch_flag |
| motion_constraint_mismatch_flag |
| ... |
| } |

FIG. 14C

| motion_constrained_tile_sets (payloadSize) { |
|---|
| ... |
| inloop_filtering_mismatch_flag |
| fractional_point_mismatch_flag |
| skip_merge_mismatch_flag |
| ... |
| } |

FIG. 16

| CONDITION | SPECIAL PROCESS | PROCESSING ACCORDING TO RELATED ART |
|---|---|---|
| NO MISMATCH | NO EXTRA PROCESS | NO EXTRA PROCESS |
| FILTERING AT BOUNDARY | SPECIAL PROCESS FOR BOUNDARY FILTERING | ERROR |
| REFERENCE TO OUTSIDE REGION | SPECIAL PROCESS FOR OUTSIDE REGION REFERENCE | ERROR |
| REFERENCE TO OUTSIDE REGION BY FRACTIONAL PIXEL | SPECIAL PROCESS FOR FRACTIONAL PIXEL GENERATION | ERROR |

FIG. 19A

CASE WHERE USE OF LOWER RIGHT MV IS PROHIBITED

| PREDICTION MV INDEX | PREDICTION MV |
|---|---|
| 0 | SPATIAL MV CANDIDATE (A0) |
| 1 | SPATIAL MV CANDIDATE (B0) |
| 2 | TEMPORAL MV CANDIDATE (CENTRAL MV) |
| 3 | COMBINED BI-PREDICTIVE CANDIDATE |
| 4 | ZERO MV |

FIG. 19B

CASE WHERE USE OF TEMPORAL MV CANDIDATE IS PROHIBITED

| PREDICTION MV INDEX | PREDICTION MV |
|---|---|
| 0 | SPATIAL MV CANDIDATE (A0) |
| 1 | SPATIAL MV CANDIDATE (B0) |
| 2 | COMBINED BI-PREDICTIVE CANDIDATE |
| 3 | ZERO MV |

FIG. 19C

CASE WHERE ZERO MV IS USED INSTEAD OF TEMPORAL MV CANDIDATE

| PREDICTION MV INDEX | PREDICTION MV |
|---|---|
| 0 | SPATIAL MV CANDIDATE (A0) |
| 1 | SPATIAL MV CANDIDATE (B0) |
| 2 | ZERO MV |
| 3 | COMBINED BI-PREDICTIVE CANDIDATE |
| 4 | ZERO MV |

FIG. 38

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB VIDEO) |
| VIDEO STREAM (PID = 0x1B01 SUB VIDEO) |

FIG. 49

| SUPPORTED STANDARD | DRIVING FREQUENCY |
|---|---|
| MPEG-4 AVC | 500 MHz |
| MPEG-2 | 350 MHz |
| ... | ... |

IMAGE DECODING METHOD, IMAGE ENCODING METHOD, IMAGE DECODING APPARATUS, AND IMAGE ENCODING APPARATUS

BACKGROUND

1. Technical Field

The present disclosure relates to an image decoding method and an image encoding method.

2. Description of the Related Art

Currently, the High Efficiency Video Coding (HEVC) scheme (see JCTVC-N1005, "High Efficiency Video Coding (HEVC) Range Extensions text specification: Draft 4", which is hereinafter referred to as JCTVC-N1005) is being studied as a new image encoding standard.

SUMMARY

As for such image encoding method and image decoding method, it is desired to allow an image decoding apparatus to appropriately decode a coded bitstream.

One non-limiting and exemplary embodiment provides an image decoding method that allows appropriate decoding of a coded bitstream or an image encoding method that allows generation of a coded bitstream that can be appropriately decoded by an image decoding apparatus.

In one general aspect, the techniques disclosed here feature an image decoding method including a constraint information decoding step of decoding, from a bitstream, constraint information that indicates prohibition of reference from a target tile, which is one of a plurality of tiles obtained by partitioning a picture, to another tile; a list generation step of generating a prediction motion vector list that includes a plurality of prediction motion vector candidates and a plurality of prediction motion vector indices each associated with a corresponding one of the plurality of prediction motion vector candidates; an index decoding step of decoding, from the bitstream, a prediction motion vector index for a target block included in the target tile; and a block decoding step of decoding the target block by using a prediction motion vector candidate associated with the decoded prediction motion vector index in the prediction motion vector list, wherein in the list generation step, the prediction motion vector list not including a temporal motion vector of a block on a lower right side of the target block is generated.

It should be noted that general or specific embodiments may be implemented as a system, a method, an integrated circuit, a computer program, a computer-readable storage medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 2A to 2D are diagrams for describing a process for generating a pixel value of a fractional pixel by crossing a tile boundary;

FIG. 9 is a flowchart of an image decoding process according to the second exemplary embodiment;

FIG. 14A is a diagram illustrating an example of syntax for a coded bitstream according to a third exemplary embodiment;

FIG. 14B is a diagram illustrating another example of syntax for a coded bitstream according to the third exemplary embodiment;

FIG. 14C is a diagram illustrating another example of syntax for a coded bitstream according to the third exemplary embodiment;

FIG. 16 is a table that describes special processes according to the third exemplary embodiment;

FIGS. 19A to 19C are diagrams illustrating examples of a prediction MV list according to the fourth exemplary embodiment;

FIG. 38 is a diagram illustrating a structure of multiplexed data;

FIG. 49 is a diagram illustrating an example of a lookup table in which a video data standard and a driving frequency are associated with each other;

DETAILED DESCRIPTION

Underlying Findings of Present Disclosure

The inventors have found that the technology according to the related art involves the difficulties described below.

Figure 1A:
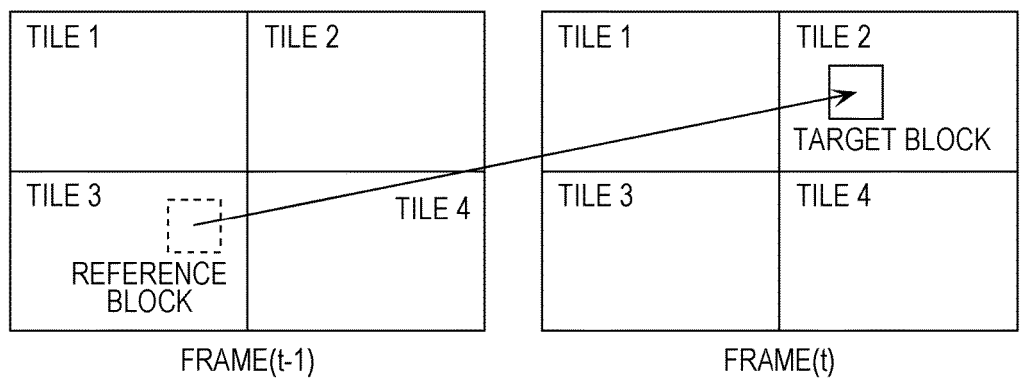
FIGS. 1A and 1B are diagrams for describing a tile for which a constraint is imposed in terms of motion compensation (motion-constrained tile)

According to International Telecommunication Union Telecommunication Standardization Sector (ITU-T) standards called H.26x or International Organization for Standardization/International Electrotechnical Communication (ISO/IEC) standards called MPEG-x, one image is partitioned into a plurality of units called tiles as illustrated in FIG. 1A. For each tile, reference to other tiles included in an image including the tile is not permitted. For example, when a tile 2 is subjected to encoding or decoding, reference from the tile 2 to a tile 1 is not permitted. However, reference from an encoding/decoding-target block in the tile 2 to tiles other the tile 2 of an image is permitted if the image is an image at a different time point. For example, an image illustrated on the left in FIG. 1A is an image at time t−1, and an image illustrated on the right is an image at time t. These images are images at different time points. FIG. 1A is a diagram illustrating an example in which a reference block belonging to a tile 3 for time t−1 is used as a reference image when a target block belonging to the tile 2 for time t is processed.

Permitting such reference, however, involves the following limitations. For example, in the case where the size of an image is significantly large, parallel processing is performed in which individual tiles are processed separately by different large scale integration (LSI) chips. In order to permit reference to another tile included in an image at a different time point in a manner as described above, the individual LSI chips need to write the images that they have generated to a large-capacity memory and share the memory. In this case, the individual LSI chips need to be synchronized with one another. Processing overhead undesirably increases due to this synchronization process.

Figure 1B:
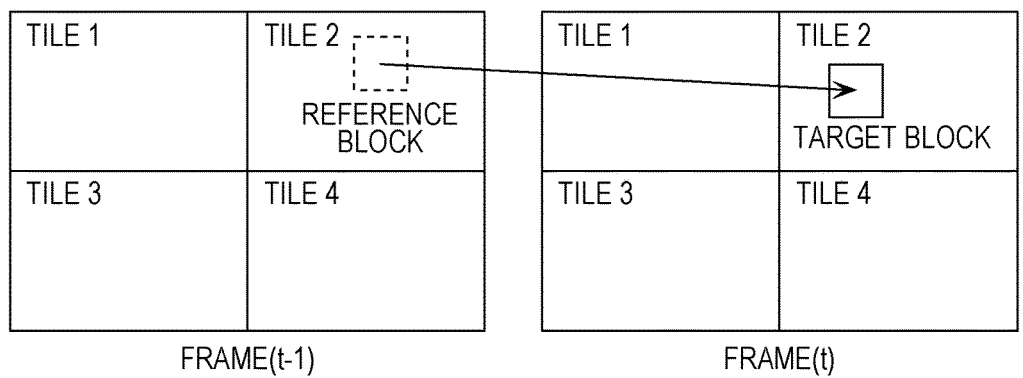

To deal with such a circumstance, JCTVC-N1005 discloses a method for including, in a coded stream, information which indicates prohibition of reference to another tile included in an image at a different time point. In this case, reference needs to be made to a reference block in the same tile as that of the target block (i.e., the tile 2) even in an image at a different time point (i.e., the frame (t−1)) as illustrated in FIG. 1B. This method frees the plurality of LSI chips from the need to output the reference images to the shared memory in the case where parallel processing is performed by the LSI chips. Hereinafter, tiles having such a constraint are referred to as motion compensation constrained (MC-constrained) tiles.

However, the inventors have found that implementation of this method involves the following difficulties.

(1) Even in the case where reference is made to a region of the same tile as the current tile, a tile different from the current tile may be referred to in some cases in order to calculate a pixel value of a fractional pixel, which is a pixel having fractional precision.

Referring to FIGS. 2A to 2D, a fractional pixel generation method will be described. FIG. 2A illustrates reference pixels of a filter for generating a pixel value at a position that is shifted from the left tile boundary by a quarter pixel. Integer pixels linked by lines are referred to. In this case, three pixels located outside the current tile region are referred to.

FIG. 2B illustrates reference pixels of a filter for generating a pixel value at a position that is shifted from the left tile boundary by a half pixel. In this case, three pixels located outside the current tile region are referred to. FIG. 2C illustrates reference pixels of a filter for generating a pixel value at a position that is shifted from the left tile boundary by a three-quarter pixel. In this case, two pixels located outside the current tile region are referred to.

When considered in this way, no pixels located outside the current tile region are referred for positions on the right side of a position that is shifted from the left tile boundary by two-and-three-quarter pixels as illustrated in FIG. 2D. Therefore, in order to implement the above-described reference not across tiles when reference to an image signal of a different time point is permitted, reference needs to be made to integer pixels in the same tile or to fractional pixels located on the inner side of a position that is shifted from the tile boundary by two-and-three-quarter pixels. However, switching the processing mode to perform this processing at edges of a tile increases the processing overhead and circuitry scale.

(2) There are modes called "skip mode" and "merge mode", in which a motion vector of a processed neighboring block is reused. A motion vector is information representing a relative position between the target block and the reference block and contains, for example, a horizontal component and a vertical component. If either one of these modes is selected, reference across the tile boundary may be made when a motion vector is reused in the target block, even in the case where the block to be used is configured not to make reference across the tile boundary. For this reason, an image encoding apparatus and an image decoding apparatus need to check whether reference across the tile boundary is to be made.

Figure 3A:
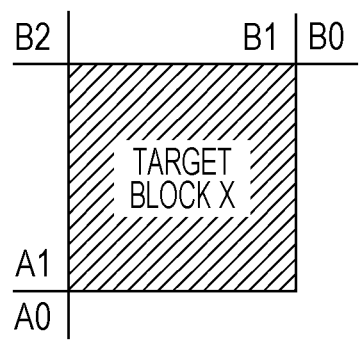
FIGS. 3A to 3C are diagrams for describing a skip/merge vector derivation process.
Figure 3B:
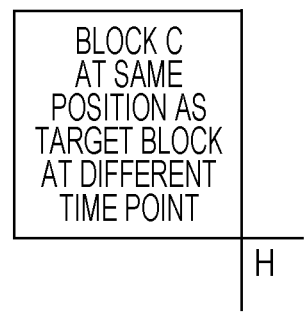
Figure 3C:
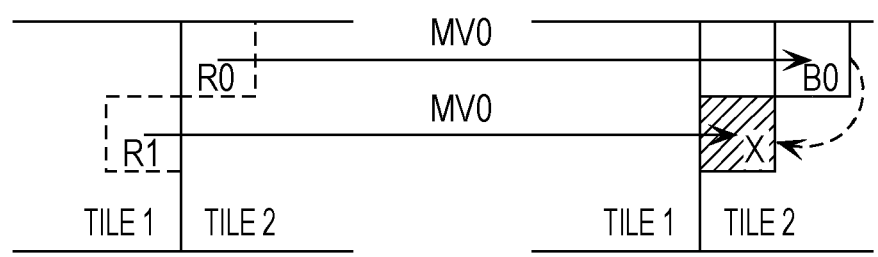

Referring to FIGS. 3A to 3C, a description will be given below of a region that is referred to when a motion vector used in the skip mode and the merge mode (hereinafter, referred to as a skip/merge vector) is derived.

FIG. 3A is a diagram illustrating the case where a motion vector of a neighboring block within a picture is referred to. When a skip/merge vector is derived for a target block X, reference may be made to motion vectors of blocks A0, A1, B0, B1, and B2 located adjacent to the target block X.

There is also a method for referring to a motion vector of a picture at a different time point. As illustrated in FIG. 3B, reference is made to a motion vector of a block C which is located at the same position as the target block X in a picture at a different time point or a motion vector of a block H which is located on the lower right side of the block C.

FIG. 3C is a diagram illustrating an example case where the target block X located at the tile boundary reuses a motion vector MV0 of the block B0 located on the upper right side of the target block X. As illustrated in FIG. 3C, when the block B0 is processed, the motion vector MV0 does not cross the tile boundary and a reference block R0 within the same tile (i.e., the tile 2) as that of the block B0 is referred to. In contrast, when the motion vector MV0 is reused for the target block X, the motion vector MV0 crosses the tile boundary, and a reference block R1 in another tile (i.e., the tile 1) is referred to. Because such a case may occur, an image encoding apparatus or an image decoding apparatus needs to check whether or not a motion vector crosses the tile boundary. However, checking whether or not a motion vector crosses the tile boundary for every motion prediction calculation increases the processing overhead and circuitry scale.

In addition, processing different from that performed at edges of pictures represented by image signals is needed at these tile boundaries because processing to be performed when there are no neighboring pixels at edges of pictures is defined in JCTVC-N1005 but processing to be performed at boundaries of tiles for which motion reference is constrained is not defined in JCTVC-N1005. Accordingly, the processing described above is needed.

The inventors have found a need to perform special processes at edges of regions of tiles in the case of performing parallel processing on the individual regions as described above.

More specifically, processing is needed to allow an image encoding apparatus or an image decoding apparatus to perform parallel processing (parallel encoding or decoding) on a target image signal. This processing, however, increases the processing time, making it difficult to implement high-speed processing. Alternatively, to perform this processing at a high speed, the circuitry scale needs to be increased.

In addition, JCTVC-N1005 discloses a method for using a motion vector (MV) of a decoded picture as a prediction MV but does not explicitly describe how to handle the case where a block referred to is located outside an MC-constrained tile region. The inventors have found that a consequent mismatch may occur between a prediction MV list used on the encoding side and that used on the decoding side.

In exemplary embodiments, a description will be given of an image encoding apparatus capable of performing parallel encoding processing and of encoding an encoding-target image signal at a high speed.

In addition, in exemplary embodiments, a description will be given of an image encoding method that can reduce the processing overhead of the image encoding apparatus.

An image decoding method according to an aspect of the present disclosure includes a constraint information decoding step of decoding, from a bitstream, constraint information that indicates prohibition of reference from a target tile, which is one of a plurality of tiles obtained by partitioning a picture, to another tile; a list generation step of generating a prediction motion vector list that includes a plurality of prediction motion vector candidates and a plurality of prediction motion vector indices each associated with a corresponding one of the plurality of prediction motion vector candidates; an index decoding step of decoding, from the bitstream, a prediction motion vector index for a target block included in the target tile; and a block decoding step of decoding the target block by using a prediction motion vector candidate associated with the decoded prediction motion vector index in the prediction motion vector list, wherein in the list generation step, the prediction motion vector list not including a temporal motion vector of a block on a lower right side of the target block is generated.

With this configuration, the image decoding method allows an image to be decoded without reference to information of another tile. In this way, the image decoding method enables appropriate decoding of a coded bitstream. The image decoding method also enables appropriate decoding of a coded bitstream even in the case where reference to information of another tile is made by an image encoding apparatus.

For example, in the list generation step, it may be determined whether or not the block on the lower right side of the target block is located outside the target tile, and a temporal motion vector of the block on the lower right side of the target block may be not included in the prediction motion vector list in a case where the block on the lower right side of the target block is located outside the target tile.

With this configuration, the image decoding method can suppress the use of a motion vector of a block on the lower right side of the current block from being unnecessarily prohibited and thus can suppress the occurrence of the case where different prediction motion vectors are used on the encoding side and the decoding side.

For example, in the list generation step, the prediction motion vector list including neither a temporal motion vector of the block on the lower right side of the target block nor a temporal motion vector of a block located at a center of the target block may be generated.

With this configuration, the image decoding method can reduce the processing overhead.

For example, in the list generating step, a motion vector having a value of 0 may be included in the prediction motion vector list in place of a temporal motion vector of the block on the lower right side of the target block.

With this configuration, the image decoding method can make candidates that follow temporal motion vector candidates identical in the prediction motion vector lists used on the encoding side and the decoding side. Thus, the occurrence of the case where different prediction motion vectors are used on the encoding side and the decoding side can be suppressed.

For example, in the list generation step, the prediction motion vector list including a temporal motion vector of a block located at a center of the target block may be generated.

With this configuration, the image decoding method can make candidates that follow temporal motion vector candidates identical in the prediction motion vector lists used on the encoding side and the decoding side. Thus, the occurrence of the case where different prediction motion vectors are used on the encoding side and the decoding side can be suppressed.

For example, in the block decoding step, the target block may be decoded by using a prediction motion vector candidate associated with the largest prediction motion vector index among the plurality of prediction motion vector indices included in the prediction motion vector list in a case where the decoded prediction motion vector index does not exist in the prediction motion vector list.

With this configuration, the image decoding method enables appropriate decoding of a coded bitstream even in the case where a mismatch occurs between the prediction motion vector list used on the encoding side and that used on the decoding side.

For example, in the block decoding step, the target block may be decoded by using a prediction motion vector candidate associated with the smallest prediction motion vector index among the plurality of prediction motion vector indices included in the prediction motion vector list in a case where the decoded prediction motion vector index does not exist in the prediction motion vector list.

With this configuration, the image decoding method enables appropriate decoding of a coded bitstream even in the case where a mismatch occurs between the prediction motion vector list used on the encoding side and that used on the decoding side.

For example, in the block decoding step, the target block may be decoded by using a motion vector having a value of 0 in a case where the decoded prediction motion vector index does not exist in the prediction motion vector list.

With this configuration, the image decoding method enables appropriate decoding of a coded bitstream even in the case where a mismatch occurs between the prediction motion vector list used on the encoding side and that used on the decoding side.

In addition, an image encoding method according to an aspect of the present disclosure includes a partitioning step of partitioning a picture into a plurality of tiles; a constraint information encoding step of encoding constraint information that indicates prohibition of reference from a target tile, which is one of the plurality of tiles, to another tile; a list generation step of generating a prediction motion vector list that includes a plurality of prediction motion vector candidates and a plurality of prediction motion vector indices each associated with a corresponding one of the plurality of prediction motion vector candidates; an index encoding step of selecting a prediction motion vector candidate from among the plurality of prediction motion vector candidates and encoding a prediction motion vector index associated with the selected prediction motion vector candidate in the prediction motion vector list; and a block encoding step of encoding a target block included in the target tile by using the selected prediction motion vector candidate, wherein in the list generation step, a temporal motion vector of a block on a lower right side of the target block is not included in the prediction motion vector list.

With this configuration, the image encoding method allows an image to be encoded without reference to information of another tile. In this way, the image encoding method enables generation of a coded bitstream which can be appropriately decoded by an image decoding apparatus. The image encoding method also enables generation of a coded bitstream which can suppress the occurrence of a mismatch between the prediction motion vector list used on the encoding side and that used on the decoding side.

For example, in the list generation step, it may be determined whether or not the block on the lower right side of the target block is located outside the target tile, and a temporal motion vector of the block on the lower right side of the target block may be not included in the prediction motion vector list in a case where the block on the lower right side of the target block is located outside the target tile.

With this configuration, the image encoding method can suppress the use of a motion vector of a block on the lower right side of the current block from being unnecessarily prohibited and thus can improve the coding efficiency.

For example, in the list generation step, the prediction motion vector list including neither a temporal motion vector of the block on the lower right side of the target block nor a temporal motion vector of a block located at a center of the target block may be generated.

With this configuration, the image encoding method can reduce the processing overhead.

For example, in the list generation step, none of a temporal motion vector, a combined bi-predictive vector, and a motion vector having a value of 0 may be included in the prediction motion vector list.

With this configuration, the image encoding method can suppress the occurrence of the case where different prediction motion vectors are used on the encoding side and the decoding side.

For example, in the block encoding step, the target block may be encoded by using intra prediction.

With this configuration, the image encoding method can suppress the occurrence of the case where different prediction motion vectors are used on the encoding side and the decoding side.

For example, in the block encoding step, the target block may be encoded by using intra prediction in a case where a spatial motion vector candidate is not available.

With this configuration, the image encoding method can suppress the occurrence of the case where different prediction motion vectors are used on the encoding side and the decoding side.

For example, in the list generation step, it may be determined whether or not the target block is a block or slice located at a right edge of the target tile, and a temporal motion vector of the block on the lower right side of the target block may be not included in the prediction motion vector list in a case where the target block is a block or slice located at the right edge of the target tile.

With this configuration, the image encoding method can suppress the occurrence of the case where different prediction motion vectors are used on the encoding side and the decoding side. The image encoding method can also reduce the processing overhead.

For example, the image encoding method may further include a flag encoding step of encoding a flag that indicates whether or not to encode a difference between a motion vector used and a prediction motion vector in a case where a reference image list for a following picture is used in bi-directional reference; a determining step of determining whether or not the prediction motion vector refers to a region outside the target tile in a case where the reference image list is used; and a prohibiting step of prohibiting bi-directional reference if the prediction motion vector refers to a region outside the target tile including the target block in a case where the flag indicates that the difference is not to be encoded and the reference image list is used.

With this configuration, the image encoding method allows an image to be encoded without reference to information of another tile.

For example, the image encoding method may further include a flag encoding step of encoding a flag that indicates whether or not to encode a difference between a motion vector used and a prediction motion vector in a case where a reference image list for a following picture is used in bi-directional reference, wherein in the flag encoding step, the flag, indicating that the difference is encoded, is encoded in a case where the constraint information indicates prohibition of reference from the target tile to another tile.

With this configuration, the image encoding method allows an image to be encoded without reference to information of another tile. The image encoding apparatus can also reduce the processing overhead.

For example, the image encoding method may further include a setting step of setting a quantization parameter for a block that is in contact with a boundary of a tile smaller than a quantization parameter for another block that is not in contact with a boundary of a tile in a case where the constraint information indicates prohibition of reference from the target tile to another tile.

With this configuration, the image encoding method can suppress the image quality degradation at tile boundaries in the case where reference to another tile is prohibited.

In addition, an image decoding apparatus according to an aspect of the present disclosure includes a decoder and a storage device made accessible to the decoder, wherein the decoder executes the image decoding method by using the storage device.

With this configuration, the image decoding apparatus can decode an image without referring to information of another tile. In this way, the image decoding apparatus can appropriately decode a coded bitstream. In addition, the image decoding apparatus can appropriately decode a coded bitstream even in the case where information of another tile is referred to by an image encoding apparatus.

Further, an image encoding apparatus according to an aspect of the present disclosure includes an encoder and a storage device made accessible to the encoder, wherein the encoder executes the image encoding method by using the storage device.

With this configuration, the image encoding apparatus can encode an image without referring to information of another tile. In this way, the image encoding apparatus can generate a coded bitstream which can be appropriately decoded by an image decoding apparatus. In addition, the image encoding apparatus can generate a coded bitstream that can suppress the occurrence of a mismatch between the predicted MV list used on the encoding side and that used on the decoding side.

In addition, an image encoding/decoding apparatus according to an aspect of the present disclosure includes the image encoding apparatus and the image decoding apparatus.

It should be noted that general or specific embodiments may be implemented as a system, a method, an integrated circuit, a computer program, a computer-readable storage medium such as a CD-ROM, or any selective combination thereof.

Exemplary embodiments of the present disclosure will be described below with reference to the drawings.

Each of the exemplary embodiments below describes a general or specific example. Numerical values, shapes, materials, elements, arranged positions and connection forms of the elements, steps, the order of the steps, and the like described in the following exemplary embodiments are merely examples, and do not limit the present disclosure. Also, among elements described in the following exemplary embodiments, elements that are not included in an independent claim which represents the highest concept are described as optional elements.

First Exemplary Embodiment

In a first exemplary embodiment, a description will be given of an image encoding method for generating a coded stream that enables parallel processing. In the first exemplary embodiment, a bitstream contains information that allows an image encoding apparatus to easily perform parallel processing. That is, a block included in a tile, which is a region obtained by partitioning a picture, refers to only pixels within the same tile included in a picture at the same time point or at a different time point during motion prediction and motion compensation.

Figure 4:
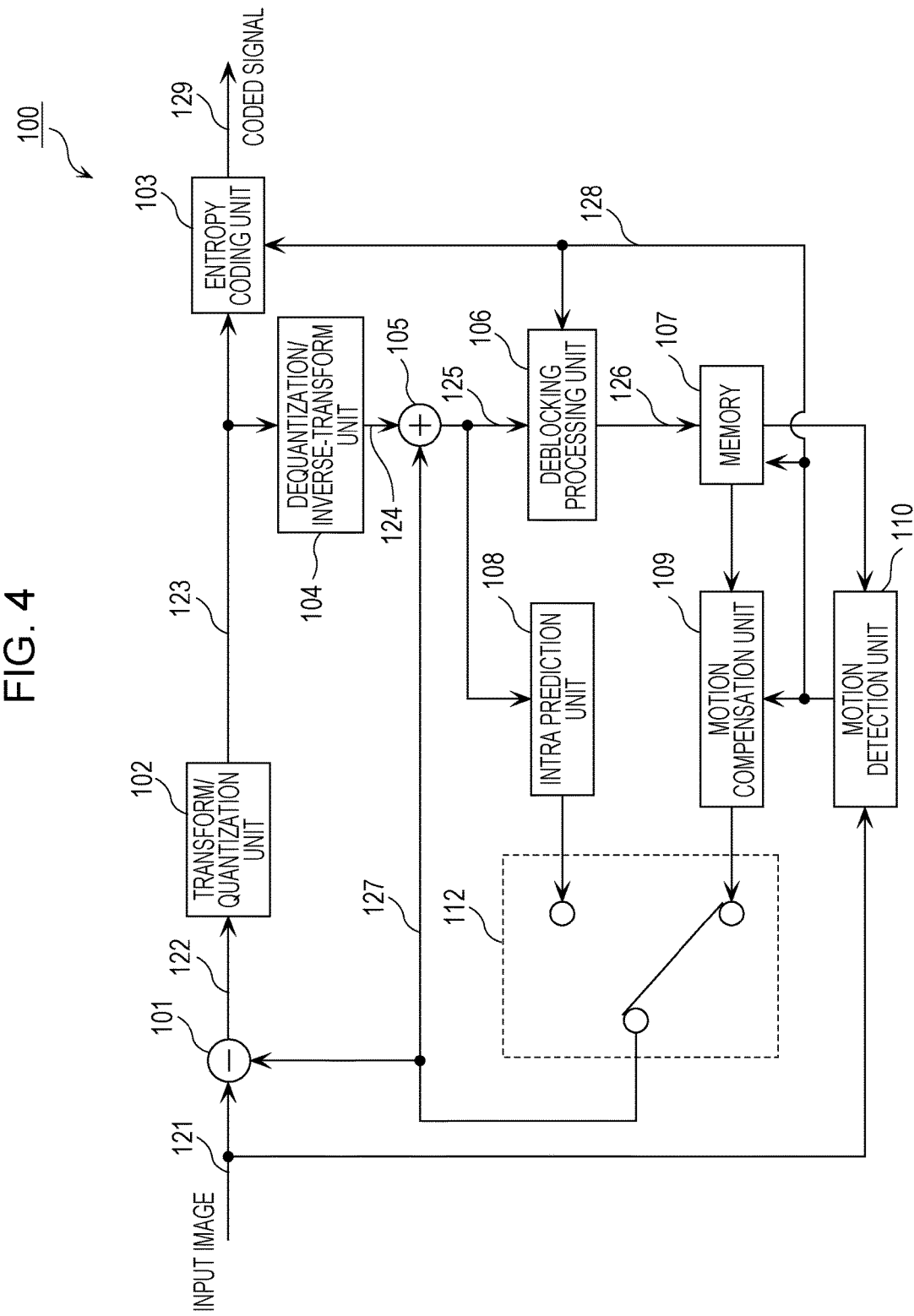
FIG. 4 is a block diagram of an image encoding apparatus according to a first exemplary embodiment.

A configuration of an image encoding apparatus 100 according to the first exemplary embodiment will be described first. FIG. 4 is a block diagram illustrating an example of a configuration of the image encoding apparatus 100 according to the first exemplary embodiment.

The image encoding apparatus 100 compresses and encodes an input image 121 so as to generate a coded signal 129 (i.e., a coded bitstream). For example, the input image 121 is input to the image encoding apparatus 100 on a block-by-block basis. The image encoding apparatus 100 performs transform, quantization, and variable-length coding on the input image 121 that has been input thereto so as to generate the coded signal 129.

The image encoding apparatus 100 illustrated in FIG. 4 includes a subtracter 101, a transform/quantization unit 102, an entropy coding unit 103, a dequantization/inverse-transform unit 104, an adder 105, a deblocking processing unit 106, a memory 107, an intra prediction unit 108, a motion compensation unit 109, a motion detection unit 110, and a switch 112.

The subtracter 101 calculates a residual signal (also called a prediction error or a differential signal) 122, which is a difference between the input image 121 and a prediction signal 127.

The transform/quantization unit 102 converts the residual signal 122 represented in the spatial domain into transform coefficients represented in the frequency domain. For example, the transform/quantization unit 102 performs discrete cosine transform (DCT) on the residual signal 122 so as to generate transform coefficients. In addition, the transform/quantization unit 102 quantizes the transform coefficients to generate a quantization coefficient 123.

The entropy coding unit 103 performs variable-length coding on the quantization coefficient 123 so as to generate the coded signal 129. In addition, the entropy coding unit 103 encodes motion data 128 (e.g., a motion vector) detected by the motion detection unit 110, includes the resulting signal in the coded signal 129, and outputs the coded signal 129.

The dequantization/inverse-transform unit 104 performs inverse transform on restored transform coefficients so as to obtain a restored residual signal 124. Note that the restored residual signal 124 does not match the residual signal 122 generated by the subtracter 101 because part of information is lost through quantization. That is, the restored residual signal 124 contains a quantization error.

The adder 105 adds the restored residual signal 124 and the prediction signal 127 together so as to generate a locally decoded image 125.

The deblocking processing unit 106 performs a deblocking filtering process on the locally decoded image 125 so as to generate a locally decoded image 126.

The memory 107 is a memory for storing a reference image for use in motion compensation. Specifically, the memory 107 stores the locally decoded image 126 that has undergone the deblocking filtering process. The memory 107 also stores processed motion data.

The intra prediction unit 108 performs intra prediction so as to generate a prediction signal (i.e., an intra prediction signal). Specifically, the intra prediction unit 108 performs intra prediction by referring to neighboring images of an encoding-target block (i.e., the input image 121) in the locally decoded image 125 generated by the adder 105 so as to generate an intra prediction signal.

The motion detection unit 110 detects the motion data 128 (e.g., a motion vector) between the input image 121 and the reference image stored in the memory 107. The motion detection unit 110 also performs computations related to a skip vector and a merge vector by using motion data that has been encoded.

The motion compensation unit 109 performs motion compensation based on the detected motion data 128 so as to generate a prediction signal (i.e., an inter prediction signal).

The switch 112 selects either the intra prediction signal or the inter prediction signal, and outputs the selected signal as the prediction signal 127 to the subtracter 101 and the adder 105.

With the configuration described above, the image encoding apparatus 100 according to the first exemplary embodiment compresses and encodes image data.

Figure 5:
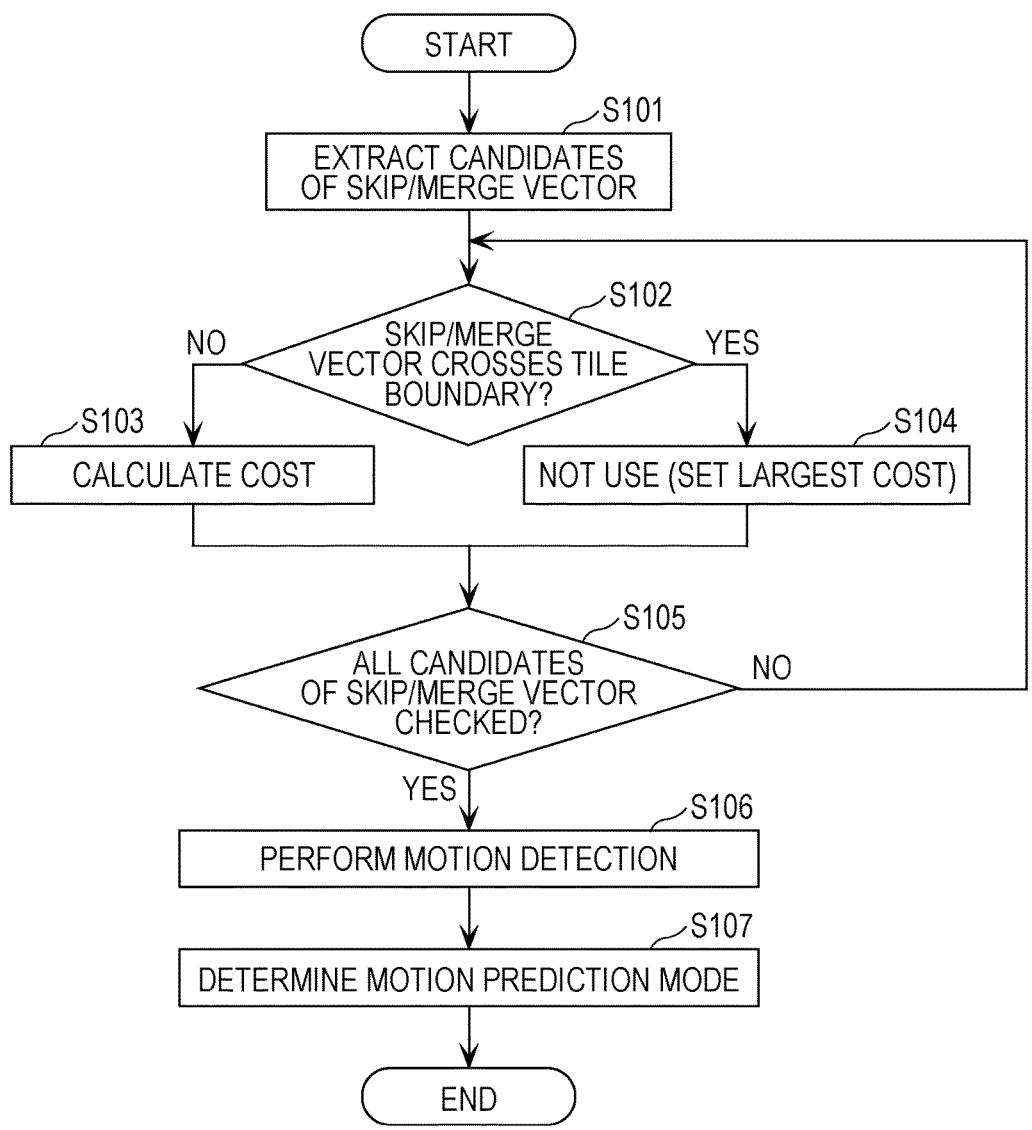
FIG. 5 is a flowchart of an image encoding process according to the first exemplary embodiment.

An operation of the image encoding apparatus 100 will be described next. FIG. 5 is a flowchart illustrating an overview of a process performed by the image encoding apparatus 100 according to the first exemplary embodiment to determine a motion prediction mode.

In the process illustrated in FIG. 5, a constraint is imposed on the reuse of motion vectors. First, the motion detection unit 110 obtains motion information that serves as skip/merge vector candidates from the memory 107 (S101). The motion detection unit 110 also derives skip/merge vector candidates from neighboring blocks illustrated in FIGS. 3A and 3B, for example. Specifically, the motion detection unit 110 uses the methods described in JCTVC-N1005 as a skip vector derivation method and a merge vector derivation method.

The motion detection unit 110 then determines whether or not the obtained skip/merge vector crosses a tile boundary (S102). Specifically, the motion detection unit 110 converts the starting point of a motion vector of a neighboring block into coordinates of the current target block and determines whether or not the reference destination of the resulting motion vector is in another tile. The motion detection unit 110 may determine that the resulting motion vector crosses a tile boundary if the reference destination of the motion vector is a fractional pixel whose distance from the tile boundary is less than two-and-three-quarter pixels even in the case where the reference destination of the resulting motion vector is not in another tile. The state where a skip/merge vector crosses a tile boundary is, in order words, the case where the skip/merge vector refers to another tile (i.e., the case where a prediction image is generated using pixel values in another tile).

If the resulting motion vector does not cross a tile boundary (NO in S102), the motion detection unit 110 calculates a cost incurred by the use of the motion vector (S103). The term "cost" refers to a cost value that is calculated by performing weighted addition or the like on an amount of code used to represent the skip/merge vector and a difference between the prediction image (i.e., an image referred to by the motion vector) and the input image subjected to encoding. The motion detection unit 110 also calculates a cost value incurred by motion detection. The plurality of cost values are compared with each other, and an optimum motion prediction mode is determined. In the case where the cost values are defined in this manner, a motion prediction mode that gives the minimum cost value is the optimum motion prediction mode. Note that the cost calculation method is not limited to this particular method; however, for ease of explanation, a description will be given herein of the case where a motion prediction mode that gives the minimum cost value is the optimum motion prediction mode.

If it is determined that the skip/merge vector crosses a tile boundary (YES in S102), the motion detection unit 110 determines not to use the skip/merge vector (S104). For example, the motion detection unit 110 can configure the skip/merge vector not to be used by setting the cost value of the skip/merge vector to the largest value. Note that the value that is set may be not necessarily the largest value and may be any value as long as the skip/merge vector is not selected as the optimum value. In addition, the use of the skip/merge vector may be prohibited using a method other than the method for changing the cost value.

If processing has not been completed for all the skip/merge vector candidates that have been obtained in step S101 (NO in S105), the motion detection unit 110 performs the cost calculations for the next skip/merge vector candidate (S102 to S104).

If the cost calculations have been completed for all the skip/merge vector candidates (YES in S105), the motion detection unit 110 performs motion detection on the target block and calculates a cost value incurred by the motion detection (S106). Note that a search range of the motion detection is set so that the search range does not go beyond tile boundaries. In addition, fractional pixels located at a distance of less than two-and-three-quarter pixels from tile boundaries are also excluded from the search range.

Lastly, the motion detection unit 110 determines a motion prediction mode corresponding to the smallest cost value among all the calculated cost values as a motion prediction mode to be used (S107).

As described above, the motion detection unit 110 determines whether or not the skip/merge vector crosses a tile boundary. In this way, inter-tile pixel-data reference can be avoided even for pictures at different time points. Note that the flowchart of FIG. 5 is merely an example, and the processing overhead can be further reduced by modifying the flow of the process.

For example, in the process illustrated in FIG. 5, the motion detection unit 110 determines whether or not the skip/merge vector crosses a tile boundary based on whether or not a distance of the reference destination of the skip/merge vector from the tile boundary is less than two-and-three-quarter pixels in the case where the reference destination is a fractional pixel. In this case, however, the determination as to whether the reference destination is a fractional pixel needs to be performed each time, which may increase the circuitry scale.

To avoid the increased circuitry scale, the motion detection unit 110 may determine whether or not the distance of the reference destination from a tile boundary is less than three pixels regardless of whether the reference destination is a fractional pixel and may determine that the skip/merge vector crosses the tile boundary if the distance of the reference destination from the tile boundary is less than three pixels. In this case, for example, an integer pixel at the same position as the target block is the reference destination (i.e., a vector of (0, 0)) is excluded from the processing target. However, the motion detection unit 110 may permit a vector of (0, 0) exceptionally. This configuration excludes the case where the reference destination indicates an integer pixel which is shifted from the target block by one or two pixels. That is, the motion detection unit 110 may determine that the skip/merge vector crosses a tile boundary in the case where the reference destination is located at a distance of less than three pixels from a tile boundary unless the motion vector is not equal to (0, 0). In this way, a decrease in the coding efficiency can be suppressed. In addition, simple processing can be performed for the same position (i.e., the vector of (0, 0)). Thus, the method described above can suppress a decrease in the coding efficiency while reducing the processing overhead.

Figure 6:
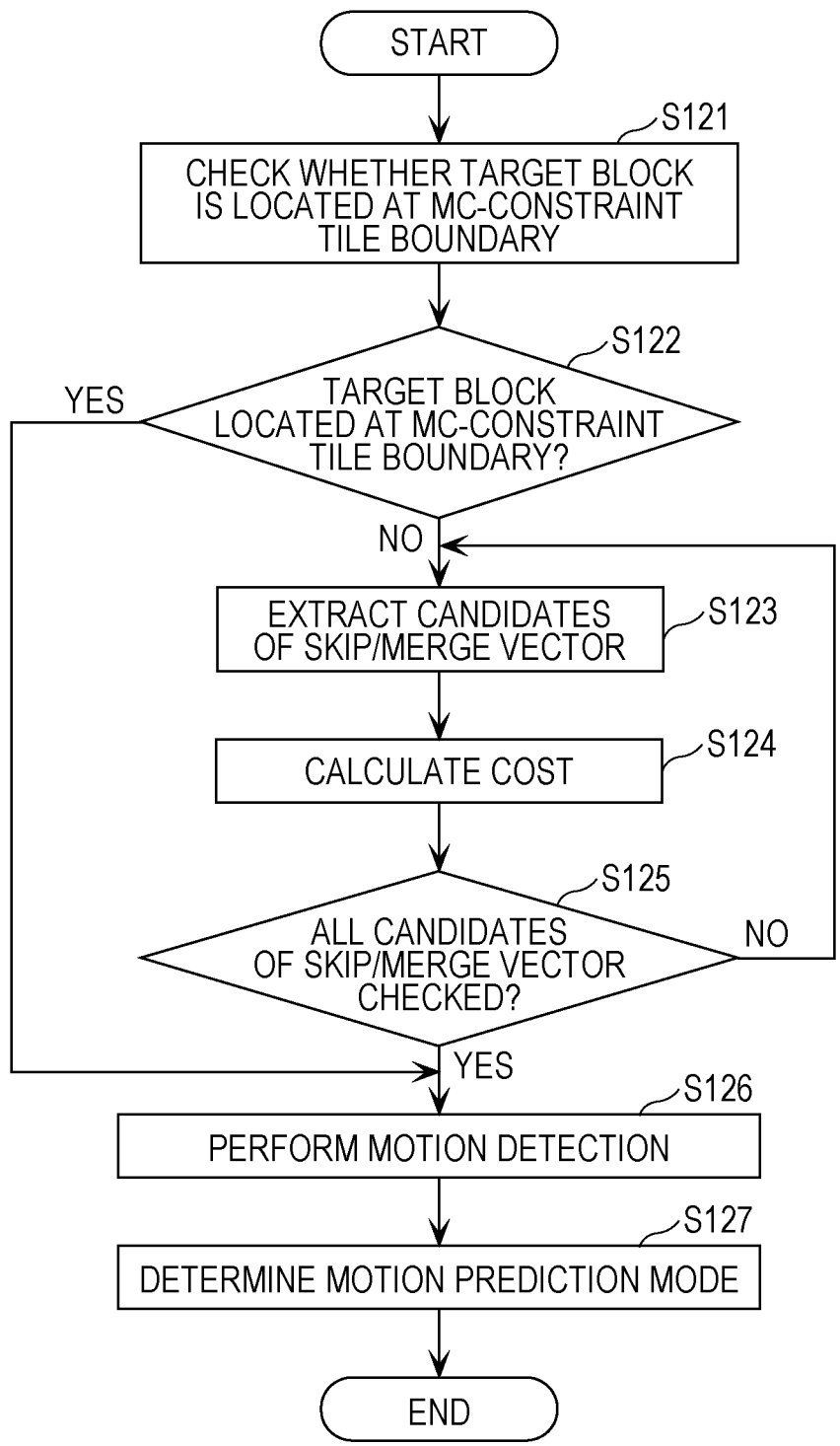
FIG. 6 is a flowchart of a modification of the image encoding process according to the first exemplary embodiment.

A modification which further reduces the processing overhead will be described with reference to FIG. 6. FIG. 6 is a flowchart of a modification of the process performed by the image encoding apparatus 100 according to the first exemplary embodiment to determine the motion prediction mode.

In the process illustrated in FIG. 6, the motion detection unit 110 first checks whether or not the target block is located at a tile boundary of an MC-constrained tile (S121). Specifically, the motion detection unit 110 determines that the target block is located at a tile boundary of an MC-constrained tile if the target block is a block located at a distance of a certain number blocks or less from the tile boundary of the MC-constrained tile. Here, the term "block" may refer to a unit block of an encoding process, which is called a coding block, or a unit block called a largest coding unit (LCU) or a coding tree block (CTB).

If the target block is not located at a tile boundary (NO in S122), the motion detection unit 110 extracts skip/merge vector candidates as in step S101 (S123). The motion detection unit 110 then calculates cost values as in step S103 (S124) and determines whether or not all the skip/merge vector candidates have been checked as in step S105 (S125).

If the target block is located at a tile boundary (YES in S122), the motion detection unit 110 skips steps S123 to S125 and thus does not perform extraction of skip/merge vector candidates and calculation of cost values.

The motion detection unit 110 then detects a motion vector as in step S106 (S126) and determines the motion prediction mode as in step S107 (S127).

The process described above removes a need of block-based boundary determination and consequently can reduce the processing overhead more than the process illustrated in FIG. 5.

The motion detection unit 110 may calculate cost values exceptionally when the vector of (0, 0) is extracted as a candidate even if the target block is located at a tile boundary (YES in S122). This processing increases an amount of calculation a little but the processing performed for the vector of (0, 0) is simple, and thus an increase in the processing overhead is small.

The process described above can implement a high-speed process in the case where a plurality of tiles are processed in parallel by independent encoding or decoding circuits, for example.

As described above, the image encoding apparatus 100 according to the first exemplary embodiment partitions an image into a plurality of tiles and encodes a target block included in the plurality of tiles by using one of a plurality of prediction modes which include a prediction mode in which a motion vector of a neighboring block of the target block is used. For example, the plurality of prediction modes include the merge mode or the skip mode. The merge mode and the skip mode are prediction modes in which a motion vector of a neighboring block of the target block is used without being processed. That is, in the merge mode and the skip mode, a difference between the motion vectors is not encoded. Note that processing such as time scaling is used also in the merge mode and the skip mode. In addition, the image encoding apparatus 100 encodes the target block without using a motion vector that refers to a block included in a tile different from the target tile including the target block. The motion vector that refers to a block included in a tile different from the target tile including the target block is at least one of a motion vector whose reference destination is in another tile or a motion vector whose reference destination is a fractional pixel that refers to an integer pixel in another block as described above.

Specifically, as illustrated in FIG. 5, the image encoding apparatus 100 determines whether or not a motion vector of a neighboring block refers to a block included in a tile different from the target tile (S102). In addition, if it is determined that the motion vector of the neighboring block refers to a block included in a tile different from the target tile (YES in S102), the image encoding apparatus 100 encodes the target block by using a motion vector other than this motion vector (i.e., without using this motion vector) (S104).

Alternatively, as illustrated in FIG. 6, the image encoding apparatus 100 determines whether or not the target block is located at a certain distance or less from a tile boundary (S121). If it is determined that the target block is located at the certain distance or less from a tile boundary (YES in S122), the image encoding apparatus 100 encodes the target block by using a prediction mode other than a prediction mode (i.e., the merge mode or the skip mode) in which a motion vector of a neighboring block is used, that is, without using a prediction mode in which a motion vector of a neighboring block is used.

The configuration described above allows the image encoding apparatus 100 to perform a process at MC-constrained tile boundaries at a high speed. In this way, the image encoding apparatus 100 and the corresponding image encoding method enable generation of a bitstream that can be processed by an image decoding apparatus at a high speed.

Second Exemplary Embodiment

In a second exemplary embodiment, an image decoding method for decoding a coded stream that implements parallel processing will be described. Specifically, in the second exemplary embodiment, an image decoding method for decoding a coded bitstream generated by the image encoding apparatus 100 according to the first exemplary embodiment will be described.

Further, in the second exemplary embodiment, an image decoding method and an image decoding apparatus that implement parallel decoding while suppressing the image quality degradation even in the case where a bitstream including a signal for which reference is made across a tile boundary is received.

Figure 7:
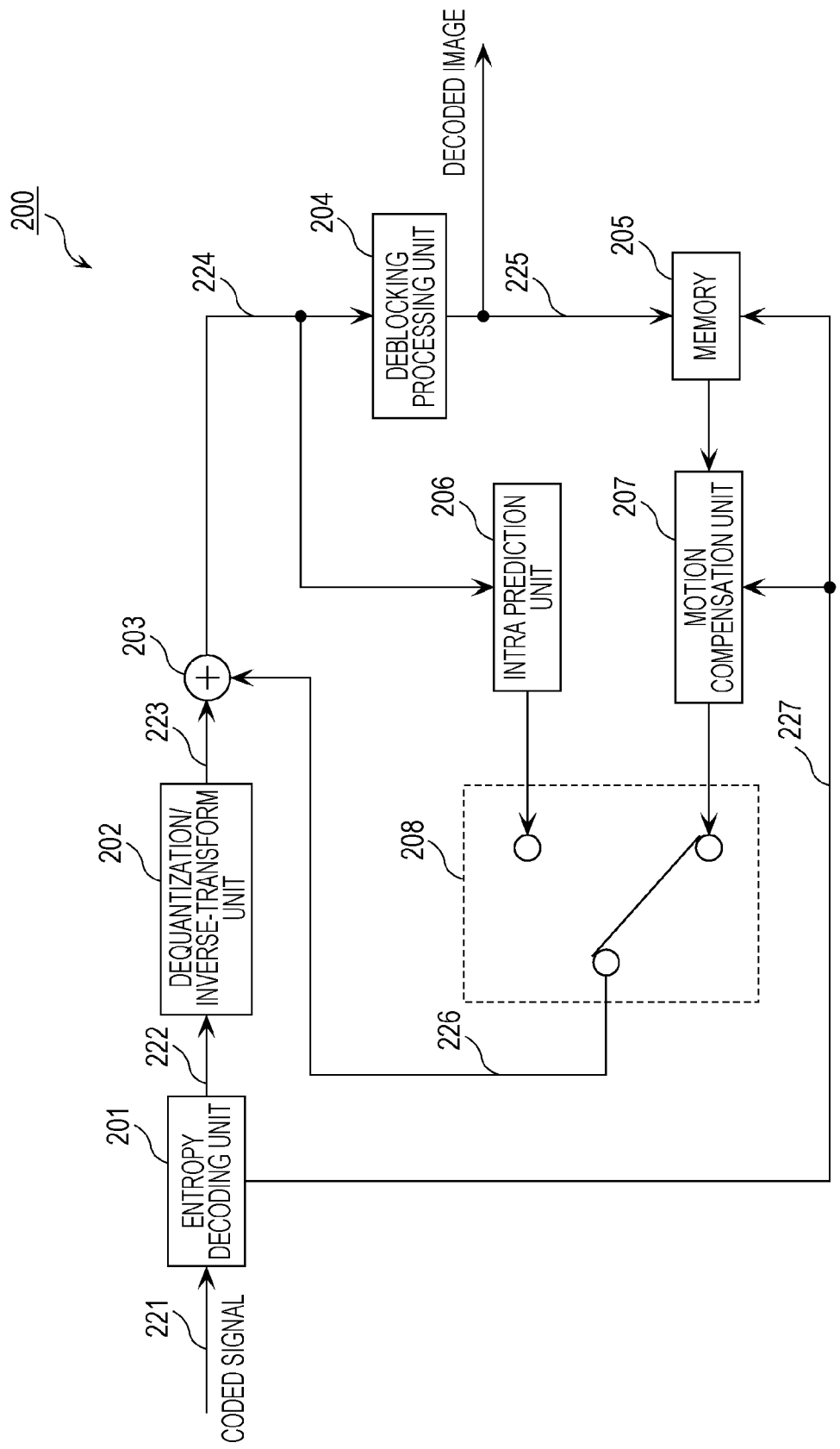
FIG. 7 is a block diagram of an image decoding apparatus according to a second exemplary embodiment.

A configuration of an image decoding apparatus 200 according to the second exemplary embodiment will be described first. FIG. 7 is a block diagram illustrating an example of a configuration of the image decoding apparatus 200 according to the second exemplary embodiment.

The image decoding apparatus 200 generates a decoded image 225 from a coded signal 221 which has been obtained by compressing and encoding an image. Here, the coded signal 221 is, for example, the coded signal 129 generated by the image encoding apparatus 100 described above. For example, the coded signal 221 is input as a decoding-target signal to the image decoding apparatus 200 on a block-by-block basis. The image decoding apparatus 200 performs variable-length decoding, dequantization, and inverse transform on the decoding-target signal input thereto so as to restore the decoded image 225.

The image decoding apparatus 200 illustrated in FIG. 7 includes an entropy decoding unit 201, an dequantization/inverse-transform unit 202, an adder 203, a deblocking processing unit 204, a memory 205, an intra prediction unit 206, a motion compensation unit 207, and a switch 208.

The entropy decoding unit 201 performs variable-length decoding on the coded signal 211 (i.e., a coded stream) so as to obtain a quantization coefficient 222. Here, the coded signal 221 (i.e., an input stream) is a decoding-target signal and corresponds to data of each block of coded image data. The entropy decoding unit 201 also obtains motion data 227 from the coded signal 221 and outputs the obtained motion data 227 to the motion compensation unit 207.

The dequantization/inverse-transform unit 202 dequantizes the quantization coefficient 222 restored by the entropy decoding unit 201 to restore transform coefficients. The dequantization/inverse-transform unit 202 then performs inverse transform on the restored transform coefficients to restore a residual signal (also called a prediction error or a differential signal) 223.

The adder 203 adds the restored residual signal 223 and a prediction signal 226 together so as to generate a decoded image 224.

The deblocking processing unit 204 performs a deblocking filtering process on the generated decoded image 224 so as to generate the decoded image 225. The decoded image 225 which has undergone the deblocking filtering process is output to outside.

The memory 205 is a memory for storing a reference image for use in motion compensation. Specifically, the memory 205 stores the decoded image 225 which has undergone the deblocking filtering process.

The intra prediction unit 206 performs intra prediction so as to generate a prediction signal (i.e., an intra prediction signal). Specifically, the intra prediction unit 206 performs intra prediction by referring to a neighboring image of a decoding-target block (i.e., the coded signal 221) in the decoded image 224 generated by the adder 203 so as to generate an intra prediction signal.

The motion compensation unit 207 performs motion compensation based on the motion data 227 output by the entropy decoding unit 201 so as to generate a prediction signal (i.e., an inter prediction signal).

The switch 208 selects either the intra prediction signal or the inter prediction signal and outputs the selected signal as the prediction signal 226 to the adder 203.

With the configuration described above, the image decoding apparatus 200 according to the second exemplary embodiment decodes the coded signal 221, which has been obtained by compressing and encoding an image, so as to obtain the decoded image 225.

Before describing a process according to the second exemplary embodiment, a description will be given, with reference to FIG. 8, of a process that is performed when a coded bitstream that does not conform to the aforementioned intension is decoded using a method not including a characteristic process of the second exemplary embodiment.

Figure 8:
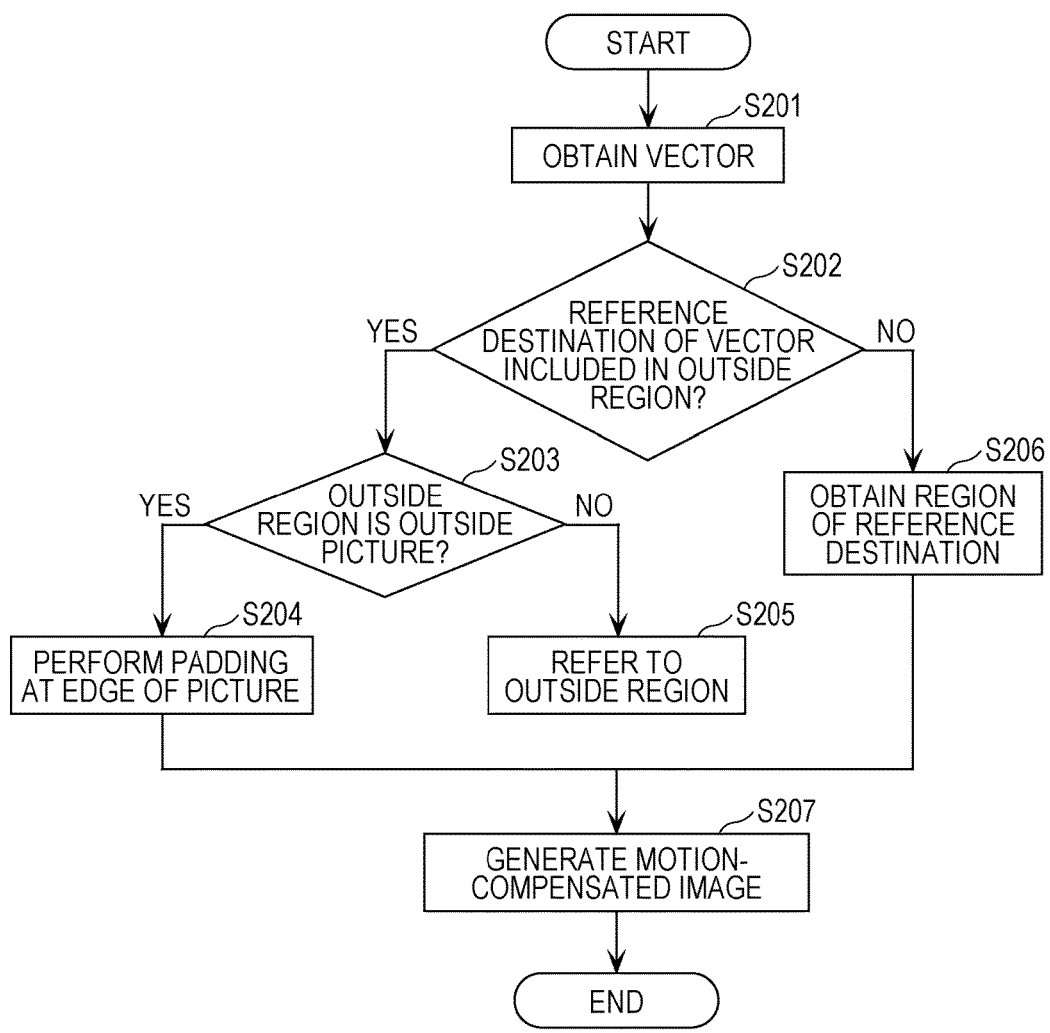
FIG. 8 is a flowchart illustrating an example of a motion compensation process.

FIG. 8 is a flowchart illustrating an overview of a motion compensation process performed in the case where a bitstream that does not conform to an intension expected in the second exemplary embodiment is received. Note that this motion compensation process does not include a characteristic process according to the second exemplary embodiment.

The motion compensation unit 207 obtains a motion vector (i.e., the motion data 227) from the coded bitstream (i.e., the coded signal 211) (S201).

The motion compensation unit 207 then determines whether or not a reference destination of the motion vector is included in an outside region (S202). Here, the term "outside region" refers to a region outside a picture represented by an image signal or a region outside an MC-constrained tile in the case of MC-constrained tiles.

If it is determined that the reference destination of the motion vector is included in an outside region (YES in S202), the motion compensation unit 207 determines whether the outside region is a region outside a picture (S203).

If the outside region is a region outside a picture (YES in S203), the motion compensation unit 207 performs a process for iterating a pixel value located at the edge of the picture (i.e., a padding process) (S204). Note that this padding process is the same as a process (described below) illustrated in FIG. 10B, for example. The motion compensation unit 207 then generates a motion-compensated image by referring to the image that has undergone the padding process (S207).

If the outside region is not a region outside a picture (if the target tile is an MC-constrained tile and the reference destination of the motion vector is included in a tile different from the target tile) (NO in S203), the motion compensation unit 207 refers to the outside region (S205). This process is an operation that is not defined by an ordinary decoding process and thus results in an error, and the decoding process stops. Alternatively, some decoding apparatuses may refer to an unexpected memory address and read out uncertain data at the memory address as a reference image. As a result, the image decoding apparatuses are no longer able to continue the decoding operation or generate an image of a very low quality by referencing to the uncertain data.

If the reference destination of the motion vector is not in an outside region (NO in S202), the motion compensation unit 207 obtains a target region of the reference destination as in the typical process (S206), and generates a motion-compensated image by using an image of the obtained target region (S207).

Note that literatures such as JCTVC-N1005 do not define how to decode the aforementioned bitstream.

As described above, the use of such a method makes image decoding apparatuses unable to decode a coded bitstream or decreases the image quality of a decoded image.

As described in the first exemplary embodiment, a process performed at MC-constrained tile boundaries is complicated and image encoding apparatuses may perform such a complicated process incorrectly in some cases.

In the second exemplary embodiment, a description will be given of an image decoding method that can suppress the image quality degradation without stopping a decoding process even in such cases.

FIG. 9 is a flowchart illustrating an overview of a process performed by the image decoding apparatus 200 according to the second exemplary embodiment to determine a motion prediction mode.

As in step S201 illustrated in FIG. 8, the motion compensation unit 207 obtains a motion vector (i.e., the motion data 227) from a coded bitstream (i.e., the coded signal 211) (S301). The motion compensation unit 207 then determines whether or not the reference destination of the motion vector is included in an outside region (S302) as in step S202.

If it is determined that the reference destination is included in an outside region (YES in S302), the motion compensation unit 207 determines whether or not the outside region is a region outside a picture (S303). If the outside region is a region outside a picture (YES in S303), the motion compensation unit 207 performs a padding process (S304) and generates a motion-compensated image by referring to the image that has undergone the padding process (S307).

If the outside region is not a region outside a picture (if the target tile is an MC-constrained tile and the motion vector crosses the tile boundary) (NO in S303), the motion compensation unit 207 performs a process for handing reference to an outside region (S305). The process for handling reference to an outside region is a process for generating pixel values in the outside region by compensation. Details about the process for handling reference to an outside region will be described later.

In addition, the case where a motion vector crosses a tile boundary refers to the case where the reference destination of the motion vector is included in a tile different from the target tile and the case where an integer pixel in another tile is referred to during calculation of a value of a fractional pixel.

By defining this process, suspension of the image decoding apparatus can be avoided. In addition, in the case where an outside region is unintentionally referred to on the encoding side, a mismatch (indicating that an image locally decoded on the encoding side differs from a decoded image) occurs; however, the process for handling reference to an outside region can improve the image quality (suppress the image quality degradation) compared with the case where an image stored at an uncertain address of the memory is used as a motion-compensated image.

On the other hand, the encoding side can reduce processing overhead at boundaries by using a method different from that according to the first exemplary embodiment as a result of performing the similar motion compensation. A mismatch can be avoided as a result of the image decoding apparatus 200 performing the same process. With this configuration, an image encoding apparatus and an image decoding apparatus can be implemented which can cope with the above-described difficulties by performing a simple process, which is different from the method of the standard described in JCTVC-N1005.

Then, the motion compensation unit 207 generates a motion-compensated image by using an image that has undergone the process for handling reference to an outside region (S307).

If the reference destination of the motion vector is not in an outside region (NO in S302), the motion compensation unit 207 obtains a target region of the reference destination as in a typical process as in step S206 (S306) and generates a motion-compensated image (S307).

Figure 10A:
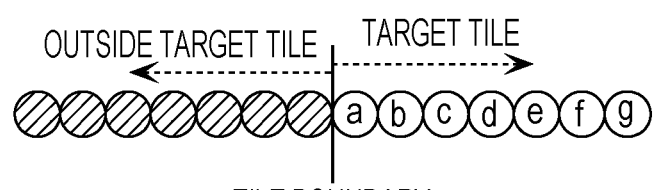
FIGS. 10A to 10D are diagrams for describing a compensation process for pixels in an outside region in accordance with the second exemplary embodiment.

The aforementioned process for handling reference to an outside region will be described with reference to FIGS. 10A to 10D. FIGS. 10A to 10D are diagrams illustrating examples of special processes performed when a tile different from the target tile is referred to in the case where MC-constrained tiles are used. FIG. 10A illustrates an example of the process performed in the case described in FIG. 8. Because the process for a region outside the target tile is not defined, the decoding process may stop as a result of the image decoding apparatus using uncertain values on the memory if the image decoding apparatus has managed to refer to this memory area.

Figure 10B:
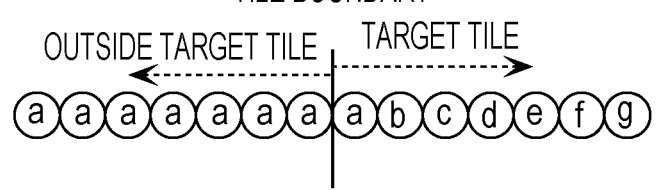

A process illustrated in FIG. 10B is the same as the process used at an edge of a picture in step S304 and is also called a padding process. For example, as illustrated in FIG. 10B, a target tile includes pixels a, b, c, d, e, f, and g sequentially arranged in this order from the tile boundary. In this case, the motion compensation unit 207 fills values of pixels located outside the target tile by iterating the value of the pixel a located at the tile boundary. The use of this process also in the process for handling reference to an outside region of MC-constrained tiles allows circuitry to be used in common with the process performed outside a picture, which consequently can reduce the circuitry scale.

Figure 10C:
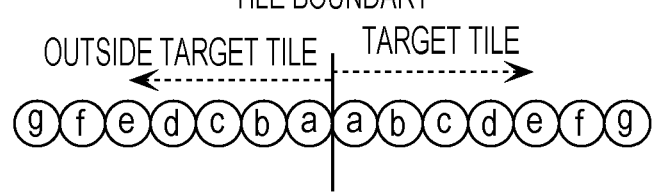

The motion compensation unit 207 may perform, as a process for handling a region outside an MC-constrained tile, a process different from the process for handling a region outside a picture. For example, as illustrated in FIG. 10C, the motion compensation unit 207 generates pixel values at locations outside the target tile by copying the pixels a, b, c, d, e, f, and g with respect to a mirror image of the tile boundary. A result obtained by the above-described padding process may visually draw attentions in some cases because the same value is consecutively output abruptly. In contrast, this method is a process based on the continuity of video and thus can improve the visible image quality. For example, this method can improve the image quality achieved by the padding process in video including a gradual change, such as a gradation image.

Figure 10D:
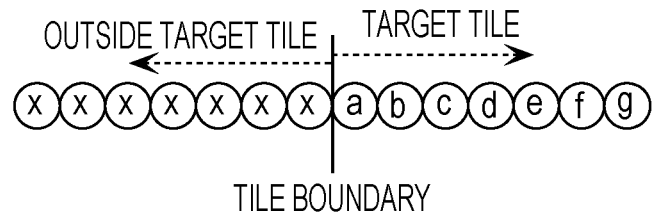

In addition, as another method, the motion compensation unit 207 may fill pixel values at locations outside the target tile by using a certain value X as illustrated in FIG. 10D. The case where the certain value X is equal to the pixel value of the pixel a corresponds to the case illustrated in FIG. 10B. The motion compensation unit 207 may use an average of pixel values of the pixels a, b, c, and d located in the vicinity of the tile boundary as the certain value X, for example. Alternatively, the motion compensation unit 207 may select or calculate, as the certain value X, a value that makes a change in pixel values smaller at the tile boundary. When this method is used, the processing overhead increases compared with the case of FIG. 10B but the image quality degradation can be suppressed.

As described above, by defining a process for handling reference to an outside region, the image decoding apparatus 200 can perform a decoding process while suppressing the image quality degradation and avoiding suspension of the decoding process even in the case where reference across a boundary of an MC-constrained tile is unexpectedly exists in a bitstream, for example.

Figure 11:
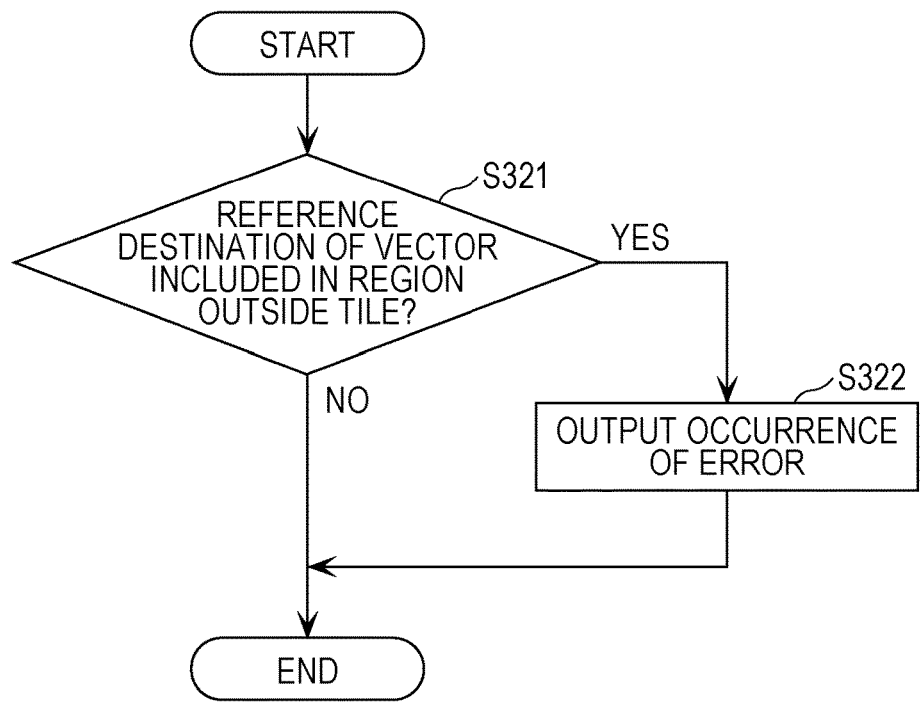
FIG. 11 is a flowchart of a motion compensation process according to the second exemplary embodiment.

Alternatively, as illustrated in FIG. 11, the image decoding apparatus 200 may output a message indicating occurrence of an error (S322) if the motion compensation unit 207 has determined that the reference destination of a motion vector is included in a region outside the target tile (YES in S321).

With this configuration, the image decoding apparatus 200 performs a decoding process while performing detection of an error and thus can grasp that a decoded result contains a mismatch in the case where an error has been detected. As a result, the image decoding apparatus 200 is no longer required to detect an unnecessary mismatch and can keep performing playback. In addition, the error detection result is provided to a provider of the coded bitstream, which consequently enables improvement (e.g., introduction of a mechanism according to the first exemplary embodiment) of the image encoding apparatus.

As described above, the image decoding apparatus 200 according to the second exemplary embodiment decodes a coded bitstream generated by the image encoding apparatus 100 according to the first exemplary embodiment.

In addition, the image decoding apparatus 200 according to the second exemplary embodiment performs motion compensation on a target block included in a plurality of tiles by using a prediction mode (i.e., the merge mode or the skip mode) in which a motion vector of a neighboring block of the target block is used.

If the motion vector of the neighboring block refers to a reference block included in a tile different from the target tile including the target block, the image decoding apparatus 200 compensates for pixel values of pixels included in the reference block. Specifically, the image decoding apparatus 200 compensates for pixels values of pixels included in the reference block by using pixel values of pixels included in the target block.

For example, as illustrated in FIG. 10B, the image decoding apparatus 200 compensates for pixel values of pixels included in the reference block by copying a pixel value of a pixel that is included in the target block and is closest to the reference block as pixel values of a plurality of pixels included in the reference block.

Alternatively, as illustrated in FIG. 10C, in the case where the target block and the reference block are located adjacent to each other, the image decoding apparatus 200 compensates for pixel values of pixels included in the reference block by copying pixel values of a plurality of pixels included in the target block with respect to a mirror image of the boundary as the pixel values of a plurality of pixels included in the reference block.

Alternatively, as illustrated in FIG. 10D, the image decoding apparatus 200 calculates an average of pixel values of a plurality of pixels included in the target block and compensates for pixel values of a plurality of pixels included in the reference block by using the average.

The image decoding apparatus 200 also performs motion compensation by using compensated pixel values.

In this way, the image decoding apparatus 200 can perform a process for handling reference to an outside region on an unexpected encoded stream described before. That is, the image decoding apparatus 200 can avoid suspension of the decoding process even if the target tile is an MC-constrained tile. In this way, a more stabilized operation of the image decoding apparatus 200 can be implemented.

In addition, by introducing this method into the image encoding apparatus 100, a higher processing speed can be implemented in the image encoding apparatus 100. That is, the motion compensation unit 109 included in the image encoding apparatus 100 may perform a process similar to that of the motion compensation unit 207 according to the second exemplary embodiment. The image encoding apparatus 100 uses, as a reference image, an image generated through the above-described process for handling reference to an outside region which is performed in the case where a motion vector refers to another tile. In this way, the encoding process can be simplified and the circuitry scale can be reduced. In addition, in this case, a system enabling a reduction in the circuitry scale both in the image encoding apparatus 100 and the image decoding apparatus 200 can be implemented, as a result of the image decoding apparatus 200 including the similar motion compensation unit 207.

That is, the above-described process can be implemented as the image decoding method in the image decoding apparatus 200 and as the image encoding method in the image encoding apparatus 100. In addition, the above-described process can be implemented as a motion compensation method in the image decoding apparatus 200 or the image encoding apparatus 100.

Third Exemplary Embodiment

In a third exemplary embodiment, a structure of a coded bitstream that enables parallel processing will be described. In the third exemplary embodiment, a bitstream includes information that allows the image decoding apparatus 200 to perform parallel processing easily. Specifically, a bitstream includes information indicating where a mismatch occurs. That is, a bitstream includes information indicating the case where another tile is referred to during motion prediction and motion compensation processes in the case where a picture is partitioned into tiles and is encoded.

Figures 12, 13:
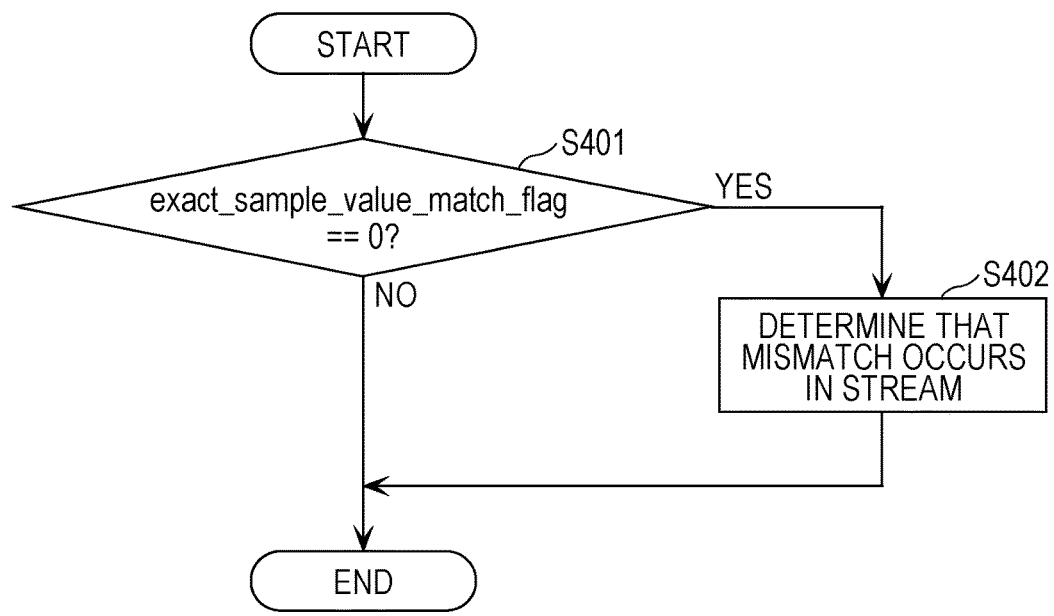
FIG. 12 is a diagram illustrating an example of syntax for a coded bitstream.
FIG. 13 is a flowchart illustrating an example of how syntax is processed.

FIG. 12 is a diagram illustrating a part of a syntax structure of a coded bitstream of MC-constrained tiles according to the related art. The syntax structure "motion_constrained_tile_sets( )" is an information set representing regions of MC-constrained tiles. By referring to this information, the image decoding apparatus 200 can know that the target stream does not make reference across a tile boundary. In addition, this syntax structure includes a flag "exact_sample_value_match_flag". An operation related to this flag will be described with reference to FIG. 13.

FIG. 13 is a flowchart of an operation related to the flag "exact_sample_value_match_flag". As illustrated in FIG. 13, if the flag "exact_sample_value_match_flag" is equal to 0 (YES in S401), the image decoding apparatus 200 determines that a stream includes a mismatch (S402).

A process using this information involves the following difficulties. There are three reasons why a mismatch occurs in MC-constrained tiles.

(1) In the case where a process for applying a loop filter to a tile boundary is included, the filtering process is performed even on MC-constrained tiles by using pixels located outside the boundary. As a result, a mismatch occurs between a locally decoded image obtained during encoding and a decoded image. (2) A mismatch occurs between a locally decoded image obtained during encoding and a decoded image as a result of a motion vector (including a skip/merge vector) referring to a region outside the tile boundary. (3) A mismatch occurs between a locally decoded image obtained during encoding and a decoded image as a result of reference to a region outside a tile boundary in order to generate values of pixels having fractional precision.

Because these three cases are not distinguished from one anther with the above described method, it is difficult for the image decoding apparatus 200 to identify which type of mismatch occurs. As a result, it is difficult for the image decoding apparatus 200 to perform a decoding process appropriate for the type of the mismatch.

A syntax structure of a coded bitstream according to the third exemplary embodiment will be described below. FIGS. 14A to 14C are diagrams illustrating examples of the syntax structure of a coded bitstream according to the third exemplary embodiment. Specifically, FIGS. 14A to 14C are diagrams illustrating examples of the syntax "motion_constrained_tile_sets" included in a coded bitstream according to the third exemplary embodiment. Note that this information is called supplemental enhancement information (SEI) and is treated as supplemental information of the coded bitstream.

In the example illustrated in FIG. 14A, if the aforementioned flag "exact_sample_value_match_flag" is equal to 0, a coded bitstream includes a flag "filtering_mismatch_flag" which indicates that the mismatch is caused by a loop filter among the three reasons of the mismatch described above and a flag "motion_constraint_mismatch_flag" which indicates that the mismatch is cased by reasons other then a loop filter. The flag "filtering_ mismatch_flag" equal to 1 indicates that a mismatch is caused by a loop filter. The flag "motion_constraint_mismatch_flag" equal to 1 indicates that a mismatch is caused by reasons other than a loop filter. By hierarchically providing flags for identifying reasons of the mismatch in this way, an amount of code can be reduced when no mismatch occurs.

In the example illustrated in FIG. 14B, the coded bitstream does not include the flag "exact_sample_value_match_flag", instead includes flags "inloop_filtering_mismatch_flag" and "motion_constraint_mismatch_flag". Note that the flag "inloop_filtering_mismatch_flag" has the same meaning as the flag "filtering_mismatch_flag". This configuration is beneficial in that an amount of code is reduced in the case where a stream including a mismatch is frequently generated.

In the example illustrated in FIG. 14C, the flag "motion_constraint_mismatch_flag" is separated into a flag "fractional_point_mismatch_flag" which indicates that the mismatch is caused by a fractional pixel generation process and a flag "skip_merge_mismatch_flag" which indicates that the mismatch is caused by a skip or merge process.

Note that the structures illustrated herein are merely examples and the structures illustrated in FIGS. 14A to 14C may be used in combination with each other.

By informing the image decoding apparatus 200 of a possibility of a mismatch based on such details, the image decoding apparatus 200 can appropriately decode a coded bitstream.

Figure 15:
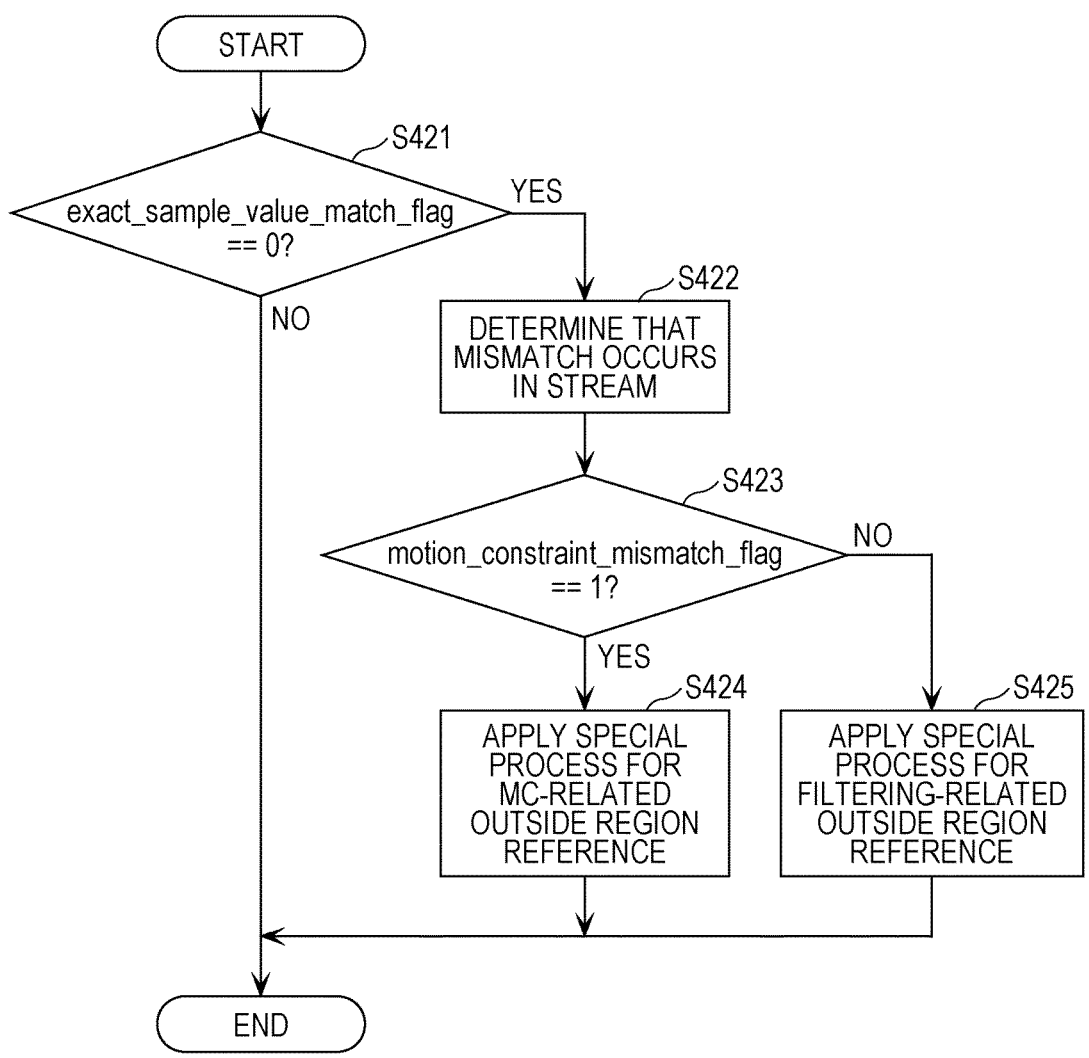
FIG. 15 is a flowchart of an image decoding process according to the third exemplary embodiment.

FIG. 15 is a flowchart illustrating a flow of a process performed by the image decoding apparatus 200 in the case of FIG. 14A. As illustrated in FIG. 15, if the flag "exact_sample_value_match_flag" is equal to 0 (YES in S421), the image decoding apparatus 200 determines that a mismatch will occur (S422).

Further, if the flag "motion_constraint_mismatch_flag" is equal to 1 (YES in S432), the image decoding apparatus 200 determines to apply a special process for handling reference to an outside region (S424); otherwise (NO in S423), the image decoding apparatus 200 determines that a mismatch is related to loop filtering and applies a special process for handling reference to an outside region related to loop filtering (S425). For example, the image decoding apparatus 200 applies the mirroring process illustrated in FIG. 10C as the process related to loop filtering and applies the padding process illustrated in FIG. 10B to handle reference to an outside region related to motion compensation. As described above, the image decoding apparatus 200 switches the decoding process depending on these filters.

Note that the flags are used as information indicating the cause of a mismatch in this example; however, the image encoding apparatus 100 may use information indicating numbers instead of the flags. For example, a number "0" indicates that there is no mismatch (no special process), a number "1" indicates the padding process, a number "2" indicates the mirroring process, a number "3" indicates a process using an average, and a number "4" or greater indicates that a value obtained by subtracting 4 from the value of the number is used in a reference image as a fixed value. With such a configuration, a coded stream that enables simple parallel processing can be implemented using MC-constrained tiles without decreasing the image quality of decoded images.

Note that the process described above may be defined in accordance with a table of FIG. 16. In the related art, an image decoding apparatus processes a mismatch as an error or refers to uncertain data because a process to be performed in response to the occurrence of a mismatch is not defined. Accordingly, special processes defined as illustrated in the table enables generation decoded images with less degradation.

In the case where filtering is performed at a boundary and a mismatch is caused, the image decoding apparatus 200 may avoid the mismatch by using a value before filtering is performed as a reference image and then performing a filtering process. The use of the structures of a bitstream according to the third exemplary embodiment allows the image decoding apparatus 200 to identify the case where a mismatch is caused by a filtering process and thus perform the process described above.

In addition, the image decoding apparatus may perform a process for reading data from a memory for only indicated pixels possibly involved in a mismatch, depending on the type of the image decoding apparatus. If the cause of a mismatch is not identifiable, the mismatch is not appropriately avoidable. However, by including information identifying the cause of a mismatch in a coded bitstream as in the third exemplary embodiment, the image decoding apparatus 200 can perform a process for reading or writing only data of pixels related to the identified mismatch from or to a memory. For example, if the mismatch is cased by a boundary filtering process, the image decoding apparatus 200 writes or read data of pixels used in the boundary filtering process to or from a memory. For example, if the mismatch is caused by a skip/merge process, the image decoding apparatus 200 writes or reads data of pixels in a range used by the skip/merge process to or from the shared memory. Even in the case of the special process for generation of a fractional pixel, the image decoding apparatus 200 can read data of three pixels of the adjacent tile as illustrated in FIG. 2A.

As described above, inclusion of information indicating the cause of a mismatch in a bitstream allows the image decoding apparatus 200 to avoid the mismatch if the image decoding apparatus 200 has a surplus capability for extra processing. In addition, even in the case where the image decoding apparatus 200 fails to read data of pixels from a memory, the image decoding apparatus 200 is able to easily decide in what manner a decoded image is generated, and thus the image quality of the decoded image can be improved compared with the case where the information is not included.

As described above, the image encoding apparatus 100 according to the third exemplary embodiment generates information for identifying that a motion vector of a neighboring block refers to a reference block included in a tile different from the target tile, and generates a coded bitstream which includes the information. In other words, the image encoding apparatus 100 generates two or more flags or two or more information items which indicate that a coded bitstream contains an event violating a rule, and generates a coded bitstream including the two or more flags or the two or more information items.

In this way, the image encoding apparatus 100 can generate a coded bitstream that can be easily decoded by an image decoding apparatus or from which a decoded image can generated with less degradation.

Fourth Exemplary Embodiment

In a fourth exemplary embodiment, an image decoding method that is robust to errors will be described. Note that the overall configuration of the image decoding apparatus 200 according to the fourth exemplary embodiment is similar to that of the second exemplary embodiment, and thus a description thereof is omitted.

Figure 17:
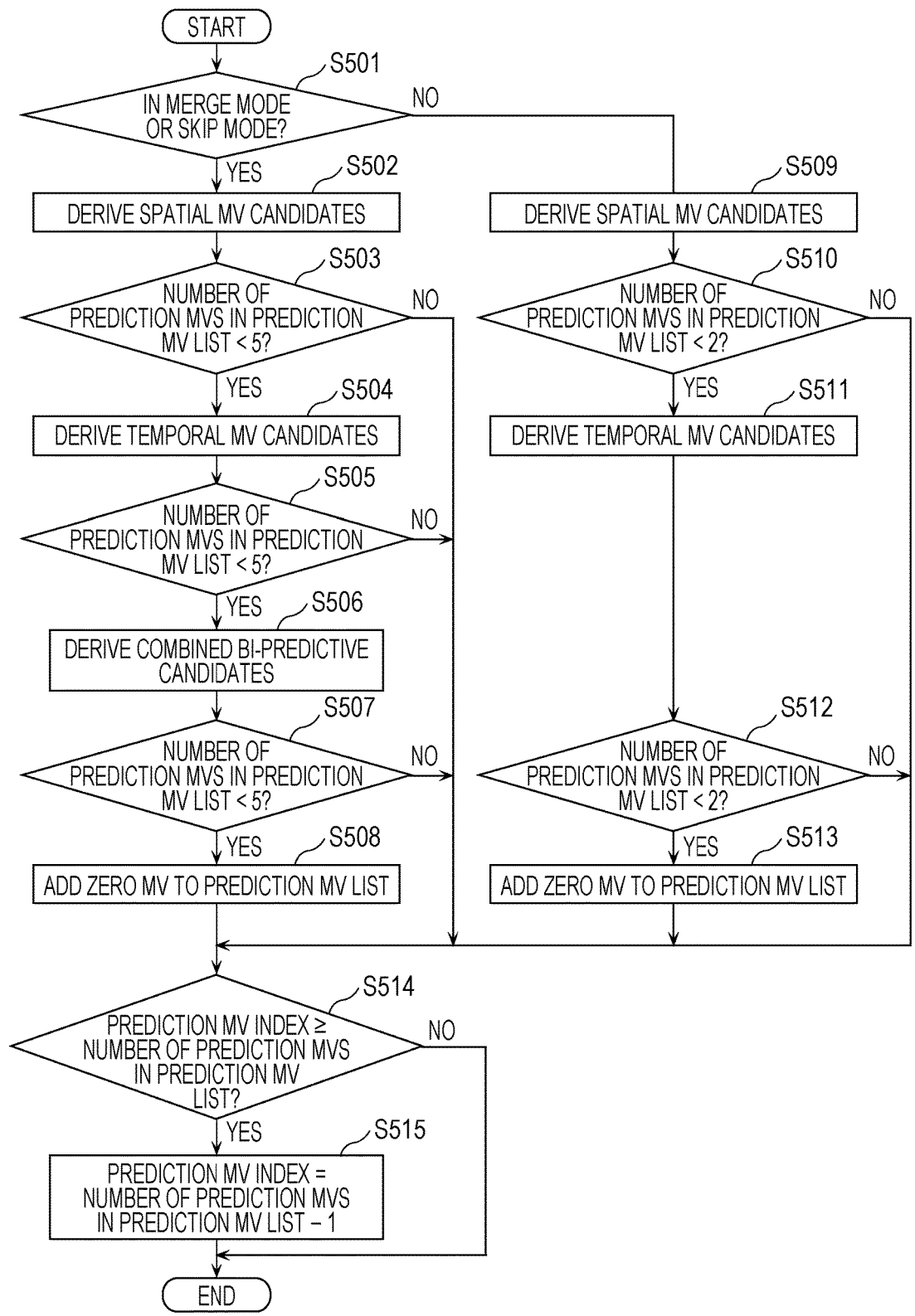
FIG. 17 is a flowchart of a prediction motion vector (MV) list generation process according to a fourth exemplary embodiment.

FIG. 17 is a flowchart of a process for generating a prediction motion vector (MV) list which is used when an MV is derived in accordance with the fourth exemplary embodiment. The image decoding apparatus 200 uses a plurality of MV derivation methods as described in JCTVC-N1005. In addition, in the case of the merge mode or the skip mode, the image decoding apparatus 200 uses a prediction MV included in the prediction MV list as an MV without processing it. Further, in the case of the adaptive MV prediction mode, the image decoding apparatus 200 creates an MV by adding a differential MV (MVD) in a bitstream (i.e., a coded sequence) to a prediction MV included in the prediction MV list.

Which prediction MV included in the prediction MV list is to be used is specified by a prediction MV index included in the coded sequence. This prediction MV index is "merge_idx", "mvp_l0_flag", or "mvp_l1_flag" described in JCTVC-N1005. In the merge mode or the skip mode, "merge_idx" is used, whereas in the adaptive MV prediction mode, "mvp_l0_flag" or "mvp_l1_flag" is used.

In addition, in the merge mode or the skip mode, the same reference image as the reference image of the prediction MV is referred to. In the adaptive MV prediction mode, a reference image specified by a reference image index ("ref_idx_l0" or "ref_idx_l1" described in JCTVC-N1005) included in a bitstream is referred to.

In the process illustrated in FIG. 17, the image decoding apparatus 200 first determines whether or not the current mode is the merge mode or the skip mode based on information contained a bitstream (S501). If the current mode is the merge mode or the skip mode (YES in S501), the image decoding apparatus 200 performs steps S502 to S508; otherwise (i.e., if the current mode is the adaptive MV prediction mode) (NO in S501), the image decoding apparatus 200 performs steps S509 to S513.

Specifically, in the case of the merge mode or the skip mode (YES in S501), the image decoding apparatus 200 derives spatial MV candidates and adds the derived spatial MV candidates to the prediction MV list (S502). Then, the image decoding apparatus 200 derives temporal MV candidates and adds the derived temporal MV candidates to the prediction MV list (S504). Then, the image decoding apparatus 200 derives combined bi-predictive candidates and adds the derived combined bi-predictive candidates to the prediction MV list (S506). Then, the image decoding apparatus 200 adds a zero MV to the prediction MV list (S508). Note that up to five prediction MV candidates are stored in the prediction MV list. Thus, the image decoding apparatus 200 no longer performs the processes for adding prediction MV candidates to the prediction MV list (S503, S505, and S507) after five prediction MV candidates have been stored.

In the case of the adaptive MV prediction mode (NO in S501), the image decoding apparatus 200 derives spatial MV candidates and adds the derived spatial MV candidates to the prediction MV list (S509). Then, the image decoding apparatus 200 derives temporal MV candidates and adds the derived temporal MV candidates to the prediction MV list (S511). Then, the image decoding apparatus 200 adds a zero MV to the prediction MV list (S513). Note that up to two prediction MV candidates are stored in the prediction MV list. Thus, the image decoding apparatus 200 no longer performs the processes for adding prediction MV candidates to the prediction MV list (S510 and S512) after two prediction MV candidates have been stored.

Note that derivation of spatial MV candidates (S502 and S509), derivation of temporal MV candidates (S504 and S511), and addition of a zero MV (S508 and S513) performed in the skip/merge modes and the adaptive MV prediction mode are basically the same processes; however, in the merge mode or the skip mode, the image decoding apparatus 200 also adds a reference image index (refIdx) to the prediction MV list. In contrast, in the adaptive MV prediction mode, the reference image index is separately specified in the bitstream, and thus the image decoding apparatus 200 does not add the reference image index to the prediction MV list.

Then, the image decoding apparatus 200 determines whether or not a value of the prediction MV index contained in the bitstream is greater than or equal to the number of prediction MVs contained in the prediction MV list (S514). The prediction MV index is a consecutive number starting from 0. Accordingly, in this process, it is determined whether the value of the prediction MV index contained in the bitstream is greater than the maximum value of the prediction MV index written in the prediction MV list. In other words, it is determined whether the value of the prediction MV index contained in the bitstream is written in the prediction MV list.

If the value of the prediction MV index contained in the bitstream is greater than or equal to the number of prediction MVs contained in the prediction MV list (YES in S514), the image decoding apparatus 200 sets, as the prediction MV index, a value obtained subtracting 1 from the number of prediction MVs contained in the prediction MV list (S515).

The image decoding apparatus 200 does not add temporal MV candidates to the prediction MV list depending on circumstances during derivation of temporal MV candidates (S504 and S511). This may cause a situation where the prediction MV index contained in the bitstream indicates a prediction MV candidate that does not exist in the prediction MV list. Even in such a case, the above-described processing of S514 and S515 allows the image decoding apparatus 200 to select a prediction MV candidate contained in the prediction MV list.

The following describes characteristic derivation of temporal MV candidates (S504 and S511) according to the fourth exemplary embodiment. Note that derivation of spatial MV candidates (S502 and S509), derivation of combined bi-predictive candidates (S506), and addition of a zero MV (S508 and S513) are similar to processes described in JCTVC-N1005, and thus a detailed description thereof is omitted.

Figure 18:
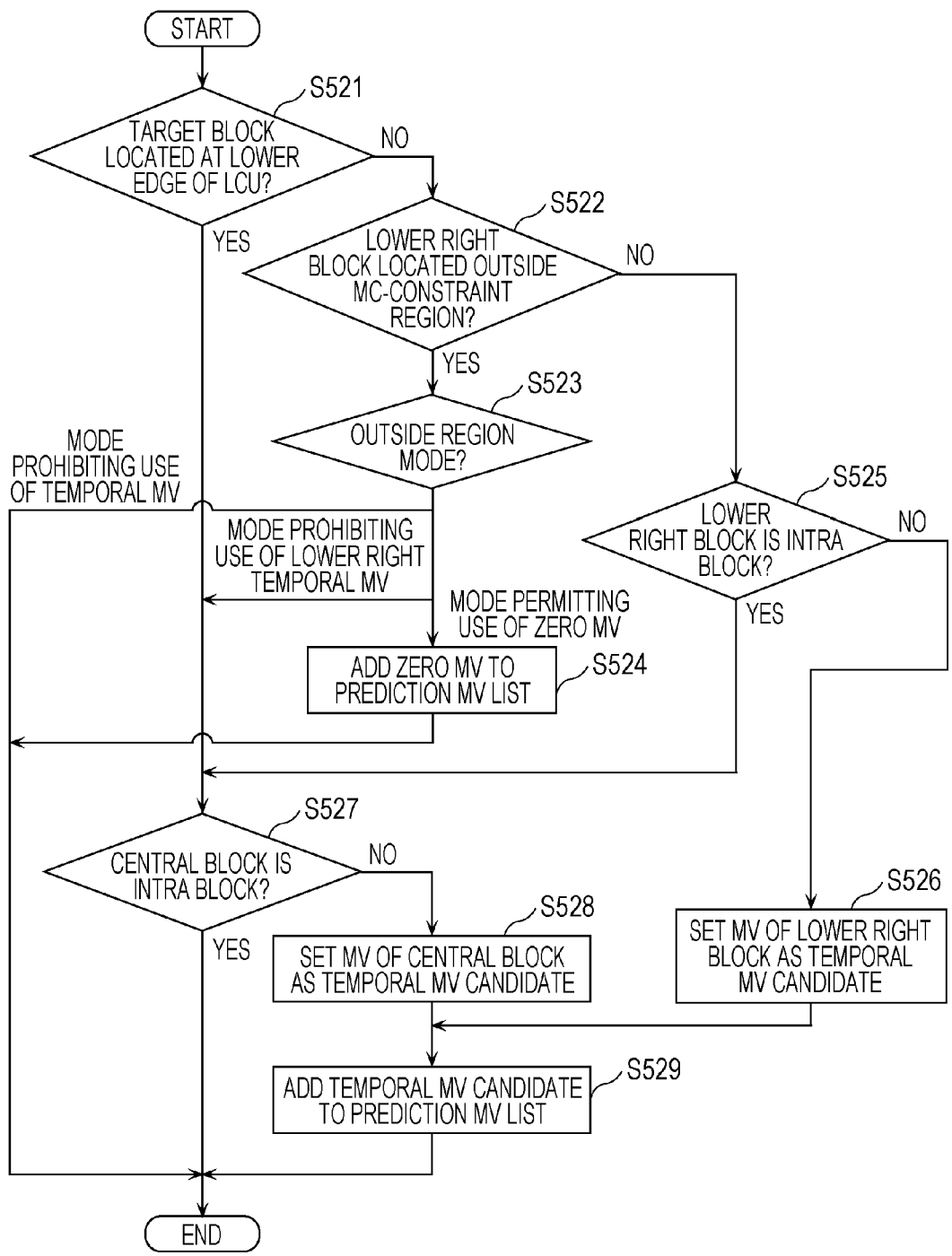
FIG. 18 is a flowchart of a temporal MV candidate derivation process according to the fourth exemplary embodiment.

FIG. 18 is a flowchart of a process for deriving temporal MV candidates and adding the derived temporal MV candidates to the prediction MV list. The term "temporal MV candidate" refers to an MV of a block within a decoded picture different from the target picture as in JCTVC-N1005. A block to be used is located on the lower right side of the target block or at the center of the target block. In the case where an MV of a lower right block which is a block located on the lower right side of the target block is not available, the image decoding apparatus 200 uses an MV of a central block which is a block located at the center of the target block. In the case where neither MV is available, the image decoding apparatus 200 does not add any temporal MV candidates to the prediction MV list.

A description will be given with reference to FIG. 3B. It is assumed here that the target block is located at a position C. The image decoding apparatus 200 first determines whether or not an MV of the lower right block located at a position H is available. If an MV of the lower right block is available, the image decoding apparatus 200 adds the MV to the prediction MV list. If an MV of the lower right block is not available, the image decoding apparatus 200 determines whether or not an MV of the central block located at the center of the position C is available. If an MV of the central block is available, the image decoding apparatus 200 adds the MV to the prediction MV list. If an MV of the central block is not available, the image decoding apparatus 200 does not add any temporal MV candidates to the prediction MV list.

The case where an MV is not available corresponds to the case where a block referred to is an intra block that has been encoded in the intra mode or the case where the target block is a block located at the lower edge of an LCU. Reference to the lower right block is prohibited in the case where the target block is a block located at the lower edge of an LCU also in JCTVC-N1005. This configuration prohibits reference across an LCU boundary in the vertical direction and thus can reduce an amount of memory.

The term "LCU" stands for the largest coding unit. An image is processed in the order of raster scan on an LCU-by-LCU basis. In addition to the cases described above, an MV of the lower right block is not added to the prediction MV list in the case where the position on the lower right side of the target block is outside an MC-constrained region in the fourth exemplary embodiment.

Referring to FIG. 18, the image decoding apparatus 200 first determines whether or not the target block is a block located at the lower edge of the LCU (S521). If the target block is not a block located at the lower edge of the LCU (NO in S521), the image decoding apparatus 200 determines whether or not the lower right block which is a block located on the lower right side of the target block is outside the MC-constrained region (S522). If the lower right block is not outside the MC-constrained region (NO in S522), the image decoding apparatus 200 determines whether or not the lower right block is an intra block (S525). If the lower right block is not an intra block (NO in S525), the image decoding apparatus 200 sets an MV of the lower right block as a temporal MV candidate (S526) and adds the temporal MV candidate to the prediction MV list (S529).

If the lower right block is an intra block (YES in S525) or the target block is a block located at the lower edge of the LCU (YES in S521), the image decoding apparatus 200 does not add an MV of the lower right block to the prediction MV list.

If an MV of the lower right block is not available (YES in S521 or YES in S525), the image decoding apparatus 200 determines whether or not the central block which is a block located at the center is an intra block (S527). If the central block is not an intra block (NO in S527), the image decoding apparatus 200 sets an MV of the central block as a temporal MV candidate (S528) and adds the temporal MV candidate to the prediction MV list (S529).

If the lower right block is outside the MC-constrained region (YES in S522), the image decoding apparatus 200 switches the process in accordance with an outside region mode indicated by a signal contained in the bitstream (S523).

If the outside region mode is a mode prohibiting the use of temporal MVs (the mode prohibiting use of temporal MV in S523), the image decoding apparatus 200 adds neither the MV of the lower right block nor the MV of the central block to the prediction MV list. That is, no temporal MV candidates are used.

If the outside region mode is a mode prohibiting the use of a lower right temporal MV (the mode prohibiting use of lower right temporal MV in S523), the image decoding apparatus 200 does not use an MV of the lower right block but adds an MV of the central block to the prediction MV list as a temporal MV candidate if the MV of the central block is available. That is, the image decoding apparatus 200 performs processing starting from step S527.

If the outside region mode is a mode permitting the use of a zero MV (the mode permitting use of zero MV in S523), the image decoding apparatus 200 adds a zero MV which is an MV representing a motion of 0 as a temporal MV candidate to the prediction MV list (S524), and then terminates the process.

The flow of the process is basically the same in the merge mode, the skip mode, and the adaptive MV prediction mode. However, as described above, the image decoding apparatus 200 also adds the reference image index (refIdx) to the prediction MV list in the merge mode or the skip mode. In contrast, in the adaptive MV prediction mode, the image decoding apparatus 200 does not add the reference image index to the prediction MV list because the reference image index is separately specified in the bitstream.

In addition, the image decoding apparatus 200 adds a zero MV to the prediction MV list in step S524. In the merge mode or the skip mode, the image decoding apparatus 200 also adds the reference image index having a value of 0 to the prediction MV list.

Benefits

As described above, the image decoding apparatus 200 according to the fourth exemplary embodiment does not refer to the lower right block if the lower right block is outside an MC-constraint region. This configuration can make a decoding process more robust to errors. Specifically, an MC-constrained tile is a tool designed to enable independent decoding of the region. However, an MV of the lower right block located outside such a region may be added to the prediction MV list as a temporal MV candidate in an invalid image encoding apparatus or image encoding process. If the prediction MV index specifies this temporal MV candidate as the prediction MV, an image decoding apparatus that decodes the MC-constrained tile independently of other tiles fails to derive the temporal MV candidate because the prediction MV is a MV of a block located outside the region. In this way, the decoding process fails.

In contrast, the image decoding apparatus 200 according to the fourth exemplary embodiment avoids the failure of the decoding process by using three modes. Specifically, the image decoding apparatus 200 avoids the failure of the decoding process by adding an MV indicating a motion of 0 as a temporal MV candidate to the prediction MV list instead of the MV of the lower right block in the mode in which the use of a zero MV is permitted. In this way, the image decoding apparatus 200 can continue the decoding process without any process failure if the prediction MV index specifies a temporal MV candidate for the outside region. Further, the image decoding apparatus 200 can suppress a large quality degradation of the prediction block by using the MV indicating a motion of 0 and associated with the reference image index of zero. As a result, the image decoding apparatus 200 can suppress the quality degradation of the decoded image.

In the mode in which the use of the lower right temporal MV is prohibited, the image decoding apparatus 200 adds an available MV of the central block to the prediction MV list as a temporal MV candidate if the lower right block is outside the region. In this way, the image decoding apparatus 200 can avoid reference to the lower right block located outside the region and can suppress the image quality degradation of the decoded image by using the MV of the central block if it is available.

In addition, in the mode in which the use of temporal MVs is prohibited, the image decoding apparatus 200 does not use any temporal MV candidates including the MV of the central block if the lower right block is located outside the region. This is because, in the case where the lower right block is located outside the region, a temporal MV candidate in the bitstream is highly likely to be invalid.

In the mode in which the use of temporal MVs is prohibited and in the mode in which the use of a lower right temporal MV is prohibited, no temporal MV candidates are added to the prediction MV list. Thus, a case may occur where the numbers of prediction MVs contained in the prediction MV lists do not match on the encoding side and the decoding side. In such a case, the value of the prediction MV index contained the bitstream may become greater than or equal to the number of prediction MVs contained in the prediction MV list. To avoid such a situation, the image decoding apparatus 200 corrects the prediction MV index by performing steps S514 and S515 illustrated in FIG. 17. In this way, a failure of the decoding process is suppressed.

In addition, a mismatch may occur between the prediction MV list used on the encoding side and that used on the decoding side also when the encoding side does not add an MV of the lower right block located outside an MC-constrained region to the prediction MV list. FIGS. 19A to 19C illustrate examples of the prediction MV list of three cases generated in the merge mode or the skip mode. A description will be given with reference to FIGS. 19A to 19C.

Spatial MV candidates, temporal MV candidates, combined bi-predictive candidates, and zero MVs are added to the prediction MV list in this order. FIG. 19A illustrates an example of the prediction MV list obtained in the case where an MV of the lower right block is not used if the lower right block is located outside an MC-constrained region. FIG. 19B illustrates an example of the prediction MV list obtained in the case where the use of temporal MV candidates is prohibited. FIG. 19C illustrates an example of the prediction MV list obtained in the case where the zero MV is used in place of the temporal MV candidate.

As illustrated in FIGS. 19A to 19C, the prediction MV list changes depending on how the situation is handled. If the prediction MV list is generated on the encoding side as illustrated in FIG. 19A and the prediction MV list is generated on the decoding side as illustrated in FIG. 19B, a mismatch occurs between the prediction MV lists. As a result, even if the encoding side sets the prediction MV index to 3 in order to use the combined bi-predictive candidate, the decoding side interprets that the prediction MV index specifies the zero MV, which results in a failure of the decoding process.

Such a failure does not occur in the case where only spatial MV candidates, which are added at the top of the prediction MV list, are used; however, in the case of using MV candidates other than spatial MV candidates, the prediction MV list generation method is desirably employed in common on both sides.

In the fourth exemplary embodiment, the use of the information specifying the outside region mode contained in the bitstream allows the encoding side and the decoding side to employ the same prediction MV list generation method, and consequently can prevent a situation where prediction MVs indicated by the prediction MV index disagree. In the fourth exemplary embodiment, the example obtained in the mode in which the use of a lower right MV is prohibited is illustrated in FIG. 19A, the example obtained in the mode in which the use of temporal MVs is prohibited is illustrated in FIG. 19B, and the example obtained in the mode in which the use of a zero MV is permitted is illustrated in FIG. 19C.

Modifications

In the fourth exemplary embodiment, the image decoding apparatus 200 determines whether or not the lower right block is located outside an MC-constrained region; however, the use of the lower right block may be prohibited all the time when MC-constrained tiles are used. The operation performed in this case corresponds to an operation in which YES is always determined in S522 of the process flow illustrated in FIG. 18. This configuration omits the block-based determination step and consequently reduces the circuitry scale and processing overhead.

In addition, a configuration may be made such that temporal MV candidates are not used all the time when MC-constrained tiles are used. The operation of this case corresponds to an operation in which steps S504 and S511 are not performed in the process flow illustrated in FIG. 17.

This configuration omits the processing for the central block and consequently further reduces the circuitry scale and the processing overhead.

In addition, the image decoding apparatus 200 may be configured not to use the lower right block all the time for a block or slice located at the right edge of MC-constrained tiles. This configuration can simplify the processing for determining whether or not the lower right block is located outside a region.

In the description given above, the image decoding apparatus 200 corrects the prediction MV index (S514 and S515 of FIG. 17) in order to avoid a failure in the case where temporal MV candidates are not added to the prediction MV list; however, the correction method is not limited to this particular method. For example, the image decoding apparatus 200 may change the value of the prediction MV index to a fixed value, such as 0, as in step S515A of FIG. 20. Alternatively, the image decoding apparatus 200 may change the value of the prediction MV index so as to specify the zero MV as in step S515B of FIG. 21.

In the fourth exemplary embodiment, the image decoding apparatus 200 corrects the value of the prediction MV index to be equal to "the number of prediction MVs contained in the prediction MV list−1". That is, the value of the prediction MV index is replaced by the maximum value of the prediction MV indices. This configuration increases the possibility of the zero MV being used, and thus suppresses the quality degradation of the prediction image. In addition, because this operation is for clipping the prediction MV index contained the bitstream at the maximum value, the original prediction MV index is not changed much. Accordingly, the possibility of the same prediction MV being used on the encoding side and the decoding side also increases.

In addition, in the case where the image decoding apparatus 200 has corrected the prediction MV index, the image decoding apparatus 200 may display an indication (or output to or notify an external apparatus) so as to inform the user of the correction. Similarly, in the case where the lower right block is located outside a region and a temporal MV candidate or a subsequent combined bi-predictive candidate or a zero MV is used, the image decoding apparatus 200 may display an indication (or output to or notify an external apparatus). With this configuration, the user can be informed of the possibility of the bitstream containing some kind of error by the notification.

In the description given above, the image decoding apparatus 200 switches between three modes in the case where the lower right block is located outside an MC-constrained region; however, the operation is not limited to this particular example and the image decoding apparatus 200 may always operate in a fixed mode. In addition, the information indicating the outside region mode is contained in the bitstream. Alternatively, the information may be input from outside separately from the bitstream. In addition, the image decoding apparatus 200 may automatically set the outside region mode in accordance with features of the image or the decoding state (such as an amount of generated code).

Brief Account

Figure 22:
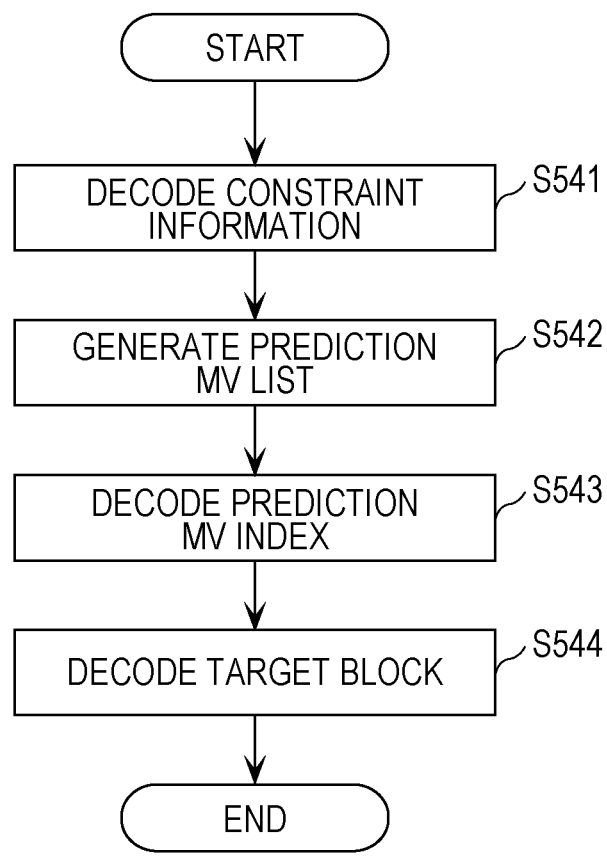
FIG. 22 is a flowchart of an image decoding process according to the fourth exemplary embodiment.

As described above, the image decoding apparatus 200 according to the fourth exemplary embodiment performs an image decoding process illustrated in FIG. 22.

The image decoding apparatus 200 decodes, from a bitstream, constraint information which indicates prohibition of reference to another tile from the target tile, which is one of a plurality of tiles obtained by partitioning a picture (S541). That is, the constraint information indicates each of the plurality of tiles is an MC-constrained tile. In other words, the constraint information indicates that MC across a tile boundary is prohibited.

Then, the image decoding apparatus 200 generates the prediction MV list which includes a plurality of prediction MV candidates and prediction MV indices each associated with a corresponding one of the plurality of prediction MV candidates (S542). If the constraint information indicates prohibition of reference from the target tile to another tile, the image decoding apparatus 200 generates the prediction MV list not including any temporal MVs of a block located on the lower right side of the target block.

Specifically, for example, as in S522 of FIG. 18, the image decoding apparatus 200 determines whether or not the lower right block is located outside the target tile. If the constraint information indicates prohibition of reference from the target tile to another tile and the lower right block is located outside the target tile, the image decoding apparatus 200 does not include any temporal MVs of the lower right block in the prediction MV list. That is, the image decoding apparatus 200 does not include any temporal MVs of the lower right block in the prediction MV list when the above conditions are satisfied.

Alternatively, the image decoding apparatus 200 may be configured not to include any temporal MVs of the lower right block to the prediction MV list without performing the above-described determination, if the constraint information indicates prohibition of reference from the target tile to another tile.

For example, if the constraint information indicates prohibition of reference from the target tile to another tile, the image decoding apparatus 200 includes neither a temporal MV of a block located on the lower right side of the target block nor a temporal MV of a block located at the center of the target block in the prediction MV list as in the mode prohibiting the use of temporal MVs of FIG. 18. That is, the image decoding apparatus 200 does not include any of these temporal MVs in the prediction MV list.

Alternatively, if the constraint information indicates prohibition of reference from the target tile to another tile, the image decoding apparatus 200 includes an MV having a value of 0 (zero MV) in the prediction MV list in place of a temporal MV of a block located on the lower right side of the target block as in the mode permitting the use of the zero MV of FIG. 18.

Alternatively, if the constraint information indicates prohibition of reference from the target tile to another tile, the image decoding apparatus 200 generates the prediction MV list that includes a temporal MV of a block located at the center of the target block as in the mode prohibiting the use of the lower right temporal MV of FIG. 18. That is, the image decoding apparatus 200 prohibits the use of a temporal MV of the lower right block and permits the use of a temporal MV of the central block.

Note that the image decoding apparatus 200 may switch between at least two modes among these three modes in accordance with the information contained in the bitstream or information of another type. Alternatively, the image decoding apparatus 200 may use one of the three modes in a fixed manner.

Then, the image decoding apparatus 200 decodes, from the bitstream, the prediction MV index for the target block (S543). Note that the timing of this processing is not limited to the timing illustrated in FIG. 22 and may be prior to step S541 or S542.

Then, the image decoding apparatus 200 decodes the target block by using a prediction MV candidate associated with the prediction MV index obtained in step S543 in the prediction MV list generated in step S542 (S544).

Through the above process, the image decoding apparatus 200 can decode an image without referring to information of another tile. In this way, the image decoding apparatus 200 can appropriately decode a coded bitstream. In addition, the image decoding apparatus 200 can appropriately decode a coded bitstream even if information of another tile is referred to by an image encoding apparatus.

In addition, in the case where the decoded prediction MV index does not exist in the prediction MV list, the image decoding apparatus 200 decodes the target block by using a prediction MV candidate associated with the largest prediction MV index among the plurality of prediction MV indices included in the prediction MV list as in steps S514 and S515 of FIG. 17.

Figure 20:
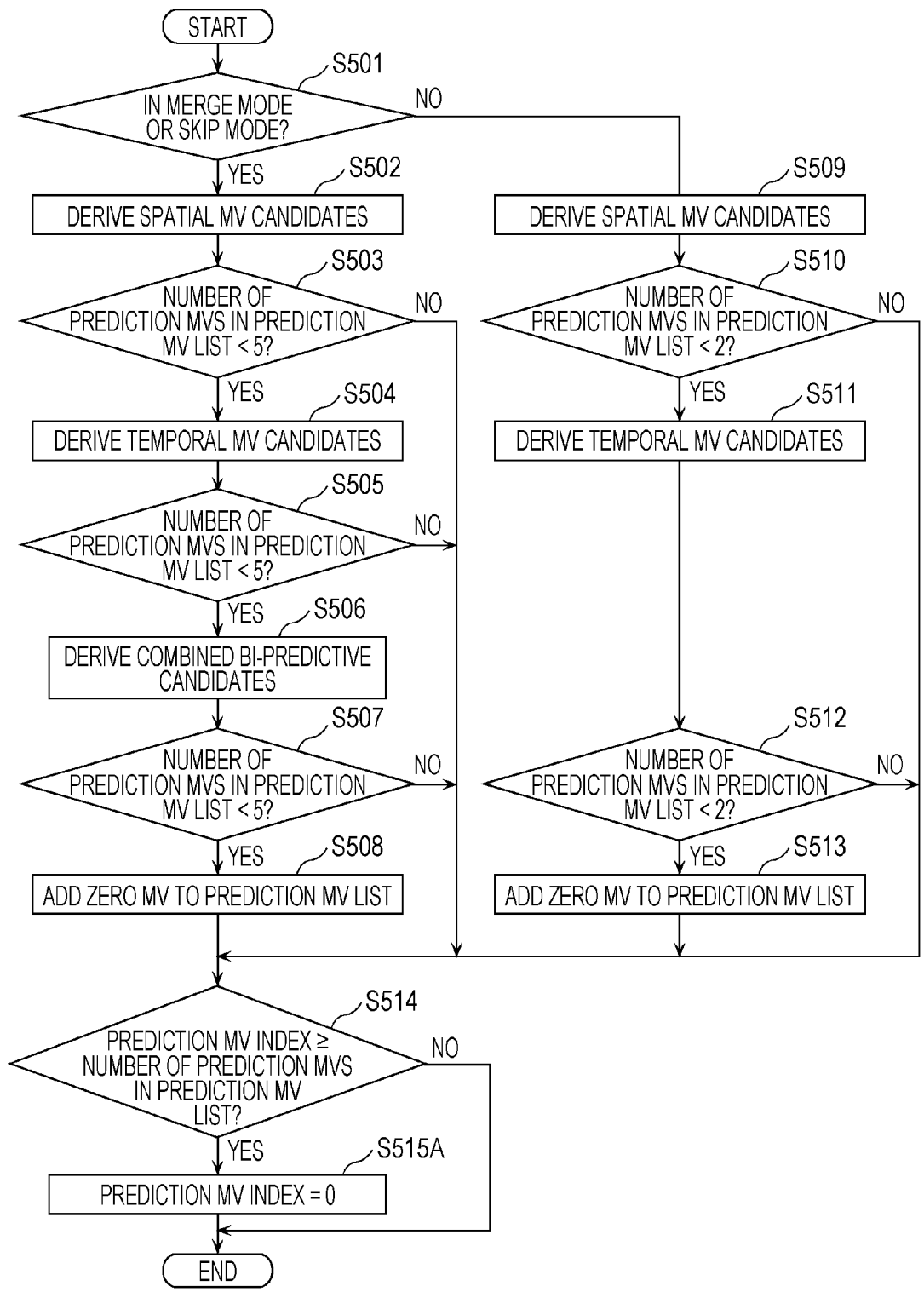
FIG. 20 is a flowchart of a modification of the prediction MV list generation process according to the fourth exemplary embodiment.

Alternatively, in the case where the decoded prediction MV index does not exist in the prediction MV list, the image decoding apparatus 200 decodes the target block by using a prediction MV candidate associated with the smallest prediction MV index among the plurality of prediction MV indices included in the prediction MV list as in steps S514 and S515A of FIG. 20.

Figure 21:
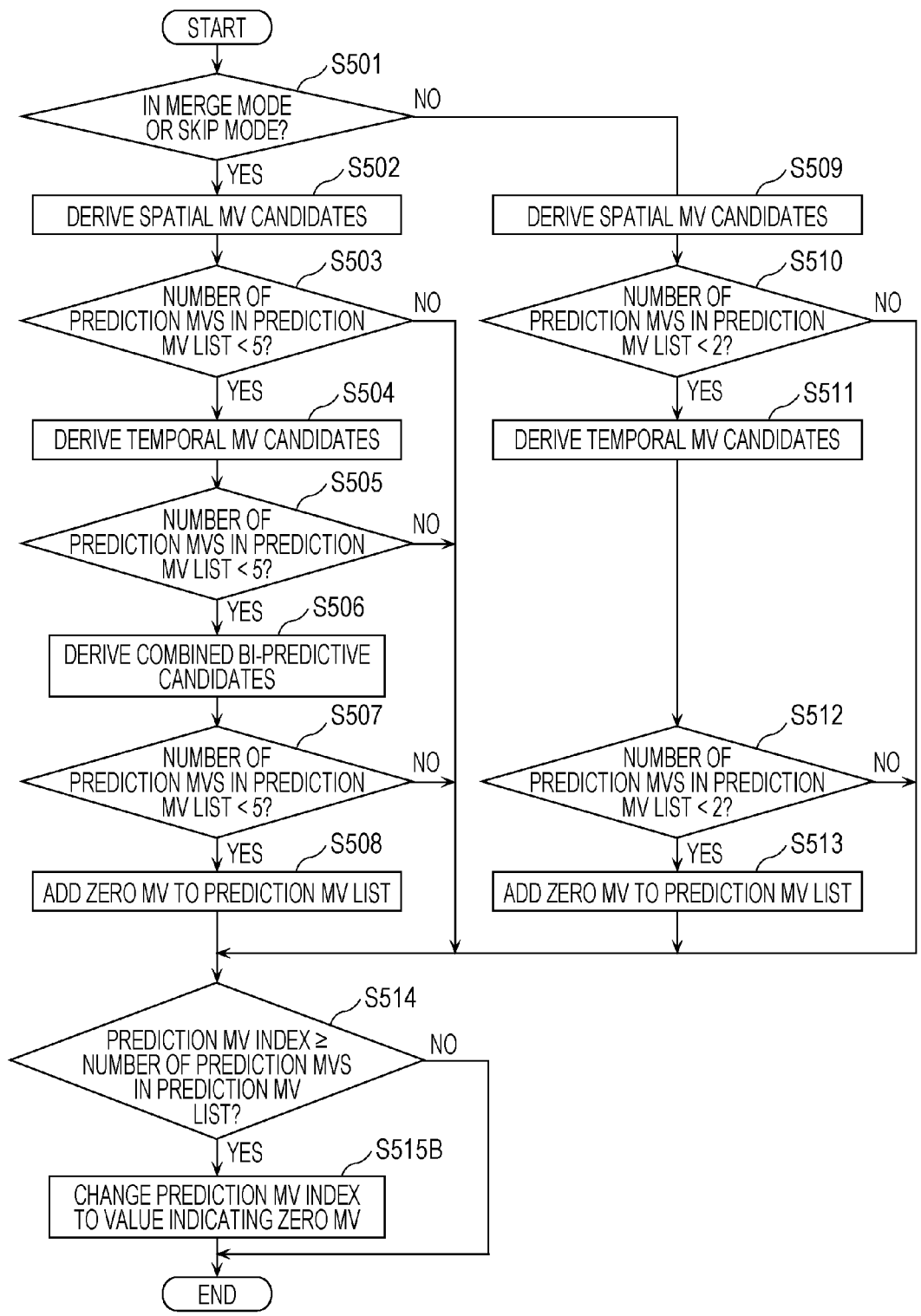
FIG. 21 is a flowchart of a modification of the prediction MV list generation process according to the fourth exemplary embodiment.

Alternatively, in the case where the decoded prediction MV index does not exist in the prediction MV list, the image decoding apparatus 200 decodes the target block by using an MV having a value of 0 (zero MV) as in steps S514 and S515B of FIG. 21.

In this way, even if a mismatch occurs between the prediction MV list used on the encoding side and that used on the decoding side, the image decoding apparatus 200 can appropriately decode a coded bitstream.

The fourth exemplary embodiment of the present disclosure may be implemented as an image encoding apparatus that generates a prediction MV list by performing a process similar to the process described above. In this case, the image encoding apparatus sets the above-described outside region mode and generates a bitstream containing information indicating the set outside region mode.

Fifth Exemplary Embodiment

In a fifth exemplary embodiment, an image encoding method for generating a coded stream that improves the coding efficiency and the usability will be described. Note that the overall configurations of the image encoding process and the image encoding apparatus 100 are similar to those of the first exemplary embodiment, and thus a description thereof is omitted.

Figure 23:
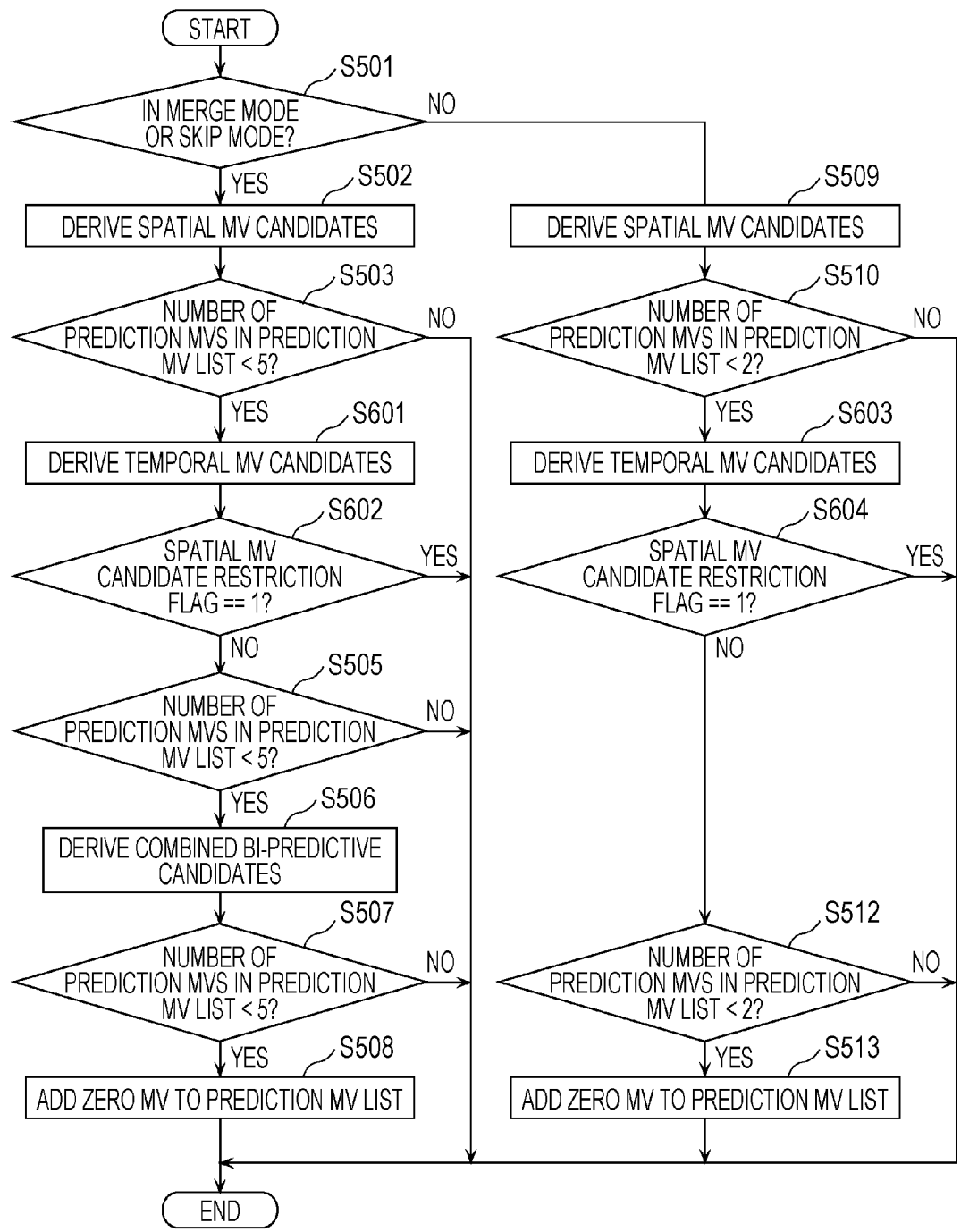
FIG. 23 is a flowchart of a prediction MV list generation process according to a fifth exemplary embodiment.

FIG. 23 is a flowchart of a prediction MV list generation process used when a motion vector is encoded in accordance with the fifth exemplary embodiment. The processing steps similar to those of the fourth exemplary embodiment (FIG. 17) are denoted by the same step numbers, and thus a description thereof is omitted.

In the fifth exemplary embodiment, the image encoding apparatus 100 adds only spatial MV candidates to the prediction MV list depending on circumstances. Specifically, the image encoding apparatus 100 determines whether or not a spatial MV candidate restriction flag is equal to 1 (S602 or S604). If the spatial MV candidate restriction flag is equal to 1 (YES in S602 or YES in 604), the image encoding apparatus 100 does not derive any combined bi-predictive candidates (S506) and does not add any zero MVs (S508 and S513). The image encoding apparatus 100 also sets the spatial MV candidate restriction flag in the temporal MV candidate derivation process (S601 or S603).

Figure 24:
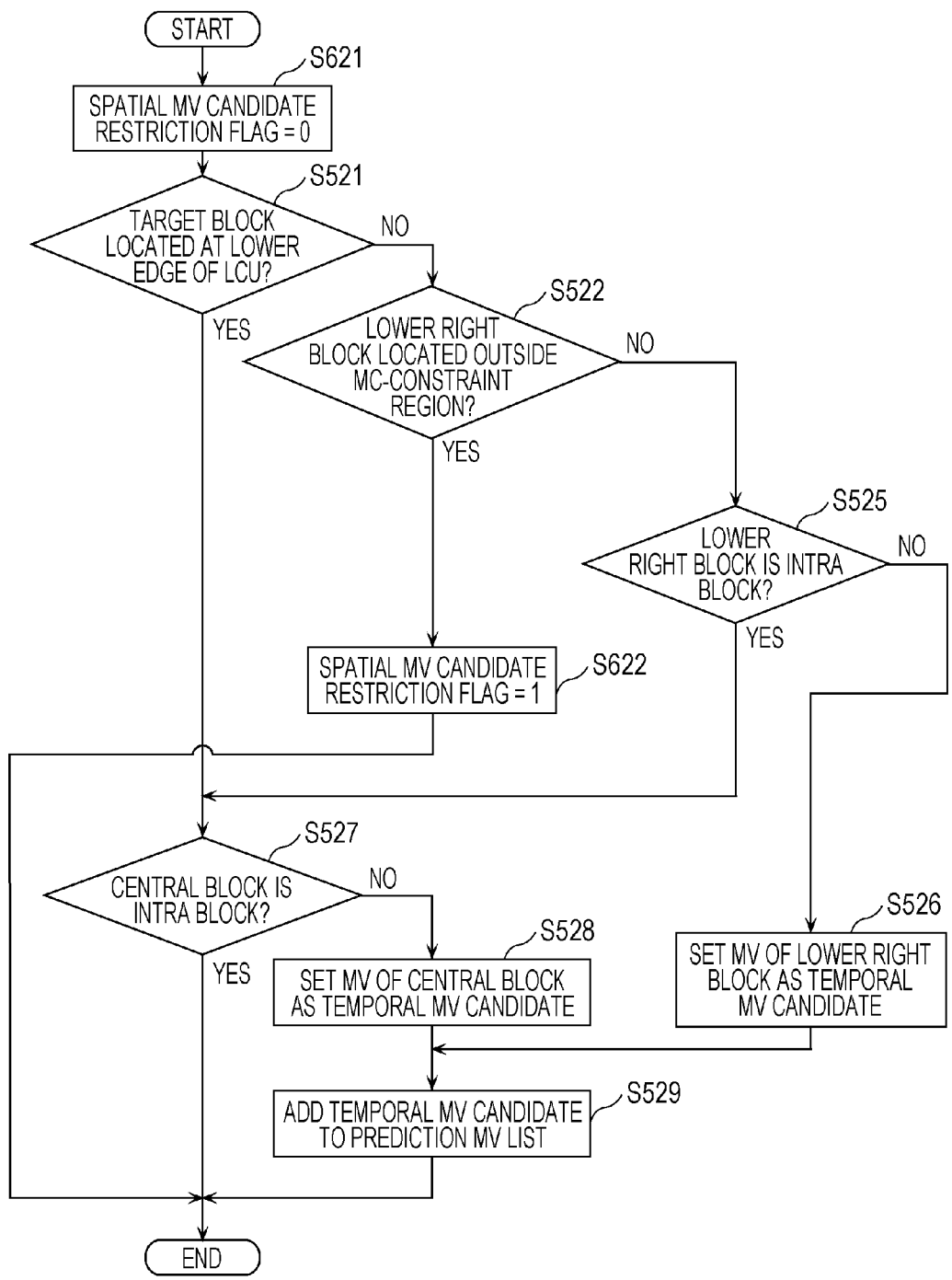
FIG. 24 is a flowchart of a temporal MV candidate derivation process according to the fifth exemplary embodiment.

FIG. 24 is a flowchart of a process for deriving temporal MV candidates and adding the derived temporal MV candidates to the prediction MV list in accordance with the fifth exemplary embodiment. Note that processing steps that are similar to those of the fourth exemplary embodiment (FIG. 18) are denoted by the same step numbers, and thus a description thereof is omitted.

In the fifth exemplary embodiment, the image encoding apparatus 100 first initializes the spatial MV candidate restriction flag to 0 (S621). In addition, if the target block is not a block located at the lower edge of an LCU (NO in S521) and if the lower right block is located outside an MC-constrained region (YES in S522), the image encoding apparatus 100 sets the spatial MV candidate restriction flag to 1 (S622) and terminals the process.

If the spatial MV candidate restriction flag is set to 1, the image encoding apparatus 100 does not derive any combined bi-predictive candidates (S506) and does not add any zero MVs (S508 and S513) as described above. Accordingly, only spatial MV candidates are added to the prediction MV list. The image encoding apparatus 100 can use, as prediction MVs, only the prediction MV candidates included in the prediction MV list. Accordingly, the image encoding apparatus 100 uses only the special MV candidates for encoding.

In the case where no spatial MV candidate is available such as the case where all neighboring blocks of the target block are intra blocks, there is no available prediction MV. In such a case, the image encoding apparatus 100 encodes the target block in the intra mode.

In addition, the image encoding apparatus 100 may prohibit bi-directional prediction in the inter mode in accordance with a flag "mvd_l1_zero_flag". This process will be described below.

Figure 25:
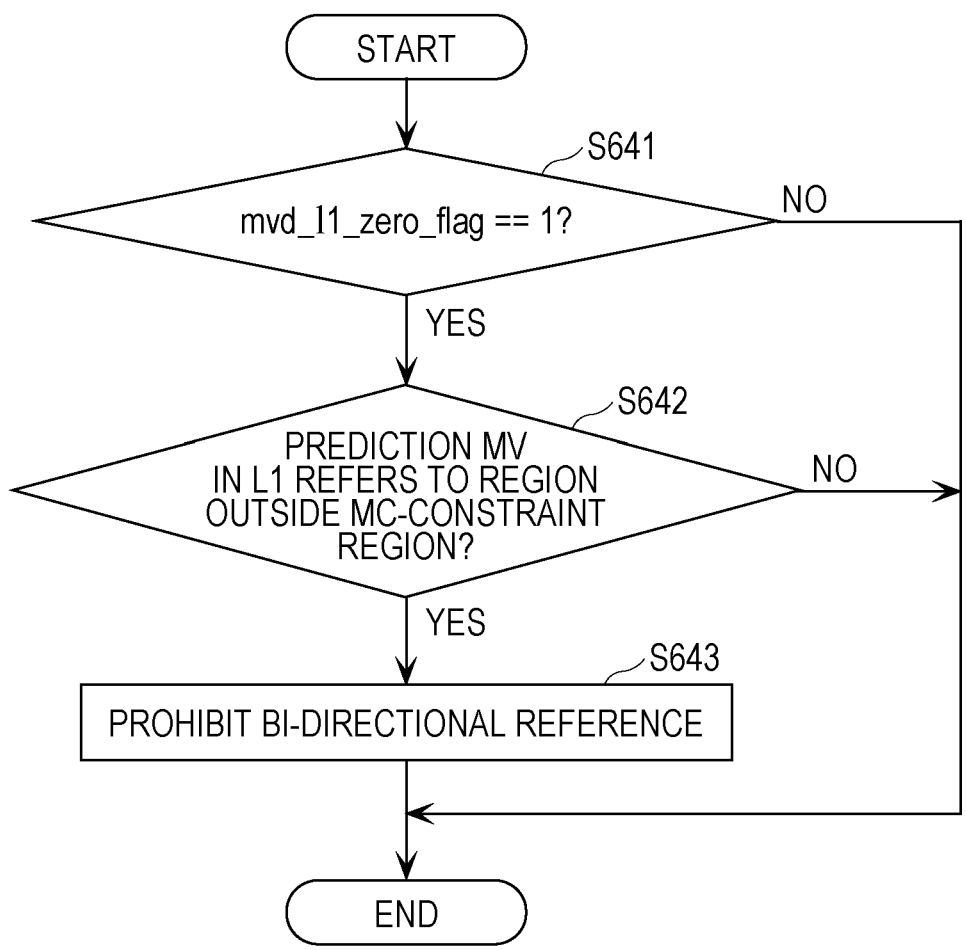
FIG. 25 is a flowchart of a bi-directional prediction mode prohibition process according to the fifth exemplary embodiment.

FIG. 25 is a flowchart of a process for determining whether or not to prohibit bi-directional prediction in the inter mode in accordance with the fifth exemplary embodiment. The image encoding apparatus 100 performs this process after deciding the prediction MV and immediately before deciding the prediction mode.

The image encoding apparatus 100 first determines whether or not the flag "mvd_l1_zero_flag" is equal to 1 (S641). If the flag "mvd_l1_zero_flag" is equal to 1 (YES in S641), the image encoding apparatus 100 determines whether or not a prediction MV of a reference image list L1 refers to an outside region (S642). If the prediction MV of the reference image list L1 refers to an outside region (YES in S642), the image encoding apparatus 100 prohibits the bi-directional reference mode (S643).

Here, the flag "mvd_l1_zero_flag" is a flag for reducing an amount of code of an MV as in JCTVC-N1005. If this flag is equal to 1 during bi-directional prediction, the image encoding apparatus 100 does not encode a differential MV in the case where a reference image indicated by the reference image list L1 is used and instead uses the prediction MV as the MV. Note that the reference image list is a list including usable reference images and reference image indices each indicating a corresponding one of the usable reference images. During bi-directional prediction, two reference image lists L0 and L1 are used. For example, the reference image list L0 indicates reference images that precede the target picture in display order, whereas the reference image list L1 indicates reference images that follow the target picture in display order.

When bi-directional prediction is prohibited, the image encoding apparatus 100 encodes the target block in a uni-directional prediction mode or an intra mode.

Figure 26:
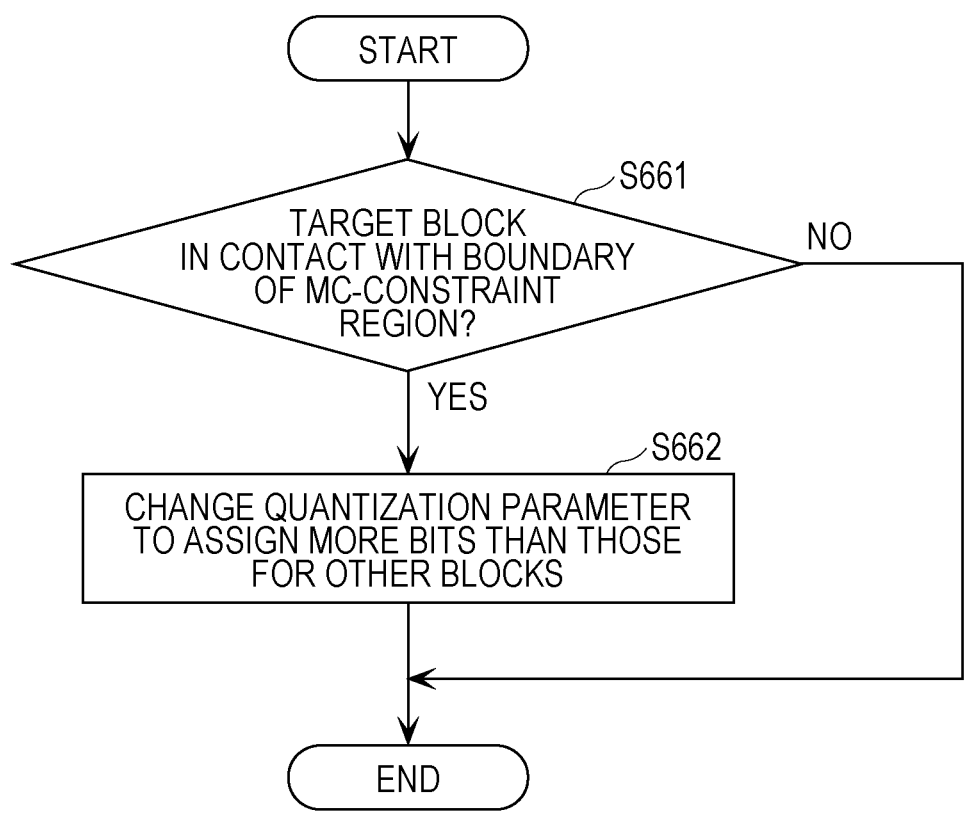
FIG. 26 is a flowchart of a quantization parameter changing process according to the fifth exemplary embodiment.

The image encoding apparatus 100 may also change a quantization parameter in accordance with whether or not the target block is in contact with a boundary of an MC-constrained region. FIG. 26 is a flowchart of a quantization parameter changing process according to the fifth exemplary embodiment. For example, the image encoding apparatus 100 performs this process immediately after a quantization parameter has been set for the target block.

The image encoding apparatus 100 first determines whether or not the target block is in contact with a boundary of an MC-constrained region (S661). If the target block is in contact with a boundary of an MC-constrained region (YES in S661), the image encoding apparatus 100 changes the quantization parameter so that more bits are assigned to the target block than other blocks (S662). In other words, the image encoding apparatus 100 corrects the quantization parameter that has been decided for the target block in accordance with a certain method (e.g., a method according to the related art) so that more bits are assigned to the target block.

Figure 27:
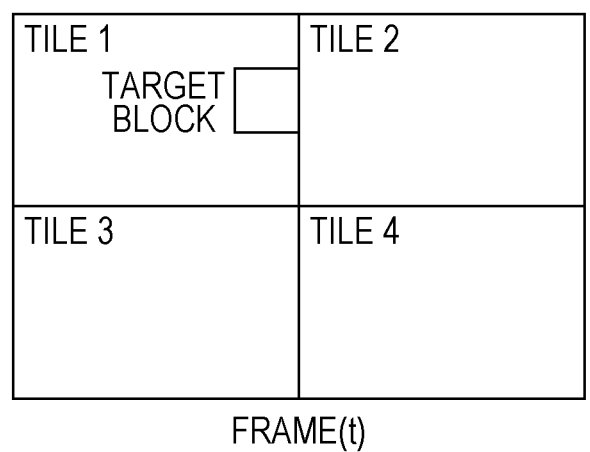
FIG. 27 is a diagram illustrating an example of a block located at a boundary of a motion-constrained region according to the fifth exemplary embodiment.

FIG. 27 is a diagram illustrating an example of a block located at a boundary of an MC-constrained region. In the example illustrated in FIG. 27, the target block is adjacent to a boundary between a tile 1 and a tile 2. In such a case, the image encoding apparatus 100 assigns more bits to the target block than those assigned to other blocks.

Benefits

As described above, in the case where a block on the lower right side of the target block is located outside an MC-constrained region, the image encoding apparatus 100 according to the fifth exemplary embodiment uses only spatial MV candidates. With this configuration, the occurrence of a circumstance where prediction MVs used on the encoding side and the decoding side disagree can be avoided. In this way, the image encoding apparatus 100 can generate a bitstream that can be correctly decoded by an image decoding apparatus.

Specifically, spatial MV candidates are added to the prediction MV list before temporal MV candidates are added thereto. Accordingly, as a result of the image encoding apparatus 100 using only spatial MV candidates, no influence is caused in the decoded result when the image decoding apparatus does not add temporal MV candidates to the prediction MV list.

A description will be given with reference to FIGS. 19A to 19C. The values of the prediction MV index associated with the same spatial MV candidate are the same in FIGS. 19A to 19C. Accordingly, if the encoding side is configured to use only spatial MV candidates, the prediction MVs used on the encoding side and the decoding side match regardless of how temporal MV candidates are handled on the decoding side.

In addition, the image encoding apparatus 100 can achieve both a reduction in amount of code of MVs by using the flag "mvd_l1_zero_flag" and an improvement in the usability and parallelism by using MC-constrained tiles. Specifically, if the flag "mvd_l1_zero_flag" is equal to 1, the image encoding apparatus 100 uses the prediction MV of the reference image list L1 as an MV without processing the prediction MV. Accordingly, in the case where the flag "mvd_l1_zero_flag" is equal to 1 and the prediction MV of the reference image list L1 refers to an outside region, the image encoding apparatus 100 can prevent the MV from referring to an outside region by prohibiting the bi-directional reference mode.

In addition, the image encoding apparatus 100 can suppress the image quality degradation caused by the use of MC-constrained tiles. Specifically, when MC-constrained tiles are used, the encoding efficiency generally decreases because a range of reference is constrained. In particular, the image quality tends to decrease at a boundary of a constrained region. If an object located in the vicinity of a boundary moves to outside a constrained region as time passes, reference to the object becomes unavailable, and thus the prediction error increases. As a result, the coding efficiency decreases.

In addition, because a constrained region is encoded independently of other constrained regions, the coding efficiency varies from region to region. This consequently causes a boundary of constraint regions to draw attentions as block noise, and the image quality decreases.

In the fifth exemplary embodiment, the image encoding apparatus 100 assigns a larger amount of code to a block that is in contact with a boundary of a constrained region. This configuration can reduce the image quality degradation in the case of a large prediction error. In addition, this configuration can make a boundary of a constrained region draw less attention and thus can improve the image quality.

Modifications

Figure 28:
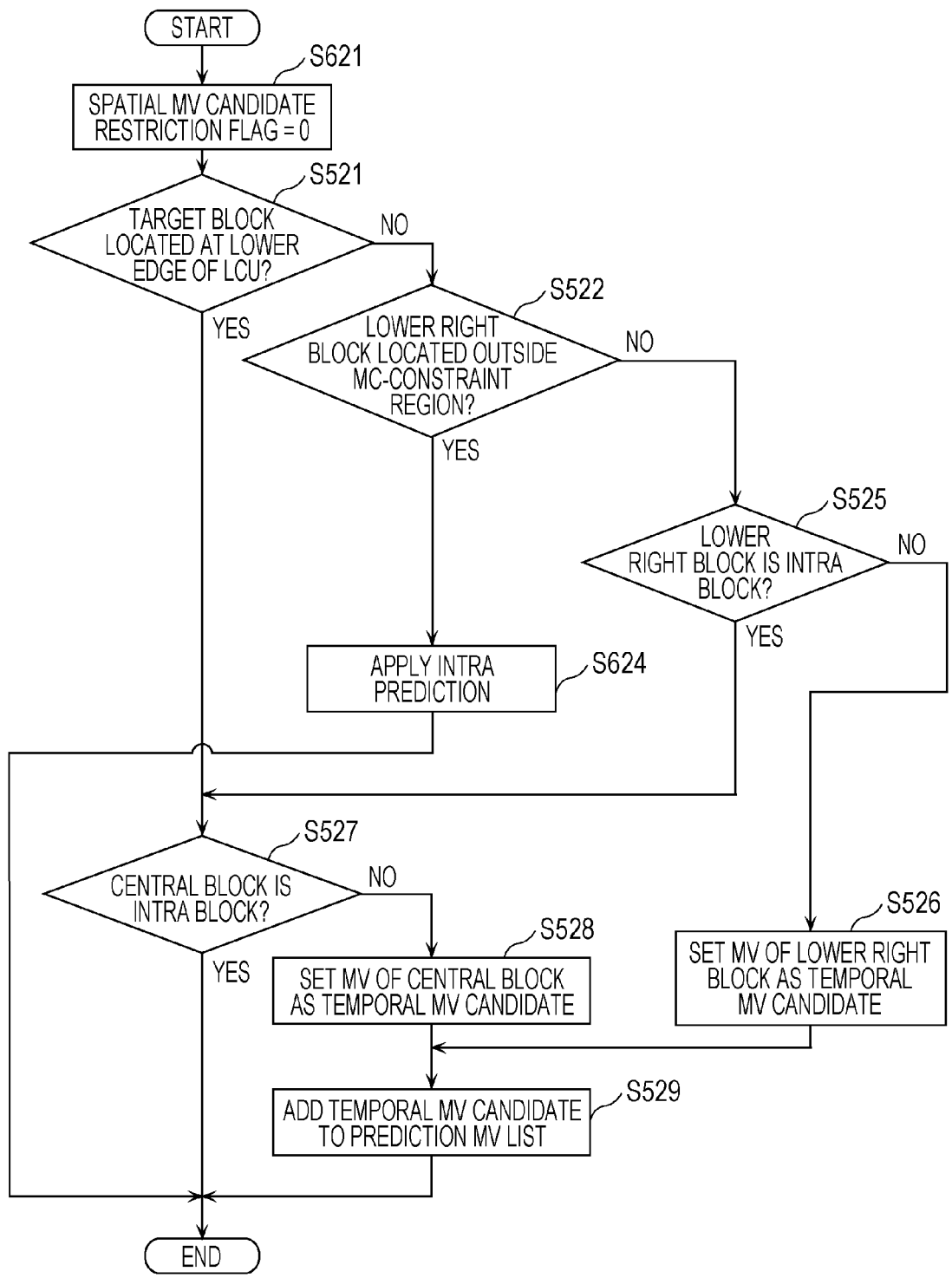
FIG. 28 is a flowchart of a modification of the temporal MV candidate derivation process according to the fifth exemplary embodiment.
Figure 29:
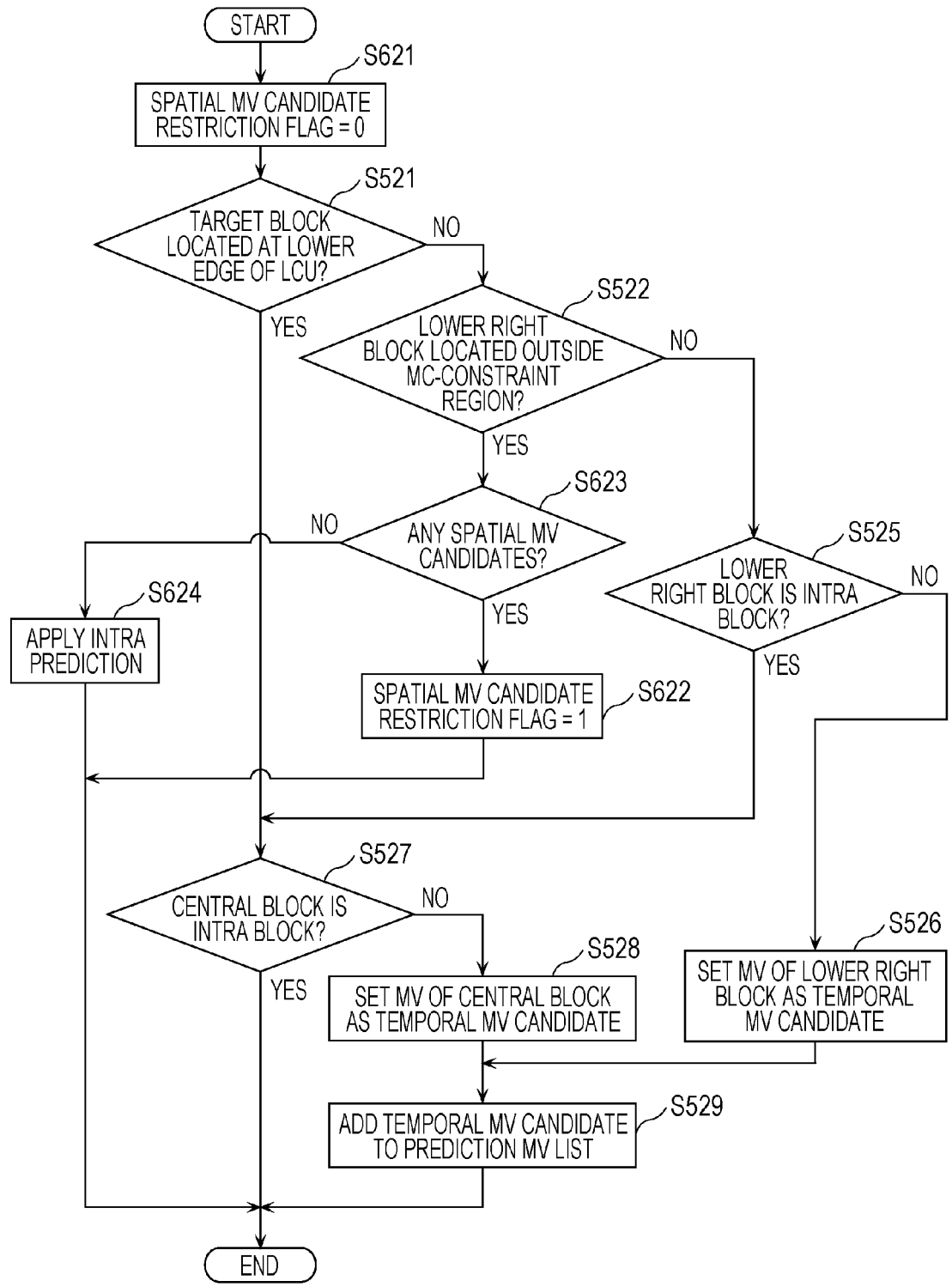
FIG. 29 is a flowchart of a modification of the temporal MV candidate derivation process according to the fifth exemplary embodiment.

In the fifth exemplary embodiment, the image encoding apparatus 100 uses only spatial MV candidates in the case where the lower right block is located outside an MC-constrained region; however, the image encoding apparatus 100 may use intra prediction (S624) as illustrated in FIG. 28. This configuration simplifies the process and thus can reduce the circuitry scale and processing overhead. Alternatively, the image encoding apparatus 100 may use intra prediction (S624) if the prediction MV list includes no spatial MV candidates (NO in S623) as illustrated in FIG. 29.

In addition, the image encoding apparatus 100 may use an MV of the central block if the lower right block is located outside an MC-constrained region as in the fourth exemplary embodiment or may be configured not to use temporal MV candidates when MC-constrained tiles are used. Such a configuration omits the block-based determination processing and thus can reduce the circuitry scale and processing overhead.

Figure 30:
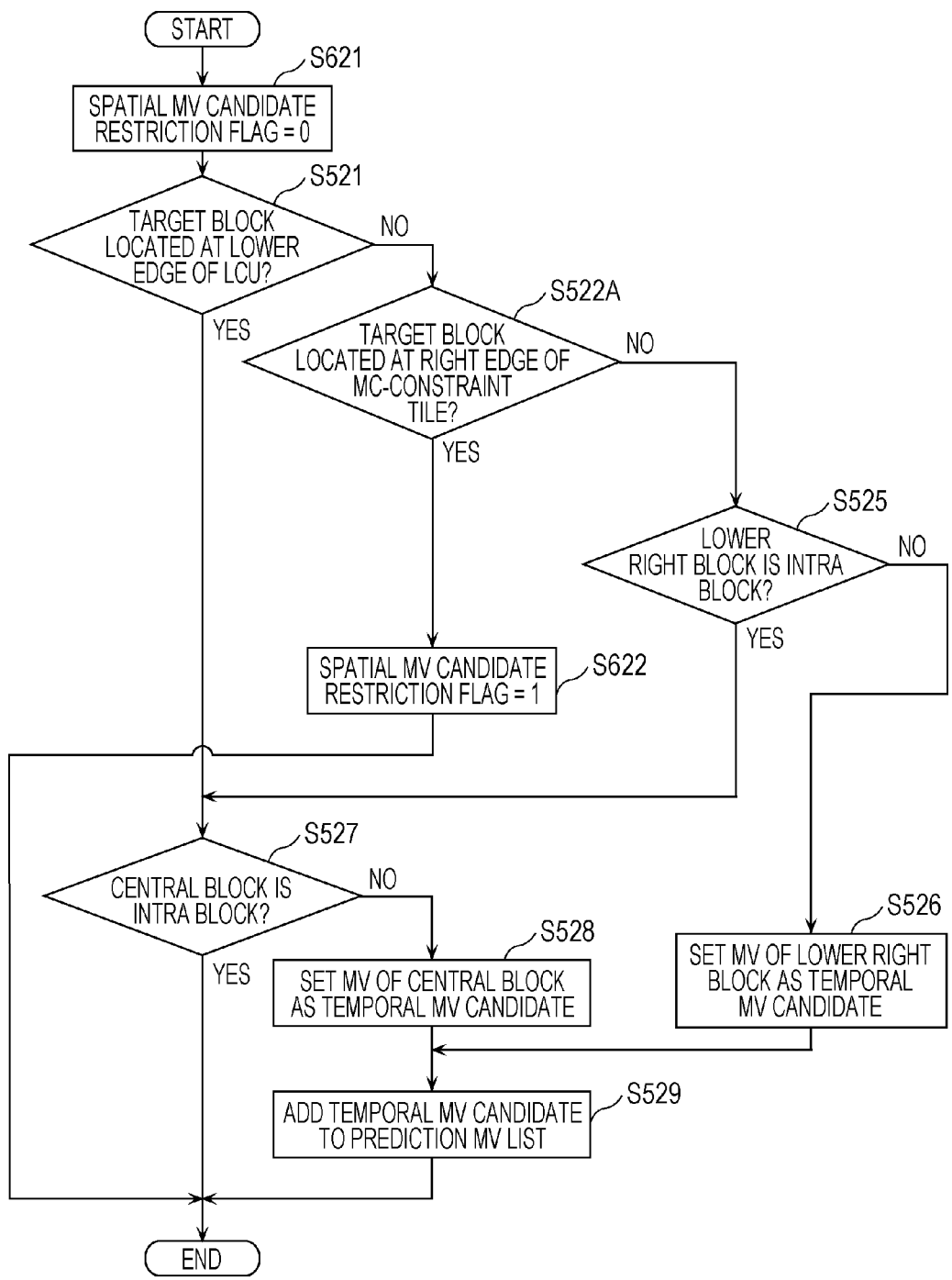
FIG. 30 is a flowchart of a modification of the temporal MV candidate derivation process according to the fifth exemplary embodiment.

In addition, the image encoding apparatus 100 may set the lower right block or temporal MV candidates not available for a block or slice located at the right edge of an MC-constrained tile. Such a configuration can simplify the processing for determining whether the lower right block is located outside a region. For example, the image encoding apparatus 100 may prohibit the use of temporal MV candidates if the target block is a block located at the right edge of an MC-constrained tile (YES in S522A) as illustrated in FIG. 30.

In addition, the image encoding apparatus 100 may prohibit the use of temporal MV candidates by setting a flag "sps_temporal_mvp_enabled_flag" or a flag "slice_temporal_mvp_enabled_flag" described in JCTVC-N1005 to 0 in the case where MC-constrained tiles are used.

Here, the flag "sps_temporal_mvp_enabled_flag" is provided for each sequence including a plurality of pictures, and indicates whether or not temporal MV candidates are used for the plurality of pictures included in the corresponding sequence. If the value of the flag "sps_temporal_mvp_enabled_flag" is equal to 0, temporal MV candidates are not used.

The flag "slice_temporal_mvp_enabled_flag" is provided for each slice and indicates whether or not temporal MV candidates are used for the corresponding slice. If the value of the flag "slice_temporal_mvp_enabled_flag" is equal to 0, temporal MV candidates are not used.

In the description given above, the image encoding apparatus 100 prohibits bi-directional reference mode in the case where the flag "mvd_I1_zero_flag" is equal to 1 and the prediction MV of the reference image list L1 refers to an outside region. Alternatively, encoding may be performed in the intra mode in such a case in order to simplify the process. In addition, the image encoding apparatus 100 may set the flag "mvd_I1_zero_flag" to 0 in the case where MC-constrained tiles are used in order to simplify the process, thereby avoiding the occurrence of such a case.

In addition, the image encoding apparatus 100 increases the number of bits assigned to a block that is in contact with a boundary of an MC-constrained region as illustrated in FIG. 26; however, the target block may be not necessarily in contact with the boundary. For example, the image encoding apparatus 100 may increase the number of bits assigned to blocks located at a certain distance or less from the boundary. Alternatively, the image encoding apparatus 100 may change the number of bits in accordance with a distance of a block from the boundary. For example, the image encoding apparatus 100 may assign more bits to a block located near the boundary than those assigned to other blocks even if the block is not in contact with the boundary or may change the number of bits in steps so that more bits are assigned to a block as the distance of the block from the boundary becomes smaller.

Brief Account

Figure 31:
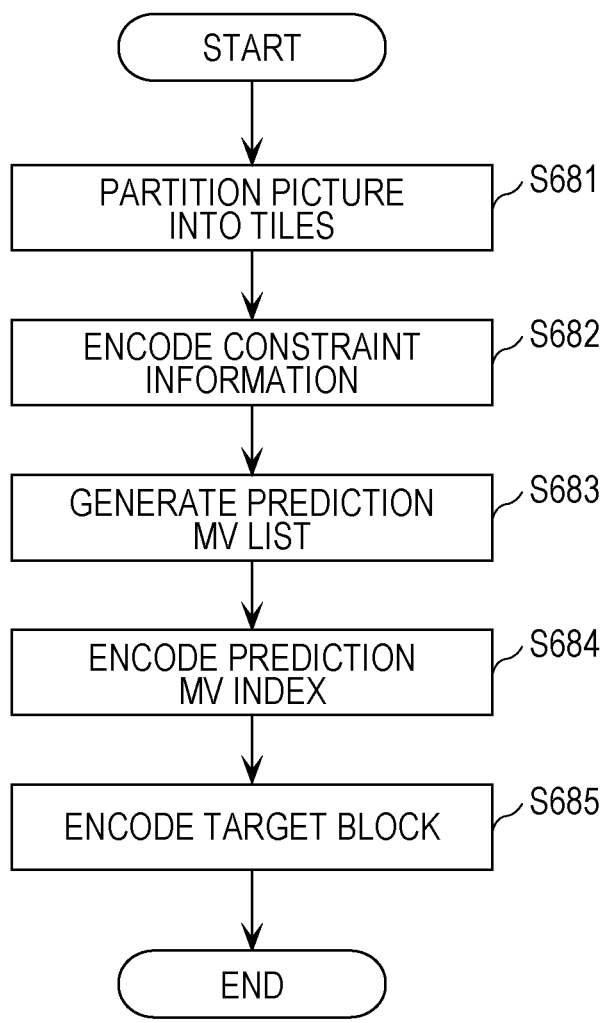
FIG. 31 is a flowchart of an image encoding process according to the fifth exemplary embodiment.

As described above, the image encoding apparatus 100 according to the fifth exemplary embodiment performs an image encoding process illustrated in FIG. 31.

The image encoding apparatus 100 first partitions a picture into a plurality of tiles (S681). Then, the image encoding apparatus 100 encodes constraint information which indicates prohibition of reference from the target tile, which is one of the plurality of tiles, to another tile (S682). That is, the constraint information indicates each of the plurality of tiles is an MC-constrained tile. In other words, the constraint information indicates that MC across a tile boundary is prohibited.

Then, the image encoding apparatus 100 generates a prediction MV list which includes a plurality of prediction MV candidates and prediction MV indices each associated with a corresponding one of the plurality of prediction MV candidates (S683). Here, the image encoding apparatus 100 generates a prediction MV list not including any temporal MVs of a block on the lower right side of the target block if the constraint information indicates prohibition of reference from the target tile to another tile.

Specifically, the image encoding apparatus 100 determines whether or not the lower right block is located outside the target tile as in S522 of FIG. 24, for example. If the constraint information indicates prohibition of reference from a target tile to another tile and if the lower right block is located outside the target tile, the image encoding apparatus 100 does not include any temporal MVs of the lower right block in the prediction MV list. That is, the image encoding apparatus 100 does not include any temporal MVs of the lower right block in the prediction MV list if the above conditions are satisfied.

Alternatively, the image encoding apparatus 100 may be configured not to include any temporal MVs of the lower right block to the prediction MV list without performing the above-described determination, if the constraint information indicates prohibition of reference from the target tile to another tile.

For example, if the constraint information indicates prohibition of reference from the target tile to another tile, the image encoding apparatus 100 includes no temporal MVs in the prediction MV list as in step S622 of FIG. 24 and step S602 of FIG. 23. That is, the image encoding apparatus 100 does not include any temporal MVs in the prediction MV list.

More specifically, if the constraint information indicates prohibition of reference from the target tile to another tile, the image encoding apparatus 100 includes none of temporal MVs, combined bi-predictive vectors, and an MV having a value of 0 (zero MV) in the prediction MV list as in step S622 of FIG. 24 and step S602 of FIG. 23. In other words, the image encoding apparatus 100 includes only spatial MVs in the prediction MV list.

The image encoding apparatus 100 may use the mode prohibiting the use of temporal MVs, the mode permitting the use of the zero MV, and the mode prohibiting the use of lower right temporal MVs as in the fourth exemplary embodiment. In addition, the image encoding apparatus 100 may generate a bitstream that contains a signal indicating the mode that has been used.

Then, the image encoding apparatus 100 selects one of the plurality of prediction MV candidates and encodes the prediction MV index that is associated with the selected prediction MV candidate in the prediction MV list (S684). Note that the timing of this processing is not limited to the timing illustrated in FIG. 31 and may be subsequent to step S685.

Then, the image encoding apparatus 100 encodes the target block by using the selected prediction MV candidate (S685). In this way, the image encoding apparatus 100 generates a coded bitstream which contains the constraint information, the prediction MV index, and the target block.

Through the process described above, the image encoding apparatus 100 can encode an image without referring to information of another tile. In this way, the image encoding apparatus 100 can generate a coded bitstream that can be appropriately decoded by an image decoding apparatus. In addition, the image encoding apparatus 100 can generate a coded bitstream that can suppress the occurrence of a mismatch between the prediction MV list used on the encoding side and that used on the decoding side.

In addition, if the constraint information indicates prohibition of reference from the target tile to another tile, the image encoding apparatus 100 encodes the target block by using intra prediction as in step S624 of FIG. 28. That is, the image encoding apparatus 100 encodes the target block without using inter prediction.

In this way, the image encoding apparatus 100 can generate a coded bitstream that can suppress the occurrence of a mismatch between the prediction MV list used on the encoding side and that used on the decoding side. The image encoding apparatus 100 can also reduce the processing overhead.

In addition, if the constraint information indicates prohibition of reference from the target tile to another tile and no spatial MV candidates are available, the image encoding apparatus 100 encodes the target block by using intra prediction as in steps S623 and S624 of FIG. 29.

In this way, the image encoding apparatus 100 can generate a coded bitstream that can suppress the occurrence of a mismatch between the prediction MV list used on the encoding side and that used on the decoding side. The image encoding apparatus 100 can also reduce the processing overhead.

In addition, the image encoding apparatus 100 determines whether or not the target block is a block or a slice located at the right edge of a tile as in step S522A of FIG. 30. If the constraint information indicates prohibition of reference from the target tile to another tile and if the target block is a block or a slice located at the right edge of a tile, the image encoding apparatus 100 does not include any temporal MVs of a block located on the lower right side of the target block in the prediction MV list.

In this way, the image encoding apparatus 100 can generate a coded bitstream that can suppress the occurrence of a mismatch between the prediction MV list used on the encoding side and that used on the decoding side. The image encoding apparatus 100 can also reduce the processing overhead.

In addition, the image encoding apparatus 100 encodes a flag (mvd_l1_zero_flag) indicating whether or not to encode a difference (differential MV) between an MV used and a prediction MV in the case where a reference image list (i.e., the reference image list L1) for a subsequent picture is used during bi-directional reference as illustrated in FIG. 25. The image encoding apparatus 100 determines whether or not the prediction MV refers to a region outside the target tile when the reference image list L1 is used. In the case where the flag indicates that the difference is not encoded and the reference image list L1 is used, the image encoding apparatus 100 prohibits bi-directional reference if the prediction MV refers to a region outside the target tile.

In this way, the image encoding apparatus 100 can encode an image without referring to information of another tile.

If the constraint information indicates prohibition of reference from the target tile to another tile, the image encoding apparatus 100 may encode the flag (mvd_l1_zero_flag) indicating that a difference between an MV used and a prediction MV is to be encoded.

In this way, the image encoding apparatus 100 can encode an image without referring to information of another tile. In addition, the image encoding apparatus 100 can reduce the processing overhead.

If the constraint information indicates prohibition of reference from the target tile to another tile, the image encoding apparatus 100 may set the quantization parameter of a block adjacent to a tile boundary smaller than that of other blocks as illustrated in FIG. 26.

In this way, the image quality degradation at a tile boundary can be suppressed in the case where MC-constrained tiles are used.

While the image encoding apparatus and the image decoding apparatus according to the exemplary embodiments have been described above, the present disclosure is not limited to these exemplary embodiments.

Also, individual processing units included in the image encoding apparatus and the image decoding apparatus according to the exemplary embodiments are typically implemented using LSI chips which are integrated circuits. These processing units may be formed as separate chips, or some or all of the processing units may be included in a chip.

Also, the circuit integration is not limited to LSI, and may be implemented using a dedicated circuit or general-purpose processor. A field programmable gate array (FPGA) that is programmable after manufacturing of an LSI or a reconfigurable processor in which connections and settings of circuit cells within the LSI are reconfigurable may be used.

In each of the first to fifth exemplary embodiments described above, individual components may be implemented with dedicated hardware or by executing a software program suitable for the components. The individual components may be implemented as a result of a program execution unit such as a central processing unit (CPU) or processor loading and executing a software program recorded on a recording medium, such as a hard disk or a semiconductor memory.

In other words, the image encoding apparatus and the image decoding apparatus include control circuitry and storage electrically connected to the control circuitry (accessible from the control circuitry). The control circuitry includes at least one of dedicated hardware and the program execution unit. Also, the storage stores a software program to be executed by the program execution unit in the case where the control circuitry includes the program execution unit.

Further, the exemplary embodiments of the present disclosure may be implemented by a software program or a non-transitory computer-readable recording medium storing the program thereon. Obviously, the program can be distributed via a transmission medium such as the Internet.

Also, numerical values used above are merely illustrative ones used to describe the exemplary embodiments of the present disclosure specifically, and thus the present disclosure is not limited to the illustrative numerical values.

Also, how functional blocks are divided in block diagrams is merely an example, and thus a plurality of functional blocks may be implemented as one functional block, one functional block may be divided into a plurality of functional blocks, or part of the function may be transferred to another functional block. Also, functions of a plurality of functional blocks having similar functions may be processed in parallel or in a time-divided manner by using hardware or software.

Also, the order in which steps included in the above-described image encoding method or image decoding method are executed is merely an illustrative one used to describe the exemplary embodiments of the present disclosure specifically, and thus steps may be executed in an order other than the above one. Also, some of the steps may be executed simultaneously (in parallel) with another step.

While the image encoding apparatus and the image decoding apparatus according to one or a plurality of embodiments of the present disclosure have been described above on the basis of the exemplary embodiments, the present disclosure is not limited to these embodiments. Embodiments in which various modifications conceivable by a person skilled in the art are made and embodiments that are made by combining elements of different embodiments may also be within the scope of the one or the plurality of embodiments of the present disclosure as long as such embodiments do not depart from the gist of the present disclosure.

Sixth Exemplary Embodiment

The processes described in each of the first to fifth exemplary embodiments above can be implemented easily in a standalone computer system by recording a program for implementing the configuration of a video encoding method (image encoding method) or video decoding method (image decoding method) described in the exemplary embodiment on a storage medium. The storage medium may be any given type of medium capable of storing the program, such as a magnetic disk, an optical disc, a magneto-optical disk, an integrated circuit (IC) card, or a semiconductor memory.

Now, exemplary applications of the video encoding method (image encoding method) or the video decoding method (image decoding method) described in each of the first to fifth exemplary embodiments and systems using them will be further described. The systems include an image encoding/decoding apparatus which includes an image encoding apparatus that employs the image encoding method and an image decoding apparatus that employs the image decoding method. Other configurations of the systems can be changed as appropriate in accordance with the circumstances.

Figure 32:
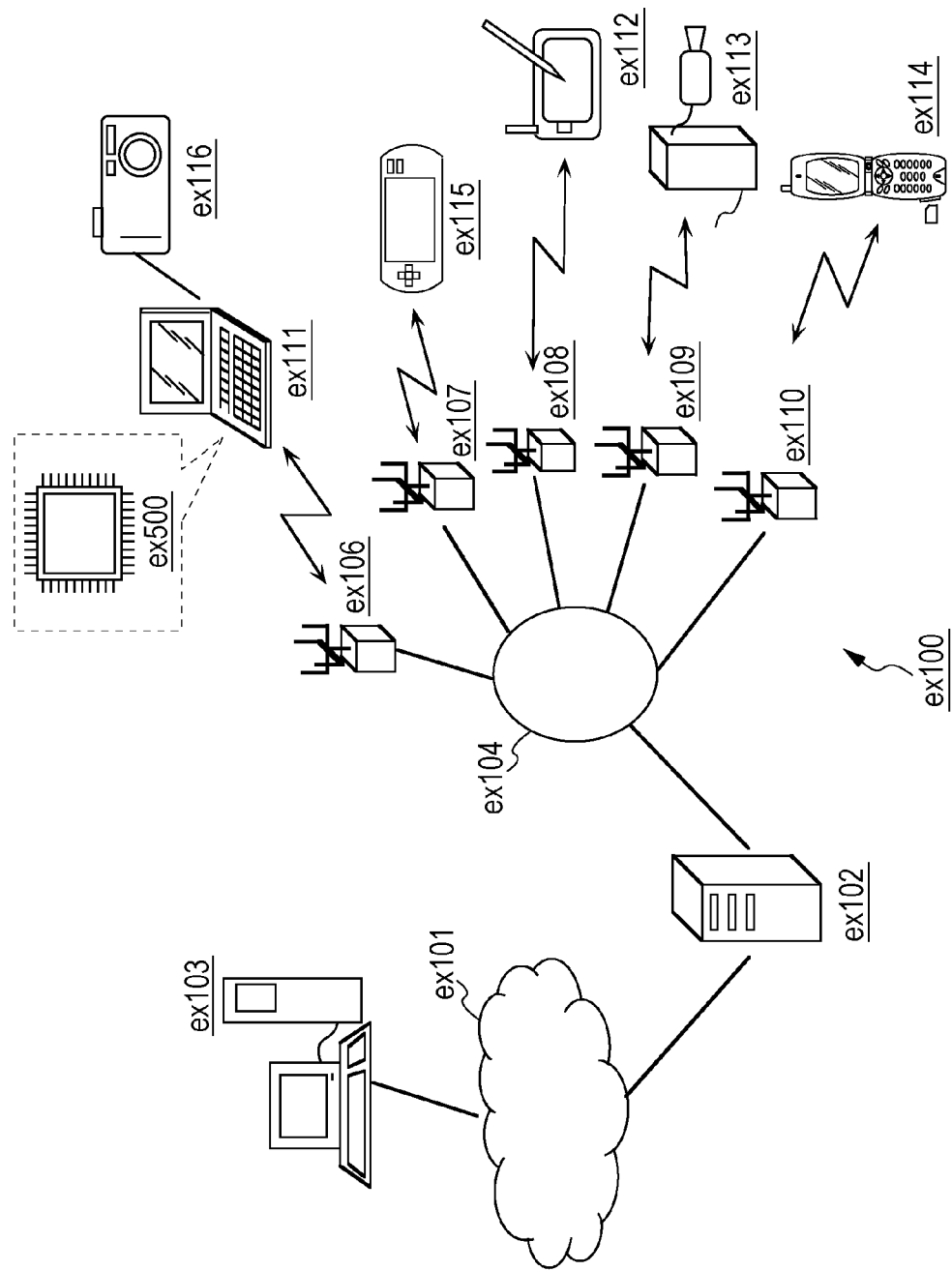
FIG. 32 is a diagram illustrating an overall configuration of a content providing system that implements content distribution services.

FIG. 32 is a diagram illustrating an overall configuration of a content providing system ex100 that implements content distribution services. An area in which communication services are provided is divided into cells of a desired size. Base stations ex106, ex107, ex108, ex109, and ex110, which are fixed wireless stations, are installed in the respective cells.

In this content providing system ex100, various devices, such as a computer ex111, a personal digital assistant (PDA) ex112, a camera ex113, a mobile phone ex114, a game machine ex115 are connected to Internet ex101 via an Internet service provider ex102, a telephone network ex104, and the base stations ex106 to ex110.

Note that the configuration of the content providing system ex100 is not limited to the configuration illustrated in FIG. 32, and any given combination of the elements may be connected. Also, the individual devices may be directly connected to the telephone network ex104 instead of via the base stations ex106 to ex110 which are fixed wireless stations. Alternatively, the individual devices may be directly interconnected via near field communication or the like.

The camera ex113 is a device capable of capturing moving images, such as a digital camcorder. A camera ex116 is a device capable of capturing still images and moving images, such as a digital camera. Also, the mobile phone ex114 may be any of mobile phones based on the Global System for Mobile Communications (GSM) (registered trademark) scheme, Code Division Multiple Access (CDMA) scheme, Wideband-Code Division Multiple Access (W-CDMA) scheme, Long Term Evolution (LTE) scheme, or High Speed Packet Access (HSPA) scheme; a Personal Handyphone System (PHS); and so forth.

In the content providing system ex100, the camera ex113 or the like is connected to a streaming server ex103 via the base station ex109 and the telephone network ex104. In this way, live streaming is implemented. During live streaming, the encoding process is performed on content (for example, video of a music event) obtained by the user using the camera ex113 in a manner as described in each of the above-described exemplary embodiments (that is, the camera ex113 functions as an image encoding apparatus according to one aspect of the present disclosure) and the resulting content is transmitted to the streaming server ex103. The streaming server ex103 in turn distributes the received content as a stream to a client that has made a request. Examples of the client include the computer ex111, the PDA ex112, the camera ex113, the mobile phone ex114, and the game machine ex115 capable of decoding the data that has undergone the encoding process. Each device that has received the distributed data performs the decoding process on the received data to reproduce the data (that is, the device functions as an image decoding apparatus according to one aspect of the present disclosure).

Note that the encoding process may be performed on the obtained data by the camera ex113, by the streaming server ex103 that performs a data transmission process, or by both of them on a processing-sharing basis. Similarly, the decoding process may be performed on the distributed data by the client, by the streaming server ex103, or by both of them on a processing-sharing basis. Also, in addition to still and/or moving image data obtained by the camera ex113, still and/or moving image data obtained by the camera ex116 may be transmitted to the streaming server ex103 via the computer ex111. In this case, the encoding process may be performed by any of the camera ex116, the computer ex111, and the streaming server ex103, or by all of them on a processing-sharing basis.

These encoding and decoding processes are performed in general by an LSI ex500 included in the computer ex111 or each device. The LSI ex500 may be formed as a single chip or a plurality of chips. Alternatively, software for video encoding/decoding may be recorded on a recording medium (such as a CD-ROM, a flexible disk, or a hard disk) that is readable by the computer ex111 or the like, and the encoding and decoding processes may be performed using the software. Further, in the case where the mobile phone ex114 is equipped with a camera, moving image data obtained with the camera may be transmitted. This moving image data is data that has been encoded by the LSI ex500 included in the mobile phone ex114.

Also, the streaming server ex103 may be constituted by a plurality of servers or a plurality of computers that process, record, and distribute data in a distributed manner.

In the above-described manner, the content providing system ex100 allows the client to receive and reproduce coded data. Accordingly, the content providing system ex100 allows the client to receive, decode, and reproduce information transmitted by a user in real time, and thus allows a user not having a special right or equipment to implement personal broadcasting.

Figure 33:
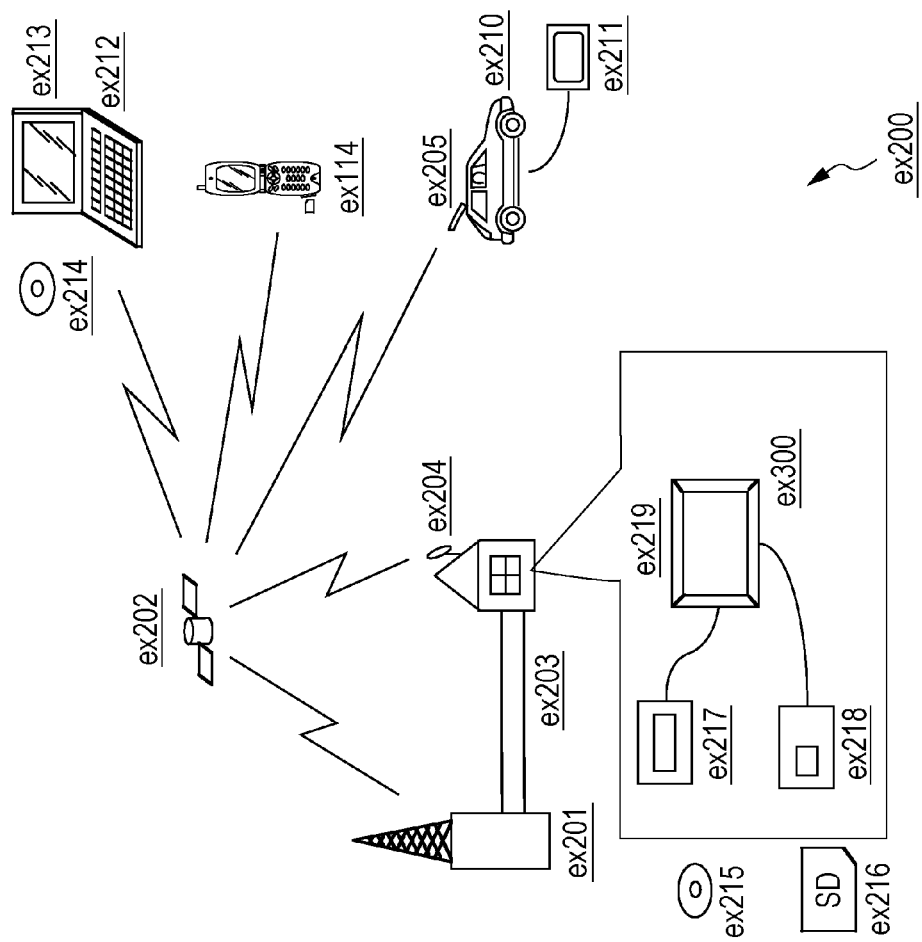
FIG. 33 is a diagram illustrating an overall configuration of a digital broadcasting system.

In addition to the example of the content providing system ex100, at least one of the video encoding apparatus (image encoding apparatus) and the video decoding apparatus (image decoding apparatus) according to each of the above-described exemplary embodiments can be incorporated in a digital broadcasting system ex200 as illustrated in FIG. 33. Specifically, a broadcasting station ex201 transmits a radio wave of multiplexed data obtained by multiplexing video data, music data, and the like, via communication to a broadcasting satellite ex202. This video data is data encoded using the video encoding method described in each of the above-described exemplary embodiments (that is, data encoded by the image encoding apparatus according to one aspect of the present disclosure). Upon receipt of this data, the broadcasting satellite ex202 transmits a broadcasting radio wave, and a home antenna ex204 capable of receiving satellite broadcasting receives this radio wave. An apparatus such as a television (receiver) ex300 or a set top box (STB) ex217 decodes and reproduces the received multiplexed data (that is, the apparatus functions as the image decoding apparatus according to one aspect of the present disclosure).

Also, the video decoding apparatus or the video encoding apparatus described in each of the above-described exemplary embodiments can be implemented in a reader/recorder ex218 that reads and decodes the multiplexed data recorded on a recording medium ex215 such as a Digital Versatile Disc (DVD) or a Blu-ray Disc (BD); or that encodes a video signal and further multiplexes a music signal with the video signal depending on circumstances, and writes the resulting signal on the recording medium ex215. In this case, the reproduced video signal is displayed on a monitor ex219, and the video signal can be reproduced by another apparatus or system using the recording medium ex215 having the multiplexed data recorded thereon. Alternatively, the video decoding apparatus may be implemented in the set top box ex217 connected to a cable ex203 for cable television or the home antenna ex204 for satellite/terrestrial broadcasting, and the video signal may be displayed on the monitor ex219 of the television ex300. At this time, the video decoding apparatus may be incorporated into the television ex300 instead of the set top box ex217.

Figure 34:
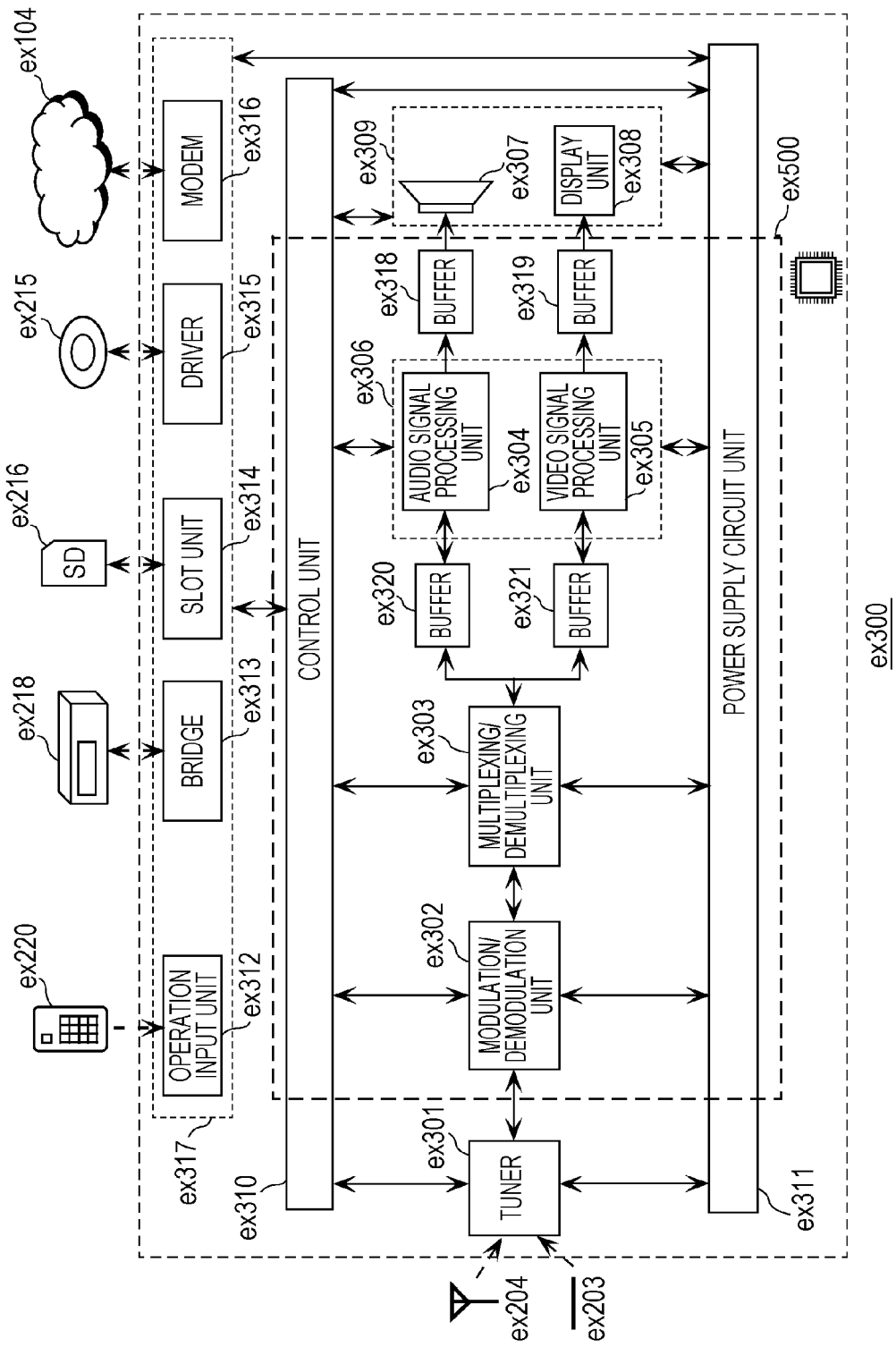
FIG. 34 is a block diagram illustrating an example of a configuration of a television.

FIG. 34 is a diagram illustrating the television (receiver) ex300 that employs the video decoding method and the video encoding method described in each of the exemplary embodiments above. The television ex300 includes a tuner ex301 that obtains or outputs, via the antenna ex204 or the cable ex203 that receives broadcasting, multiplexed data in which video data and audio data are multiplexed together; a modulation/demodulation unit ex302 that performs demodulation on the received multiplexed data or modulation on multiplexed data to be transmitted to outside; and a multiplexing/demultiplexing unit ex303 that demultiplexes the demodulated multiplexed data into video data and audio data, or multiplexes video data and audio data that have been encoded by a signal processing unit ex306.

The television ex300 also includes the signal processing unit ex306 and an output unit ex309. The signal processing unit ex306 includes an audio signal processing unit ex304 that decodes or encodes audio data, and a video signal processing unit ex305 that decodes or encodes video data (the video signal processing unit ex305 functions as the image encoding apparatus or the image decoding apparatus according to one aspect of the present disclosure). The output unit ex309 includes a speaker ex307 that outputs the decoded audio signal, and a display unit ex308, such as a display, that displays the decoded video signal. The television ex300 further includes an interface unit ex317 which includes an operation input unit ex312 that accepts input of a user operation. The television ex300 further includes a control unit ex310 that controls the individual units in an integrated manner, and a power supply circuit unit ex311 that supplies electric power to the individual units. The interface unit ex317 may include a bridge ex313 to be connected to an external device, such as the reader/recorder ex218; a slot unit ex314 that enables connection of a recording medium ex216 such as an SD card; a driver ex315 for connection to the external recording medium ex215, such as a hard disk; and a modem ex316 for connection to the telephone network ex104 as well as the operation input unit ex312. Note that the recording medium ex216 is capable of electrically storing information by using a nonvolatile/volatile semiconductor memory included therein. The individual units of the television ex300 are connected to one another via a synchronization bus.

First, a configuration that allows the television ex300 to decode and reproduce multiplexed data obtained from outside with the antenna ex204 or the like will be described. The television ex300 receives a user operation from a remote control ex220 or the like. Based on control performed by the control unit ex310 including a CPU or the like, the multiplexing/demultiplexing unit ex303 demultiplexes multiplexed data that has been demodulated by the modulation/demodulation unit ex302. Further, in the television ex300, the audio signal processing unit ex304 decodes the separated audio data and the video signal processing unit ex305 decodes the separated video data by using the image decoding method described in each of the above exemplary embodiments. Further, the decoded audio signal and video signal are output to outside from the output unit ex309. When the audio signal and the video signal are output, these signals may be temporarily stored in buffers ex318 and ex319 or the like so that they are reproduced in synchronization with each other. Also, the television ex300 may read multiplexed data from the recording media ex215 and ex216 such as a magnetic/optical disc and an SD card as well as from broadcasting. Next, a configuration that allows the television ex300 to encode an audio signal and a video signal and to transmit the resulting signals to outside or write the resulting signals on a recording medium or the like will be described. The television ex300 receives a user operation from the remote control ex220 or the like. Based on control performed by the control unit ex310, the audio signal processing unit ex304 encodes the audio signal, and the video signal processing unit ex305 encodes the video signal by using the image encoding method described in each of the above exemplary embodiments. The coded audio signal and video signal are multiplexed by the multiplexing/demultiplexing unit ex303 and the resulting multiplexed signal is output to outside. When the audio signal and the video signal are multiplexed, these signals may be temporarily stored in buffers ex320 and ex321 or the like so that they are synchronized with each other. Note that a plurality of buffers may be provided as illustrated as the buffers ex318, ex319, ex320, and ex321; or one or more buffers may be shared. Further, in addition to the illustrated buffers, for example, data may be stored in a buffer that serves as a buffering member for avoiding an overflow or underflow in the system between the modulation/demodulation unit ex302 and the multiplexing/demultiplexing unit ex303 or the like.

The television ex300 may also include a configuration for receiving audio/video input of a microphone or a camera in addition to the configuration for obtaining audio data and video data from broadcasting, a recording medium, or the like; and may perform the encoding process on the data obtained therefrom. Although the television ex300 has been described as the configuration capable of performing the above-described encoding process, multiplexing, and outputting to outside, the television ex300 may be a configuration incapable of performing these processes and only capable of the reception, decoding process, and outputting to outside.

In the case where multiplexed data is read from and written to a recording medium by the reader/recorder ex218, the decoding process or the encoding process may be performed by the television ex300, by the reader/recorder ex218, or by both the television ex300 and the reader/recorder ex218 on a processing-sharing basis.

Figure 35:
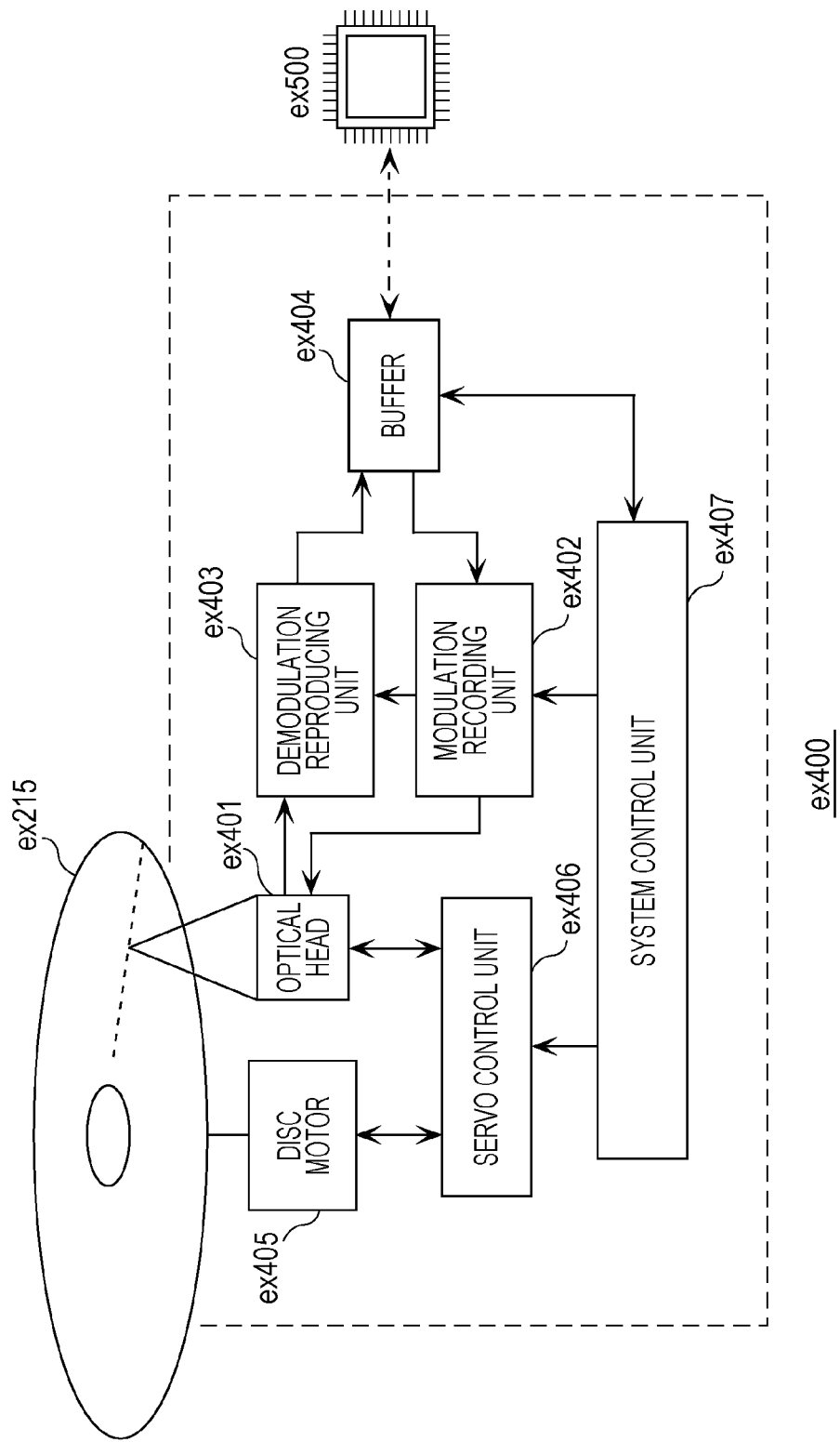
FIG. 35 is a block diagram illustrating an example of a configuration of an information reproducing/recording unit that reads information from and writes information to a recording medium which is an optical disc.

FIG. 35 illustrates an example of a configuration of an information reproducing/recording unit ex400 in the case of reading data from and writing data to an optical disc. The information reproducing/recording unit ex400 includes an optical head ex401, a modulation recording unit ex402, a demodulation reproducing unit ex403, a buffer ex404, a disc motor ex405, a servo control unit ex406, and a system control unit ex407. The optical head ex401 irradiates a recording surface of the recording medium ex215, which is an optical disc, with a laser spot to write information thereon; and detects reflected light from the recording surface of the recording medium ex215 to read information. The modulation recording unit ex402 electrically drives a semiconductor laser included in the optical head ex401 to modulate a laser beam in accordance with to-be-recorded data. The demodulation reproducing unit ex403 amplifies a reproduced signal which is obtained by electrically detecting reflected light from the recording surface by a photodetector included in the optical head ex401, separates and demodulates signal components recorded on the recording medium ex215, and reproduces necessary information. The buffer ex404 temporarily stores information to be recorded on the recording medium ex215 and information reproduced from the recording medium ex215. The disc motor ex405 rotates the recording medium ex215. The servo control unit ex406 moves the optical head ex401 to a certain information track while controlling rotational driving of the disc motor ex405 to perform a laser spot tracking process. The system control unit ex407 controls the information reproducing/recording unit ex400. The above-described reading and writing processes are implemented as a result of the system control unit ex407 performing recording/reproduction of information via the optical head ex401 while causing the modulation recording unit ex402, the demodulation reproducing unit ex403, and the servo control unit ex406 to operate in cooperation with one another and using various pieces of information held in the buffer ex404 and generating/adding new information as needed. The system control unit ex407 includes, for example, a microprocessor and performs these processes by executing a read/write program.

Although the optical head ex401 that irradiates the recording surface with a laser spot has been described above, the optical head ex401 may include a configuration for performing high-density recording using near field light.

Figure 36:
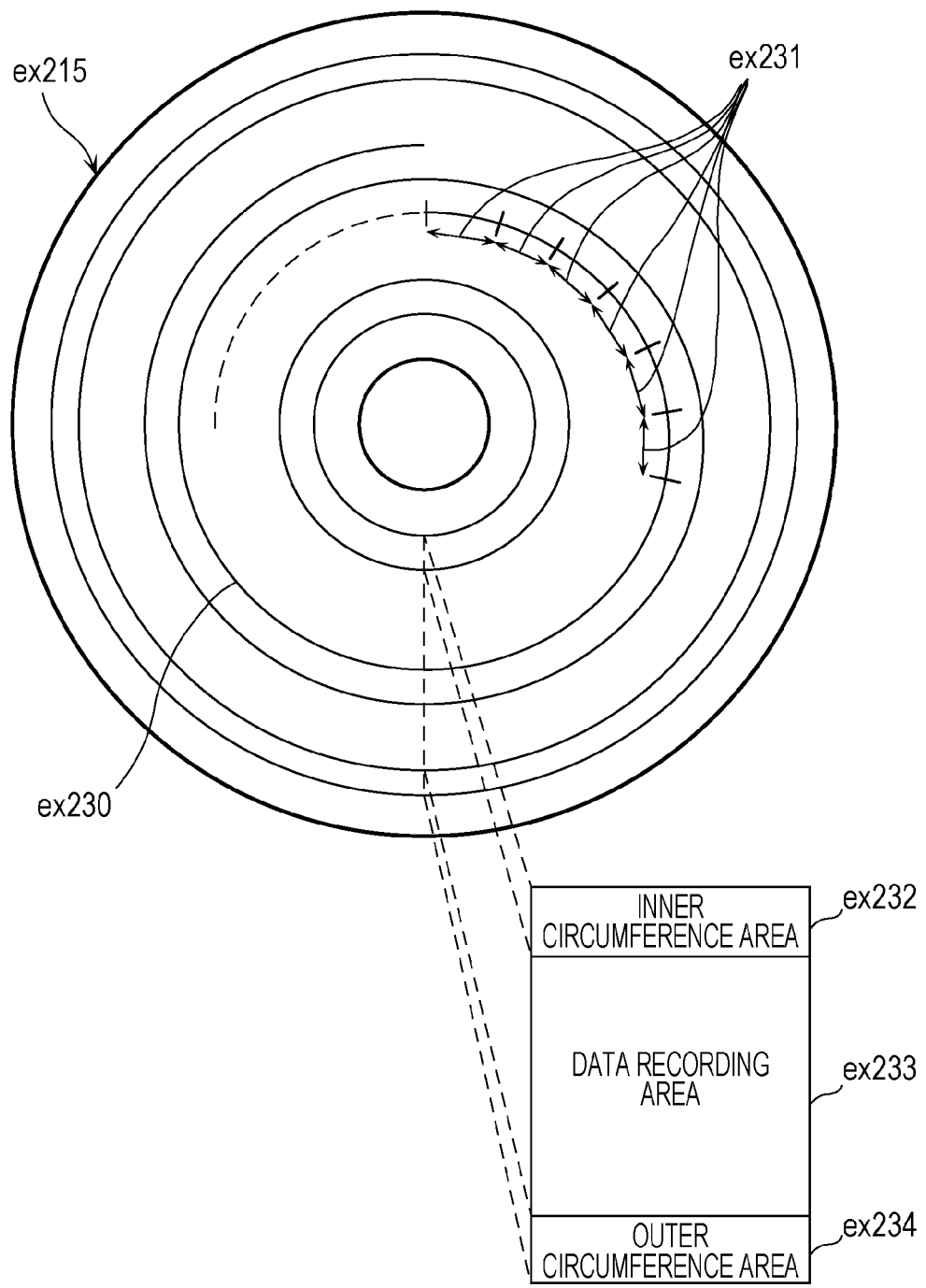
FIG. 36 is a diagram illustrating an example of a structure of an optical disc recording medium.

FIG. 36 is a schematic diagram of the recording medium ex215 which is an optical disc. On the recording surface of the recording medium ex215, a guide groove (groove) is spirally formed. In an information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing the information track ex230 and reading the address information. Also, the recording medium ex215 includes a data recording area ex233, an inner circumference area ex232, and an outer circumference area ex234. The data recording area ex233 is an area used for recording user data. The inner circumference area ex232 and the outer circumference area ex234 that are located on the inner side and the outer side of the data recording area ex233, respectively, are used for purposes other than recording of user data. The information reproducing/recording unit ex400 performs reading/writing of coded audio data, coded video data, or multiplexed data of these pieces of data on the data recording area ex233 of the recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multi-dimensional recording/reproduction can be performed by recording information at the same position of the disc using light of various waveforms different from one another, by recording information on different layers at various angles, or the like.

In addition, in the digital broadcasting system ex200, data may be received by a vehicle ex210 equipped with an antenna ex205 from the broadcasting satellite ex202 or the like and a moving image may be reproduced on a display device of a car navigation system ex211 mounted on the vehicle ex210. Note that the configuration illustrated in FIG. 34 additionally including a GPS reception unit is conceivable as the configuration of the car navigation system ex211, and the same applies to the computer ex111, the mobile phone ex114, or the like.

Figure 37A:
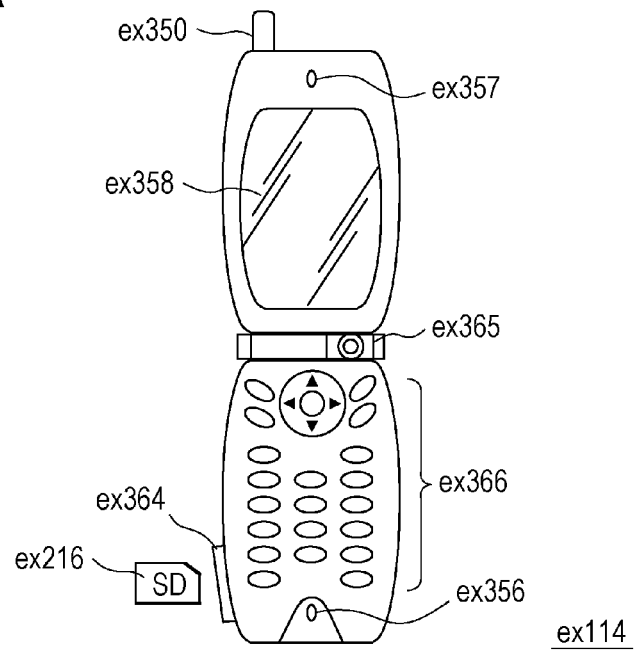
FIG. 37A is a diagram illustrating an example of a mobile phone.

FIG. 37A is a diagram illustrating the mobile phone ex114 that employs the video decoding method and the video encoding method described in the above exemplary embodiments. The mobile phone ex114 includes an antenna ex350 that transmits and receives a radio wave to and from the base station ex110; a camera unit ex365 capable of capturing video and still images; and a display unit ex358, such as a liquid crystal display, that displays the video captured by the camera unit ex365 and data obtained by decoding video or the like received with the antenna ex350. The mobile phone ex114 further includes a body including an operation key unit ex366; an audio output unit ex357 such as a speaker for outputting audio; an audio input unit ex356 such as a microphone for inputting audio; a memory unit ex367 that stores coded data or decoded data of captured video, captured still images, recorded audio, received video, received still images, or received emails; and a slot unit ex364 which is an interface to a recording medium which similarly stores data thereon.

Figure 37B:
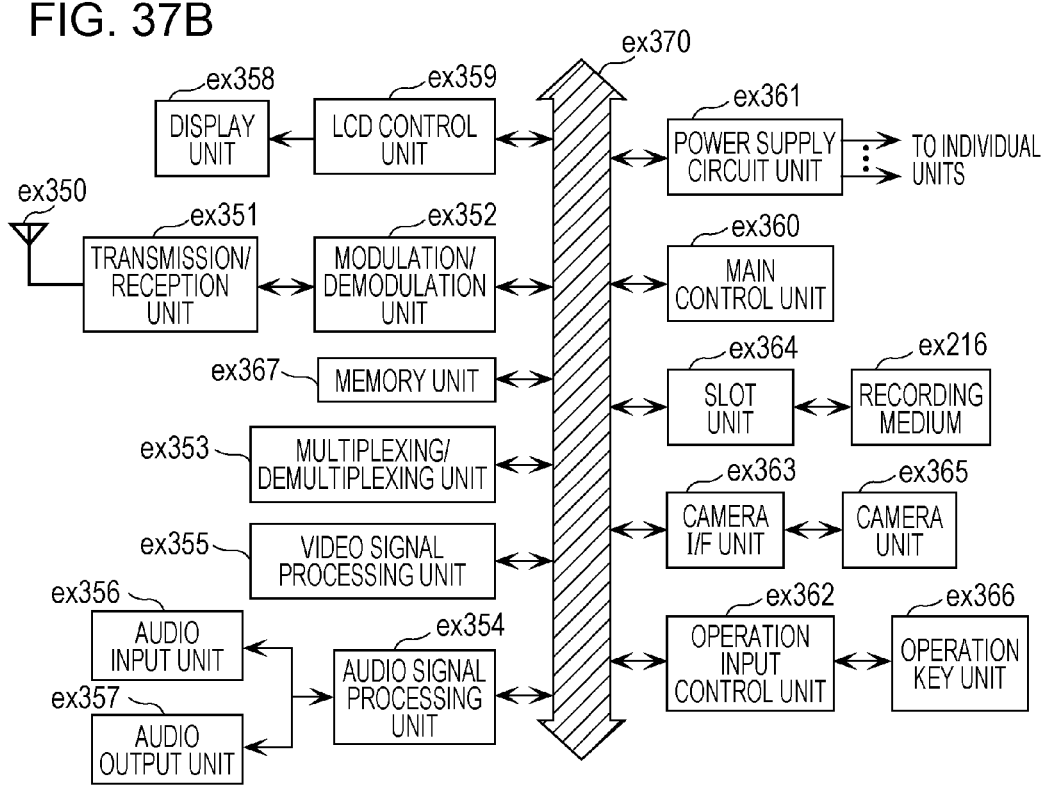
FIG. 37B is a block diagram illustrating an example of a configuration of the mobile phone.

Further, an example of a configuration of the mobile phone ex114 will be described with reference to FIG. 37B. The mobile phone ex114 includes a main control unit ex360 that controls individual units of the body which includes the display unit ex358 and the operation key unit ex366 in an integrated manner. The mobile phone ex114 also includes a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367 which are connected to the main control unit ex360 via a bus ex370.

When an on-hook/power key is turned on through a user operation, the power supply circuit unit ex361 supplies electric power to individual units from a battery pack to activate the mobile phone ex114 into an operable state.

In the mobile phone ex114, in a voice call mode, the audio signal processing unit ex354 converts an audio signal obtained by the audio input unit ex356 into a digital audio signal, the modulation/demodulation unit ex352 performs spread spectrum processing on this digital audio signal, and a transmission/reception unit ex351 performs digital-to-analog conversion processing and frequency conversion processing on this signal and then transmits the resulting signal via the antenna ex350 in accordance with control performed by the main control unit ex360 which includes a CPU, a ROM, and a RAM. Also, in the mobile phone ex114, in the voice call mode, the transmission/reception unit ex351 amplifies reception data received via the antenna ex350 and performs frequency conversion processing and analog-to-digital conversion processing, the modulation/demodulation unit ex352 performs spread spectrum processing on the resulting signal, the audio signal processing unit ex354 converts the resulting signal into an analog audio signal. The analog audio signal is then output from the audio output unit ex357.

In the case where an email is transmitted in a data communication mode, text data of the email input through operation of the operation key unit ex366 of the body or the like is sent to the main control unit ex360 via the operation input control unit ex362. The main control unit ex360 performs control such that the modulation/demodulation unit ex352 performs spread spectrum processing on the text data and the transmission/reception unit ex351 performs digital-to-analog conversion processing and frequency conversion processing on the text data and then transmits the resulting text data to the base station ex110 via the antenna ex350. In the case of receiving an email, substantially the opposite processing is performed on the received data, and the resulting text data is output to the display unit ex358.

In the case where video, a still image, or a combination of video and audio are transmitted in the data communication mode, the video signal processing unit ex355 compresses and encodes a video signal supplied from the camera unit ex365 by using the video encoding method described in each of the above exemplary embodiments (that is, the video signal processing unit ex355 functions as the image encoding apparatus according to one aspect of the present disclosure), and sends the coded video data to the multiplexing/demultiplexing unit ex353. Also, the audio signal processing unit ex354 encodes an audio signal obtained by the audio input unit ex356 while the video, still image, or the like is being captured by the camera unit ex365, and sends the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354 in accordance with a certain scheme. The modulation/demodulation unit (modulation/demodulation circuit unit) ex352 performs spread spectrum processing on the resulting multiplexed data. The transmission/reception unit ex351 performs digital-to-analog conversion processing and frequency conversion processing on the multiplexed data, and then transmits the resulting data via the antenna ex350.

In the case of receiving data of a moving image file linked to a website or the like or an email attached with video or audio in the data communication mode, the multiplexing/demultiplexing unit ex353 demultiplexes multiplexed data into a bitstream of video data and a bitstream of audio data in order to decode the multiplexed data received via the antenna ex350. The multiplexing/demultiplexing unit ex353 supplies the coded video data to the video signal processing unit ex355 and the coded audio data to the audio signal processing unit ex354 via the synchronization bus ex370. The video signal processing unit ex355 performs decoding using a video decoding method corresponding to the video encoding method described in each of the above exemplary embodiments to decode the video signal (that is, the video signal processing unit ex355 functions as the image decoding apparatus according to one aspect of the present disclosure). Then, for example, video or still image included in the moving image file linked to the website is displayed on the display unit ex358 via the LCD control unit ex359. Also, the audio signal processing unit ex354 decodes the audio signal, and the resulting audio is output by the audio output unit ex357.

Like the television ex300, three implementation forms, that is, a transmission/reception terminal including both an encoder and a decoder, a transmission terminal only including an encoder, and a reception terminal only including a decoder, are conceivable for a terminal such as the mobile phone ex114. Further, the case has been described in which multiplexed data in which video data, audio data, and so forth are multiplexed is received and transmitted in the digital broadcasting system ex200; however, the multiplexed data may be data in which text data related to the video is multiplexed other than audio data or video data alone may be used instead of the multiplexed data.

As described above, the video encoding method or the video decoding method described in each of the above exemplary embodiments is applicable to any of the aforementioned devices and systems. In such a way, benefits described in each of the above exemplary embodiments can be obtained.

Also, the present disclosure is not limited to the exemplary embodiments above, and various modifications and corrections can be made without departing from the scope of the present disclosure.

Seventh Exemplary Embodiment

Video data can also be generated by switching between the video encoding method or apparatus described in each of the above exemplary embodiments and a video encoding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video encoding method or apparatus described in each of the above exemplary embodiments will be described below. Multiplexed data is a digital stream in the MPEG-2 transport stream format.

FIG. 38 is a diagram illustrating a structure of multiplexed data. As illustrated in FIG. 38, multiplexed data is obtained by multiplexing one or more of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing GUI components on the window. The video stream is encoded using the video encoding method or apparatus described in each of the above exemplary embodiments and using the video encoding method or apparatus compliant with an existing standard, such as MPEG-2, MPEG-4 AVC, or VC-1. The audio stream is encoded using a standard, such as Audio Code number 3 (Dolby AC-3), Dolby Digital Plus, Meridian Lossless Packing (MLP), Digital Theater Systems (DTS), DTS-HD, or linear Pulse Code Modulation (PCM).

Each stream included in multiplexed data is identified by a packet identifier (PID). For example, a video stream to be used as video of a movie is assigned 0x1011. An audio stream is assigned any one of 0x1100 to 0x111F. A presentation graphics stream is assigned any one of 0x1200 to 0x121F. An interactive graphics stream is assigned any one of 0x1400 to 0x141F. A video stream to be used as sub video of the movie is assigned any one of 0x1B00 to 0x1B1F. An audio stream to be used as sub audio to be mixed with main audio is assigned any one of 0x1A00 to 0x1A1F.

Figure 39:
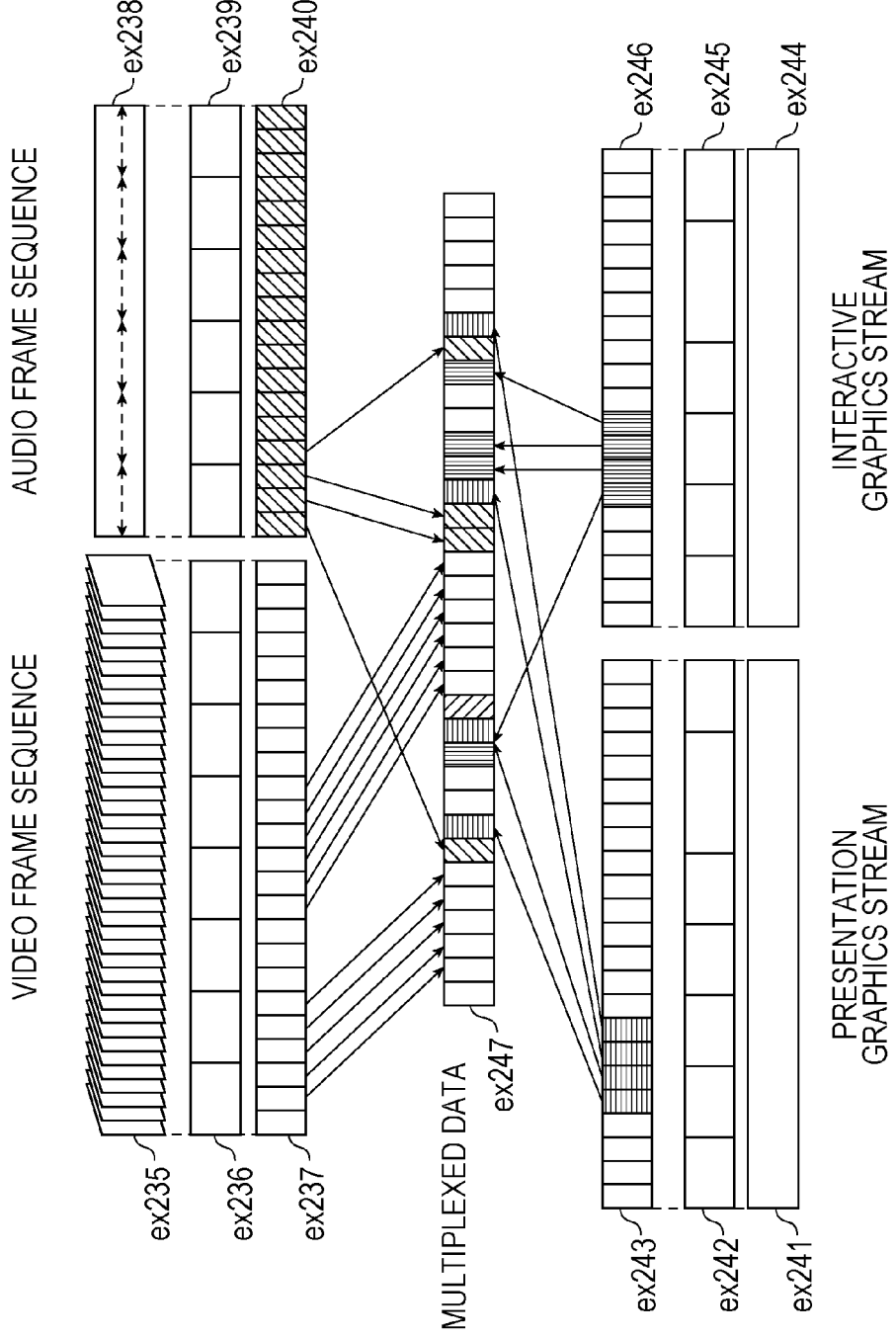
FIG. 39 is a diagram schematically illustrating how individual streams are multiplexed into multiplexed data.

FIG. 39 is a diagram schematically illustrating how individual streams are multiplexed into multiplexed data. A video stream ex235 made up of a plurality of video frames and an audio stream ex238 made up of a plurality of audio frames are converted into packetized elementary stream (PES) packet sequences ex236 and ex239, and then into transport stream (TS) packets ex237 and ex240, respectively. Likewise, data of a presentation graphics stream ex241 and data of an interactive graphics stream ex244 are converted into PES packet sequences ex242 and ex245, and further into TS packets ex243 and ex246, respectively. Multiplexed data ex247 is formed by multiplexing these TS packets into one stream.

Figure 40:
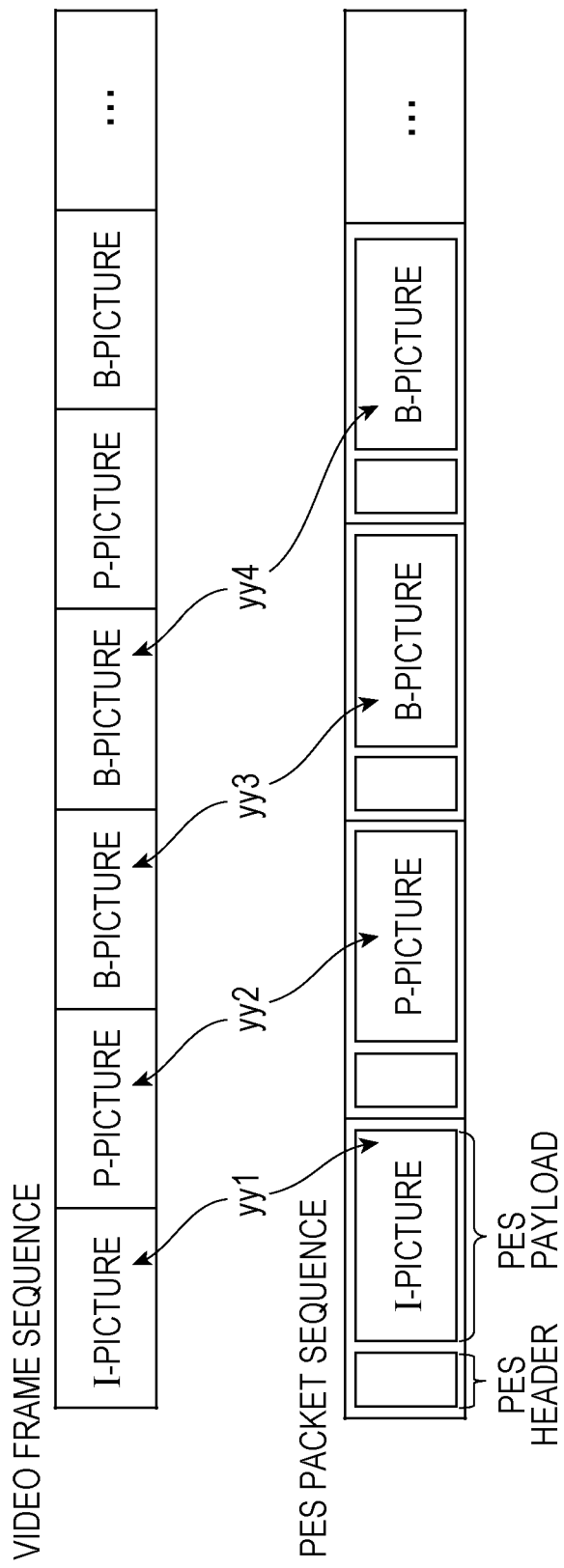
FIG. 40 is a diagram illustrating how a video stream is stored in a packetized elementary stream (PES) packet sequence in a more detailed manner.

FIG. 40 illustrates how a video stream is stored in a PES packet sequence in detail. The upper row in FIG. 40 illustrates a video frame sequence of the video stream. The lower row illustrates a PES packet sequence. As denoted by arrows yy1, yy2, yy3, and yy4 in FIG. 40, intra pictures (I-pictures), bidirectional pictures (B-pictures), and predicted pictures (P-pictures) which are a plurality of video presentation units in a video stream are separated on a picture-by-picture basis, and are stored in the payload of respective PES packets. Each PES packet includes a PES header in which presentation time-stamp (PTS) that represents display time of the picture and decoding time-stamp (DTS) that represents decoding time of the picture are stored.

Figure 41:
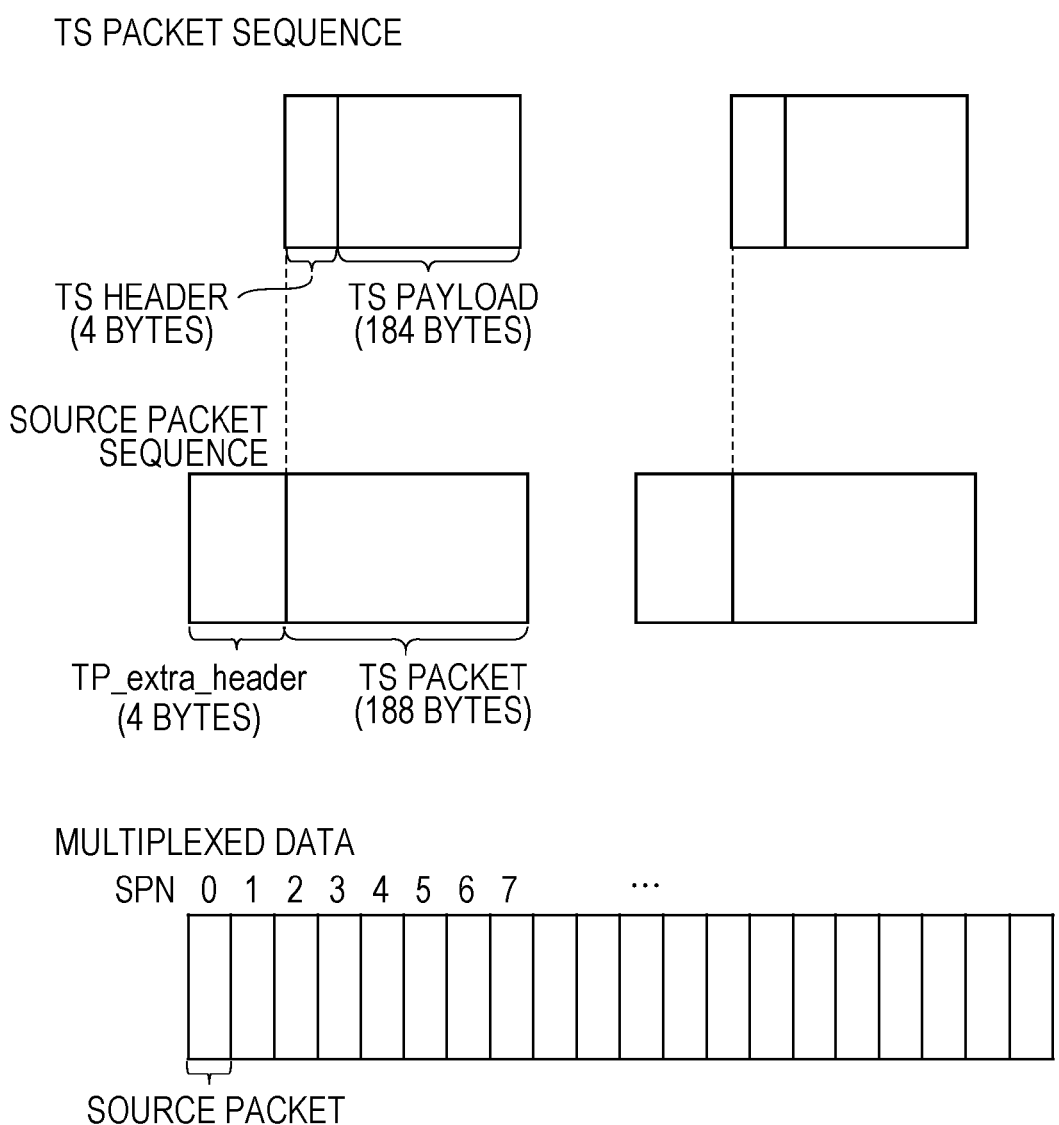
FIG. 41 is a diagram illustrating structures of a transport stream (TS) packet and a source packet in multiplexed data.

FIG. 41 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as Arrival_Time_Stamp (ATS). The ATS represents the transfer start time at which transfer of the TS packet to a PID filter of a decoder is to be started. As illustrated by the lowest row in FIG. 41, source packets are arranged in the multiplexed data. The number that is incremented from the start of the multiplexed data is called source packet number (SPN).

TS packets included in the multiplexed data include a program association table (PAT), a program map table (PMT), and a program clock reference (PCR) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding system time clock (STC) time corresponding to the ATS at which the PCR packet is transferred to a decoder in order to achieve synchronization between arrival time clock (ATC) which is the time axis for ATS and system time clock (STC) which is the time axis for PTS and DTS.

Figure 42:
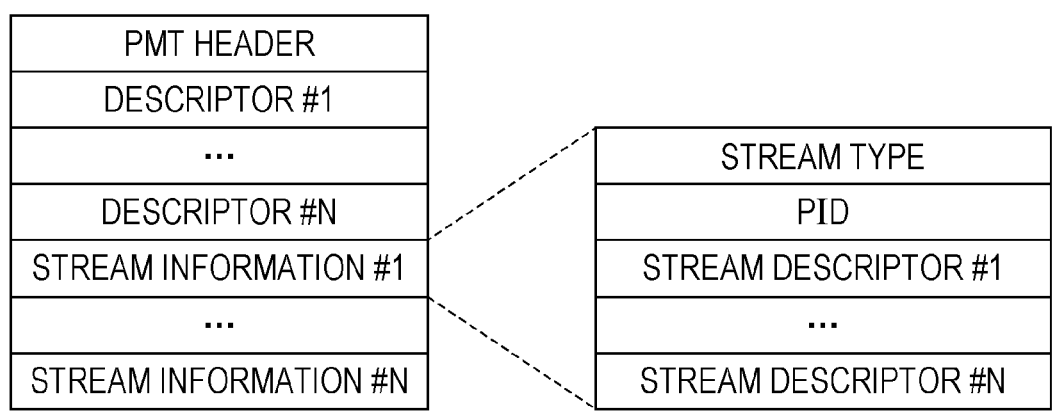
FIG. 42 is a diagram illustrating a data structure of a program map table (PMT)

FIG. 42 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 43:
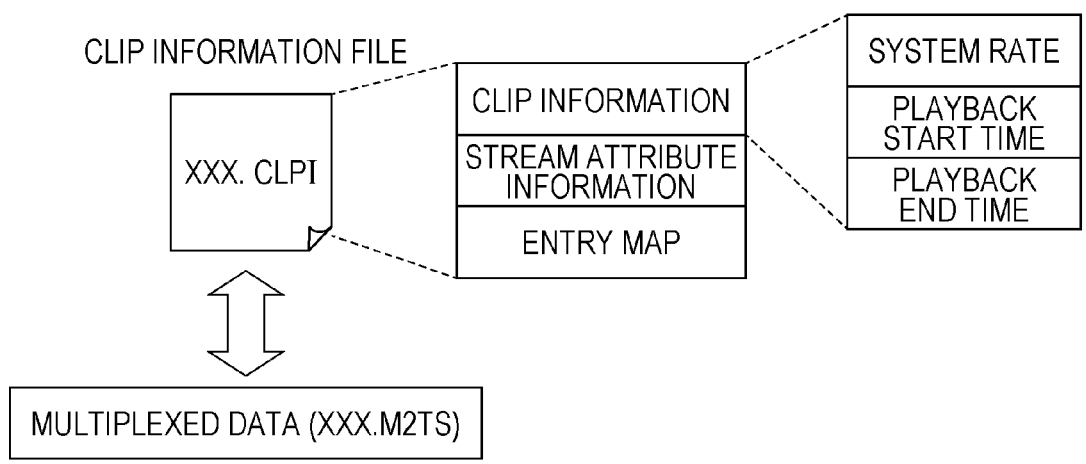
FIG. 43 is a diagram illustrating an internal structure of multiplexed data information.

As illustrated in FIG. 43, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 43. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

Figure 44:
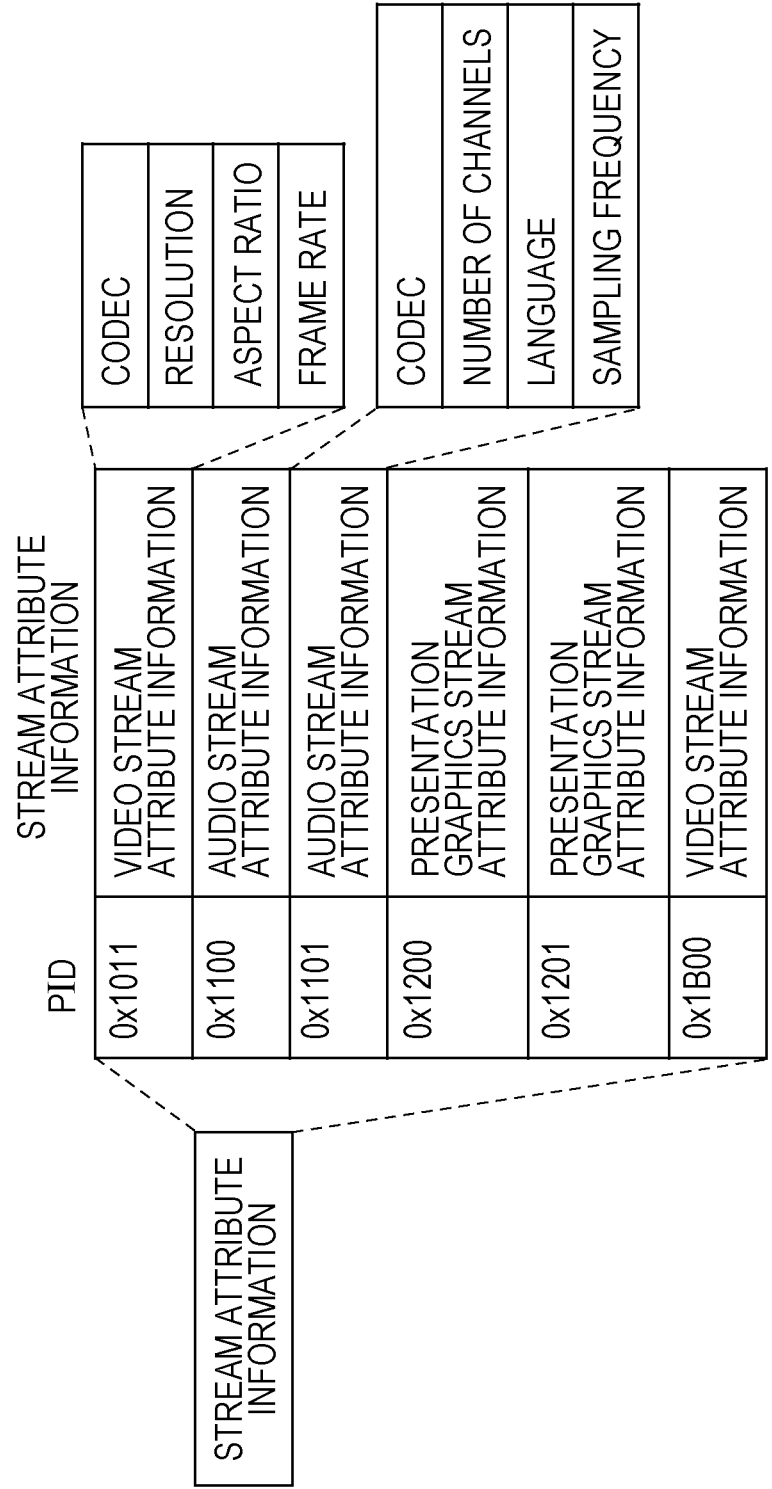
FIG. 44 is a diagram illustrating an internal structure of stream attribute information.

For each PID, attribute information of a corresponding stream included in the multiplexed data is registered in the stream attribute information as illustrated in FIG. 44. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the seventh exemplary embodiment, the stream type contained in the PMT is used among the multiplexed data. Also, in the case where the multiplexed data is recorded on a recording medium, the video stream attribute information contained in the multiplexed data information is used. Specifically, the video encoding method or apparatus described in each of the above exemplary embodiments includes a step or unit for setting unique information which indicates whether or not this video data has been generated by the video encoding method or apparatus described in each of the above exemplary embodiments, in the stream type contained in the PMT or the video stream attribute information. With this configuration, video data generated using the video encoding method or apparatus described in each of the above exemplary embodiments and video data based on another standard can be distinguished from each other.

Figure 45:
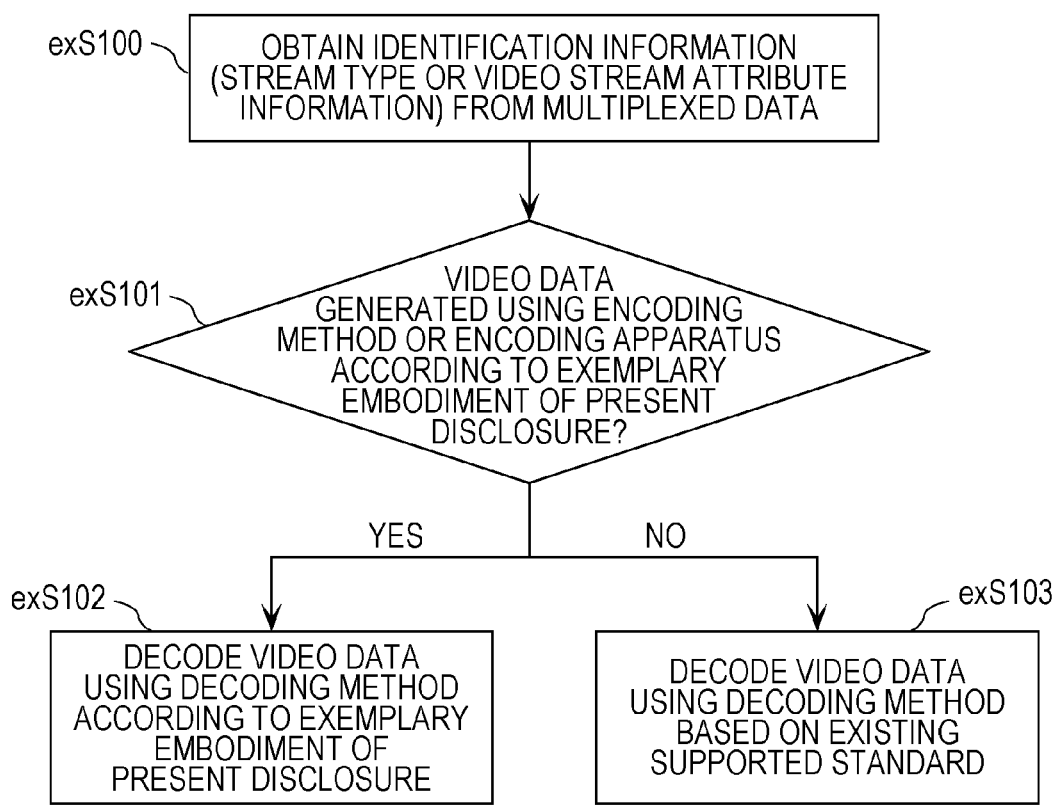
FIG. 45 is a diagram illustrating steps for identifying video data.

FIG. 45 illustrates steps included in a video decoding method in accordance with the seventh exemplary embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video encoding method or apparatus described in each of the above exemplary embodiments. If it is determined from the stream type or the video stream attribute information that this multiplexed data has been generated using the video encoding method or apparatus described in each of the above exemplary embodiments, decoding is performed using the video decoding method described in each of the above exemplary embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the steam type or the video stream attribute information in this way, it can be determined whether or not decoding can be performed using the video decoding method or apparatus described in each of the above exemplary embodiments at the time of decoding. Accordingly, even in the case where multiplexed data based on a different standard is input, an appropriate decoding method or apparatus can be selected, and thus decoding can be performed without causing an error. Also, the video encoding method or apparatus or the video decoding method or apparatus described in the seventh exemplary embodiment is applicable to any of the aforementioned devices and systems.

Eighth Exemplary Embodiment

Figure 46:
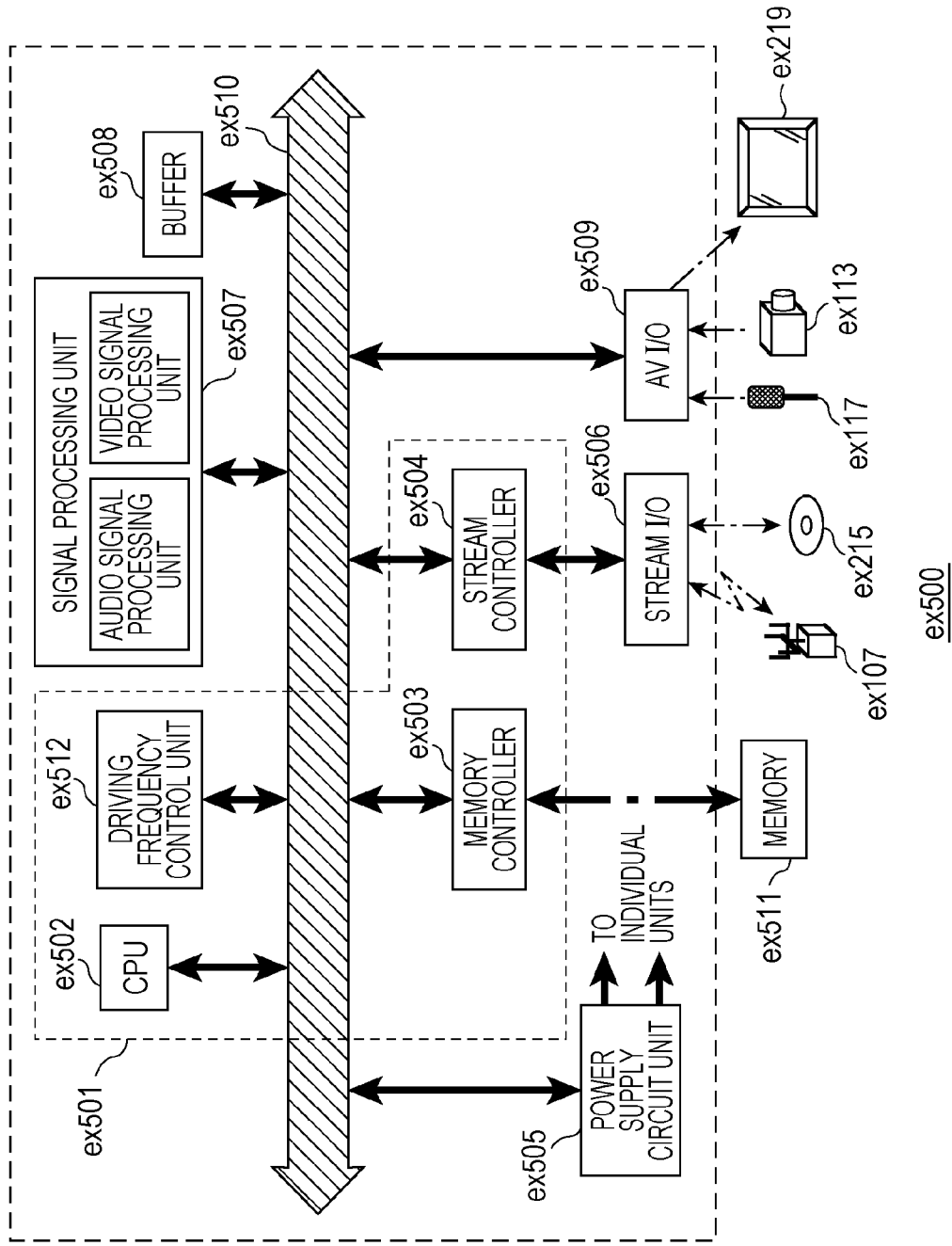
FIG. 46 is a block diagram illustrating an example of a configuration of an integrated circuit that implements a video encoding method and a video decoding method according to each of the exemplary embodiments.

The video encoding method and apparatus and the video decoding method and apparatus described in each of the above exemplary embodiments are typically implemented using an LSI which is an integrated circuit. FIG. 46 illustrates an example of a configuration of the LSI ex500 which is formed as one chip. The LSI ex500 includes a control unit ex501, a CPU ex502, a memory controller ex503, a stream controller ex504, a power supply circuit unit ex505, a stream input/output (I/O) ex506, a signal processing unit ex507, a buffer ex508, and an audio/video (AV) I/O ex509, which are connected to one another via a bus ex510. Upon power-on, the power supply circuit unit ex505 supplies electric power to the individual units to activate the individual units into an operable state.

For example, in the case of performing an encoding process, the LSI ex500 receives an AV signal from a microphone ex117, the camera ex113, or the like via the AV I/O ex509 in accordance with control performed by the control unit ex501 which includes the CPU ex502, the memory controller ex503, the stream controller ex504, and a driving frequency control unit ex512. The input AV signal is temporarily stored in an external memory ex511, such as a synchronous dynamic random access memory (SDRAM). In accordance with control performed by the control unit ex501, the stored data is divided into a plurality of portions in accordance with processing overhead or a processing speed, and the plurality of portions are sent to the signal processing unit ex507. Then, the signal processing unit ex507 encodes the audio signal and/or the video signal. The encoding process performed on the video signal here is the encoding process described in each of the above exemplary embodiments. The signal processing unit ex507 performs processing such as multiplexing of the coded audio data and the coded video data depending on circumstances, and outputs the multiplexed data to outside via the stream I/O ex506. This output multiplexed data is transmitted to the base station ex107 or written to the recording medium ex215. Note that the audio data and the video data may be temporarily stored in the buffer ex508 at the time of multiplexing so that these pieces of data are synchronized with each other.

Note that although the memory ex511 has been described as a device provided outside the LSI ex500 above, the memory ex511 may be included in the LSI ex500. The number of buffers ex508 is not limited to one and the LSI ex500 may include a plurality of buffers. Also, the LSI ex500 may be formed as a single chip or a plurality of chips.

Although the control unit ex501 includes the CPU ex502, the memory controller ex503, the stream controller ex504, and the driving frequency control unit ex512 above, the configuration of the control unit ex501 is not limited to this one. For example, the signal processing unit ex507 may further include a CPU. By providing a CPU within the signal processing unit ex507, the processing speed can be further improved. Alternatively, the CPU ex502 may include the signal processing unit ex507 or, for example, an audio signal processing unit which is part of the signal processing unit ex507. In such a case, the control unit ex501 includes the CPU ex502 which includes the signal processing unit ex507 or part of the signal processing unit ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. An FPGA that is programmable after manufacturing of an LSI or a reconfigurable processor in which connections and settings of circuit cells within the LSI are reconfigurable may be used. Such a programmable logic device can execute the video encoding method or the video decoding method described in each of the above exemplary embodiments typically by loading or reading from a memory or the like a program constituting software or firmware.

Furthermore, if an advance in the semiconductor technology or another related technology yields a circuit integration technology that may substitute for LSI, the functional blocks may be integrated using such a technology obviously. Adaptation of the biotechnology may be possible.

Ninth Exemplary Embodiment

It is considered that processing overhead increases in the case of decoding video data generated using the video encoding method or apparatus described in each of the above exemplary embodiments, compared with the case of decoding video data based on an existing standard, such as MPEG-2, MPEG-4 AVC, or VC-1. Accordingly, in the LSI ex500, a higher driving frequency needs to be set in the CPU ex502 than that used when video data based on an existing standard is decoded. However, making the driving frequency higher undesirably increases power consumption.

Figure 47:
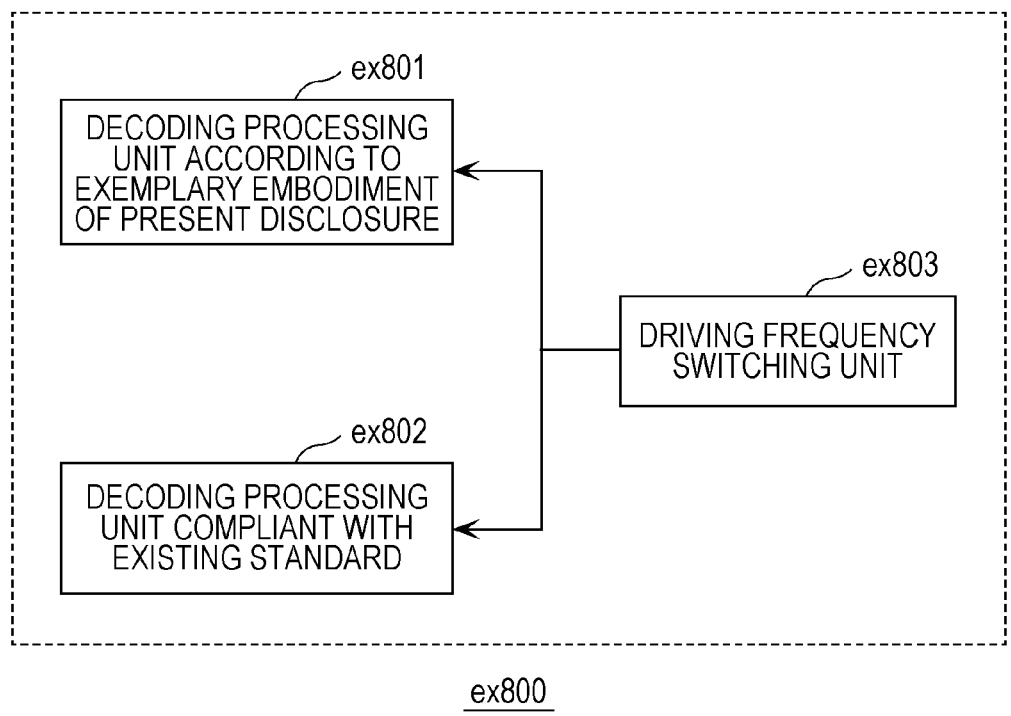
FIG. 47 is a diagram illustrating a configuration for switching between driving frequencies.

To address this issue, the video decoding apparatus, such as the television ex300 or the LSI ex500, is configured to identify a standard which video data is based on, and to switch between the driving frequencies in accordance with the standard. FIG. 47 illustrates a configuration ex800 in accordance with the ninth exemplary embodiment. A driving frequency switching unit ex803 sets the driving frequency high in the case where video data is data that has been generated using the video encoding method or apparatus described in each of the above exemplary embodiments. The driving frequency switching unit ex803 also instructs a decoding processing unit ex801 which executes the video decoding method described in each of the above exemplary embodiments to decode the video data. On the other hand, in the case where the video data is data based on an existing standard, the driving frequency switching unit ex803 sets the driving frequency lower than that of the case where the video data is data that has been generated using the video encoding method or apparatus described in each of the above exemplary embodiments. Then, the driving frequency switching unit ex803 instructs a decoding processing unit ex802 compliant with the existing standard to decode the video data.

More specifically, the driving frequency switching unit ex803 includes the CPU ex502 and the driving frequency control unit ex512 illustrated in FIG. 46. The decoding processing unit ex801 that executes the video decoding method described in each of the above exemplary embodiments and the decoding processing unit ex802 compliant with an existing standard correspond to the signal processing unit ex507 illustrated in FIG. 46. The CPU ex502 identifies a standard which video data is based on. Then, based on a signal from the CPU ex502, the driving frequency control unit ex512 sets the driving frequency. Also, based on a signal from the CPU ex502, the signal processing unit ex507 decodes the video data. Here, the use of the identification information described in the seventh exemplary embodiment, for example, in identification of the video data is conceivable. The identification information is not limited to the one described in the seventh exemplary embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of the CPU ex502 in accordance with a lookup table in which the standard for the video data and the driving frequency are associated with each other as illustrated in FIG. 49, for example. The lookup table is stored in the buffer ex508 or an internal memory of the LSI ex500, and the CPU ex502 refers to this lookup table. In this way, the driving frequency can be selected.

Figure 48:
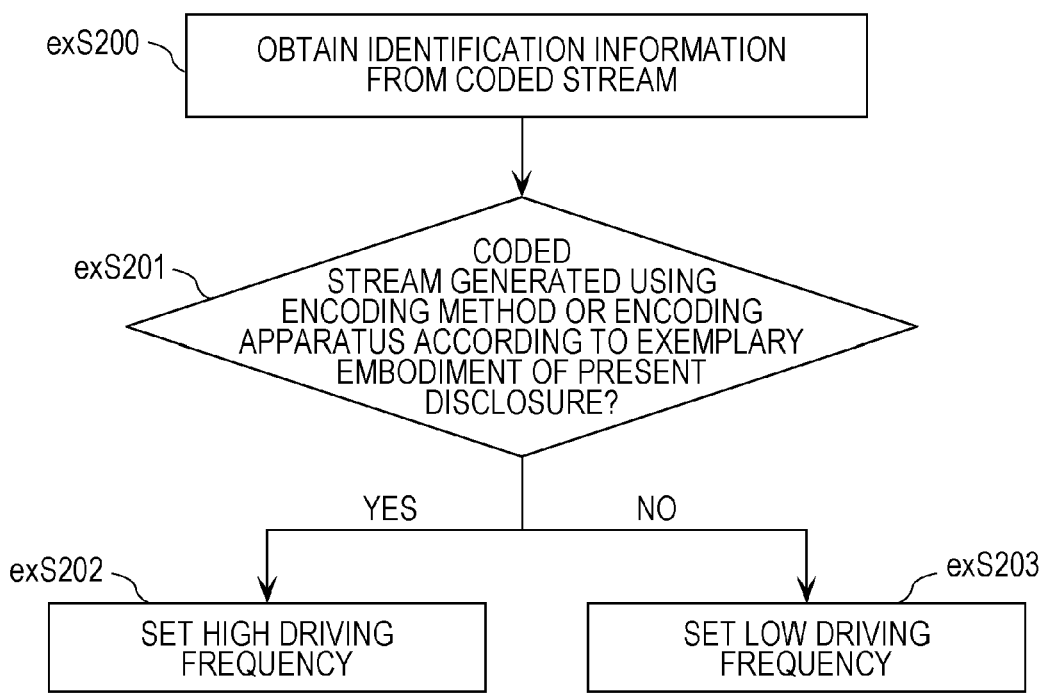
FIG. 48 is a diagram illustrating steps for identifying video data and switching between driving frequencies.

FIG. 48 illustrates steps for performing the method according to the ninth exemplary embodiment. First, in step exS200, the signal processing unit ex507 obtains identification information from multiplexed data. Then, in step exS201, based on the identification information, the CPU ex502 identifies whether or not video data is video data that has been generated using the video encoding method or apparatus described in each of the above exemplary embodiments. If the video data is video data that has been generated using the video encoding method or apparatus described in each of the above exemplary embodiments, the CPU ex502 sends a signal for setting a high driving frequency to the driving frequency control unit ex512 in step exS202. Then, the driving frequency control unit ex512 sets a high driving frequency. On the other hand, if the identification information indicates that the video data is video data based on an existing standard, such as MPEG-2, MPEG-4 AVC, or VC-1, the CPU ex502 sends a signal for setting a low driving frequency to the driving frequency control unit ex512 in step exS203. Then, the driving frequency control unit ex512 sets a lower driving frequency than that used when the video data is video data that has been generated using the video encoding method or apparatus described in each of the above exemplary embodiments.

Further, by changing a voltage supplied to the LSI ex500 or an apparatus including the LSI ex500 in conjunction with switching of the driving frequency, the power-saving effect can be further increased. For example, it is conceivable that in the case where a low driving frequency is set, a voltage supplied to the LSI ex500 or an apparatus including the LSI ex500 is set to be lower in response to this setting than that of the case where a high driving frequency is set.

It is sufficient that the driving frequency is set to be higher in the case where decoding processing overhead is large and set to be lower in the case where decoding processing overhead is small. Accordingly, the driving frequency setting method is not limited to the above-described setting method. For example, in the case where processing overhead of decoding video data based on the MPEG-4 AVC standard is larger than processing overhead of decoding video data generated using the video encoding method or apparatus described in each of the above exemplary embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video encoding method or apparatus described in each of the above exemplary embodiments, a voltage supplied to the LSI ex500 or an apparatus including the LSI ex500 may be set to be high. In the case where the identification information indicates that the video data is video data based on an existing standard, such as MPEG-2, MPEG-4 AVC, or VC-1, a voltage supplied to the LSI ex500 or an apparatus including the LSI ex500 may be set to be low. Alternatively, in another example, in the case where the identification information indicates that the video data is video data that has been generated using the video encoding method or apparatus described in each of the above exemplary embodiments, driving of the CPU ex502 is not stopped. In the case where the identification information indicates that the video data is video data based on an existing standard, such as MPEG-2, MPEG-4 AVC, or VC-1, driving of the CPU ex502 may be temporarily stopped because there is a surplus of capacity relative to the processing load. When there is a surplus of capacity relative to the processing load in the case where the identification information indicates that the video data is video data that has been generated using the video encoding method or apparatus described in each of the above exemplary embodiments, driving of the CPU ex502 may be temporarily stopped. In this case, a period over which the CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where the LSI ex500 or an apparatus including the LSI ex500 is driven with a battery, the battery can be made last longer as a result of power-saving.

Tenth Exemplary Embodiment

A plurality of pieces of video data based on different standards are sometimes input to the aforementioned devices and systems, such as the television ex300 and the mobile phone ex114. In order to enable decoding even in the case where a plurality of pieces of video data based on different standards are input, the signal processing unit ex507 of the LSI ex500 needs to support the plurality of standards. However, the use of the signal processing units ex507 for the respective standards undesirably makes the circuitry scale of the LSI ex500 larger and increases the cost.

Figure 50A:
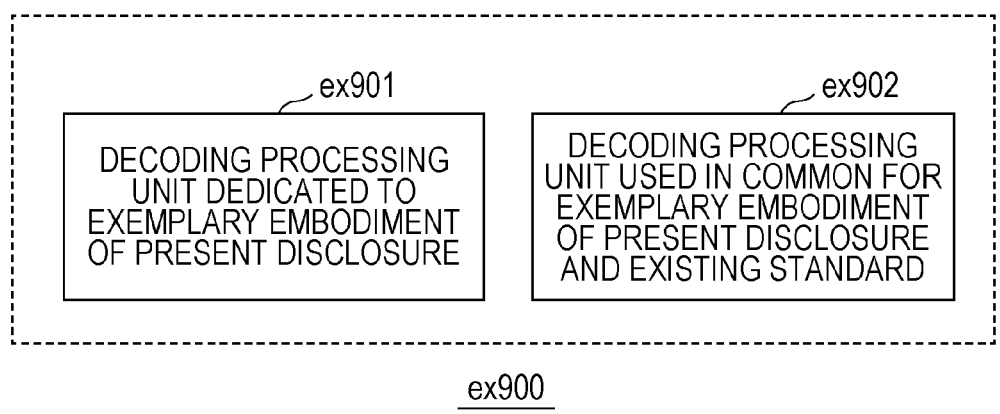
FIG. 50A is a diagram illustrating an example of a configuration that enables sharing of modules among signal processing units.

To address this issue, a decoding processing unit that executes the video decoding method described in each of the above exemplary embodiments and a decoding processing unit compliant with an existing standard, such as MPEG-2, MPEG-4 AVC, or VC-1, share some of their components. FIG. 50A illustrates an example of this configuration ex900. For example, the video decoding method described in each of the above exemplary embodiments and the video decoding method compliant with the MPEG-4 AVC standard share some of contents of processing, such as entropy decoding, dequantization, deblocking filtering, and motion compensation. Accordingly, the following configuration is conceivable. For the shared processing contents, a decoding processing unit ex902 compliant with the MPEG-4 AVC standard in used in common. For other processing contents that are not compliant with the MPEG-4 AVC standard and are unique to an aspect of the present disclosure, a dedicated decoding processing unit ex901 may be used. In particular, an aspect of the present disclosure includes a feature in motion compensation. Thus, for example, the dedicated decoding processing unit ex901 may be used for motion compensation and the decoding processing unit ex902 may be used in common for any of or all of dequantization, entropy decoding, and deblocking filtering. Alternatively, as for sharing of the decoding processing unit, a configuration may be used in which a decoding processing unit that executes the video decoding method described in each of the above exemplary embodiments is used for the common processing contents and a dedicated decoding processing unit is used for processing contents unique to the MPEG-4 AVC standard.

Figure 50B:
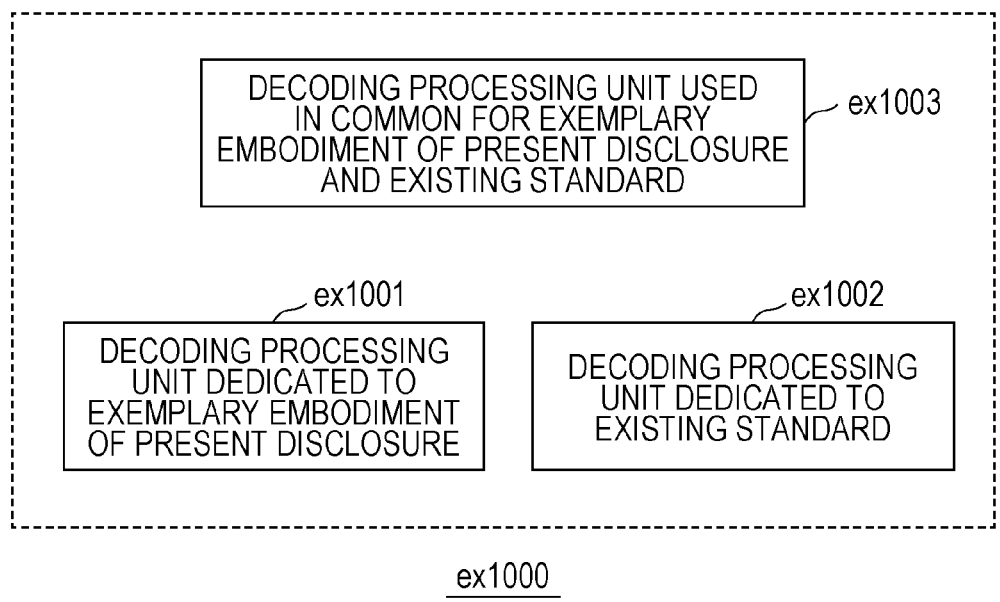
FIG. 50B is a diagram illustrating another example of a configuration that enables sharing of modules among signal processing units.

FIG. 50B illustrates another example ex1000 that implements sharing of part of processing. In this example, a dedicated decoding processing unit ex1001 that handles processing contents unique to an aspect of the present disclosure, a dedicated decoding processing unit ex1002 that handles processing contents unique to an existing standard, and a shared decoding processing unit ex1003 that handles processing contents that are common to the video decoding method according to the aspect of the present disclosure and the video decoding method according to the existing standard are used. Here, the dedicated decoding processing units ex1001 and ex1002 are not necessarily specialized for the processing contents unique to the aspect of the present disclosure and the existing standard, respectively, and may be also capable of executing other general processing. Also, the configuration according to the tenth exemplary embodiment can be implemented using the LSI ex500.

By sharing a decoding processing unit for processing contents that are common to the video decoding method according to an aspect of the present disclosure and the video decoding method according to an existing standard, the circuitry scale and cost of the LSI ex500 can be reduced.

The exemplary embodiments of the present disclosure are applicable to an image encoding method, an image decoding method, an image encoding apparatus, and an image decoding apparatus. The exemplary embodiments of the present disclosure are also applicable to various applications such as storage, transmission, and communication of data. For example, the exemplary embodiments of the present disclosure are applicable to information display devices and image capturing devices such as a television, a digital video recorder, a car navigation system, a mobile phone, a digital still camera, and a digital video camera, for example.

What is claimed is:
1. An image decoding method comprising:
   decoding, from a bitstream, constraint tile information that indicates a prohibition of reference from a current tile, which is one of a plurality of tiles obtained by partitioning a picture, to another tile;
   generating a prediction motion vector list that includes a plurality of prediction motion vector candidates and a plurality of prediction motion vector indices respectively corresponding to the plurality of prediction motion vector candidates;
   decoding, from the bitstream, a prediction motion vector index for a current block included in the current tile and decoding the current block by using a prediction motion vector candidate specified by the decoded prediction motion vector index in the prediction motion vector list, and
   wherein in the generating of the prediction motion vector list, when (i) the constraint tile information is decoded and (ii) the current block is located at a right end of the current tile, the prediction motion vector list not including any temporal motion vectors, each of which refers to another picture which is different from a current picture in which the current block is included, is generated.

2. The image decoding method according to claim 1, wherein in the generating of the prediction motion vector list, a zero motion vector is included in the prediction motion vector list in place of one of the temporal motion vectors, each of which refers to the another picture.

3. The image decoding method according to claim 1, wherein in the generating of the prediction motion vector list, the prediction motion vector list does not include a temporal motion vector of a block located at a center of the current block when the (i) the constraint tile information is decoded and (ii) the current block is located at a right end of the current tile.

4. The image decoding method according to claim 1, wherein in the decoding of the current block, the current block is decoded by using a prediction motion vector candidate associated with the largest prediction motion vector index among the plurality of prediction motion vector indices included in the prediction motion vector list in a case where the decoded prediction motion vector index does not exist in the prediction motion vector list.

5. The image decoding method according to claim 1, wherein in the decoding of the current block, the current block is decoded by using a prediction motion vector candidate associated with the smallest prediction motion vector index among the plurality of prediction motion vector indices included in the prediction motion vector list in a case where the decoded prediction motion vector index does not exist in the prediction motion vector list.

6. The image decoding method according to claim 1, wherein in the decoding of the current block, the current block is decoded by using a motion vector having a value of 0 in a case where the decoded prediction motion vector index does not exist in the prediction motion vector list.

7. An image encoding method comprising:
   partitioning a picture into a plurality of tiles;
   encoding constraint tile information that indicates a prohibition of reference from a current tile, which is one of the plurality of tiles, to another tile when the current tile is prohibited from referring to the another tile;

generating a prediction motion vector list that includes a plurality of prediction motion vector candidates and a plurality of prediction motion vector indices respectively corresponding to the plurality of prediction motion vector candidates;

selecting a prediction motion vector candidate from among the plurality of prediction motion vector candidates;

encoding a current block included in the current tile by using the selected prediction motion vector candidate and encoding a prediction motion vector index for specifying the selected prediction motion vector candidate in the prediction motion vector list, and wherein when (i) the current tile is prohibited from referring to the another tile and (ii) the current block is located at a right end of the current tile, in the generating the prediction motion vector list, the prediction motion vector list not including any temporal motion vectors, each of which refers to another pictures which is different from a current picture in which the current block is included, is generated, and in the encoding of the constraint tile information, a temporal motion vector prohibition flag that indicates prohibition to use a temporal motion vector in the current block, which is located at right end of the current tile, is encoded.

8. An image decoding apparatus comprising:
a processor; and
a non-transitory memory storing thereon a computer program, which when executed by the processor, causes the processor to perform the image decoding method according to claim 1.

9. An image encoding apparatus comprising:
a processor; and
a non-transitory memory storing thereon a computer program, which when executed by the processor, causes the processor to perform the image encoding method according to claim 7.

10. An image encoding method for encoding a plurality of tiles included in a current picture, the encoding method comprising:
determining whether a current block included in a current tile is located at a right end of the current tile; and
encoding the current block,
wherein in the encoding of the current block,
(i) when the current block is determined to be located at the right end of the current tile, the current block is encoded using a motion vector which is selected from a plurality of motion vector candidates not including any motion vectors, each of which refers to another picture which is different from the current picture in which the current block is included;
(ii) when the current block is determined not to be located at the right end of the current tile, the current block is encoded using a motion vector which is selected from a plurality of motion vectors including the motion vectors, each of which refers to the another picture; and
(iii) the plurality of motion vector candidates includes neither a temporal motion vector of the block on the lower right side of the current block nor a temporal motion vector of a block located at a center of the current block.

11. The image encoding method according to claim 10, wherein in the encoding of the current block, a combined bi-predictive vector, and a motion vector having a value of 0 are not included in the plurality of motion vector candidates when the current block is located at right end of the current tile.

12. The image encoding method according to claim 10, wherein in the encoding of the current block, the current block is encoded by using intra prediction.

13. The image encoding method according to claim 10, wherein in the encoding of the current block, the current block is encoded by using intra prediction in a case where a spatial motion vector candidate is not available.

14. The image encoding method according to claim 10, wherein
when the current block is located adjacent to a tile boundary, a value of a quantization parameter of the current block is set to be smaller than a value of a quantization parameter of other blocks.

15. The image encoding method according to claim 10, wherein in the encoding of the current block, the plurality of motion vector candidates includes neither a temporal motion vector of the block on the lower right side of the current block nor a temporal motion vector of a block located at a center of the current block, and
when the current block is located adjacent to a tile boundary, a value of a quantization parameter of the current block is set to be smaller than a value of a quantization parameter of other blocks.

16. The image encoding method according to claim 10, wherein in the encoding of the current block, a combined bi-predictive vector, and a motion vector having a value of 0 are not included in the plurality of motion vector candidates when the current block is located at right end of the current tile, and
when the current block is located adjacent to a tile boundary, a value of a quantization parameter of the current block is set to be smaller than a value of a quantization parameter of other blocks.

17. The image encoding method according to claim 10, wherein in the encoding of the current block, the current block is encoded by using intra prediction, and
when the current block is located adjacent to a tile boundary, a value of a quantization parameter of the current block is set to be smaller than a value of a quantization parameter of other blocks.

18. The image encoding method according to claim 10, wherein in the encoding of the current block, the current block is encoded by using intra prediction in a case where a spatial motion vector candidate is not available, and
when the current block is located adjacent to a tile boundary, a value of a quantization parameter of the current block is set to be smaller than a value of a quantization parameter of other blocks.

19. An image encoding apparatus comprising:
a processor; and
a non-transitory memory storing thereon a computer program, which when executed by the processor, causes the processor to perform the image encoding method according to claim 10.

* * * * *